United States Patent
Lee et al.

(10) Patent No.: US 8,285,766 B2
(45) Date of Patent: Oct. 9, 2012

(54) MICROPROCESSOR SHIFTER CIRCUITS UTILIZING BUTTERFLY AND INVERSE BUTTERFLY ROUTING CIRCUITS, AND CONTROL CIRCUITS THEREFOR

(75) Inventors: Ruby B. Lee, Princeton, NJ (US); Yedidya Hilewitz, New York, NY (US)

(73) Assignee: The Trustees of Princeton University, Princeton, NJ (US)

( * ) Notice: Subject to any disclaimer, the term of this patent is extended or adjusted under 35 U.S.C. 154(b) by 1082 days.

(21) Appl. No.: 12/126,616

(22) Filed: May 23, 2008

(65) Prior Publication Data

US 2009/0138534 A1    May 28, 2009

Related U.S. Application Data

(60) Provisional application No. 60/931,493, filed on May 23, 2007.

(51) Int. Cl.
G06F 5/01 (2006.01)
(52) U.S. Cl. ......................................................... 708/209
(58) Field of Classification Search .................. None
See application file for complete search history.

(56) References Cited

U.S. PATENT DOCUMENTS

| | | | |
|---|---|---|---|
| 4,396,994 A | 8/1983 | Kang et al. | |
| 4,653,019 A | 3/1987 | Hodge et al. | |
| 4,829,460 A | 5/1989 | Ito | |
| 5,481,749 A * | 1/1996 | Grondalski | 712/16 |
| 5,670,900 A | 9/1997 | Worrell | |
| 5,673,321 A | 9/1997 | Lee | |
| 5,729,482 A | 3/1998 | Worrell | |
| 5,961,575 A | 10/1999 | Hervin et al. | |
| 5,978,822 A | 11/1999 | Muwafi et al. | |
| 6,098,087 A * | 8/2000 | Lemay | 708/209 |
| 6,381,690 B1 | 4/2002 | Lee | |
| 6,715,066 B1 * | 3/2004 | Steele, Jr. | 712/300 |
| 6,877,019 B2 * | 4/2005 | Bandy et al. | 708/209 |
| 6,917,955 B1 * | 7/2005 | Botchev | 708/406 |
| 6,922,472 B2 | 7/2005 | Lee et al. | |
| 6,952,478 B2 | 10/2005 | Lee et al. | |
| 7,035,887 B2 * | 4/2006 | Ziegler et al. | 708/209 |
| 7,092,526 B2 | 8/2006 | Lee | |
| 7,174,014 B2 | 2/2007 | Lee et al. | |
| 7,689,635 B2 * | 3/2010 | Gupta et al. | 708/209 |
| 2003/0023646 A1 * | 1/2003 | Lin et al. | 708/209 |
| 2008/0243974 A1 * | 10/2008 | Paumier et al. | 708/209 |
| 2010/0009010 A1 * | 1/2010 | Gomori | 424/616 |

OTHER PUBLICATIONS

Lee, Ruby B., "Accelerating Multimedia with Enhanced Microprocessors," IEEE Micro, vol. 15, No. 2, pp. 22-32, Apr. 1995.

(Continued)

Primary Examiner — David H Malzahn
(74) Attorney, Agent, or Firm — McCarter & English, LLP

(57) ABSTRACT

Microprocessor shifter circuits utilizing butterfly and inverse butterfly circuits, and control circuits therefor, are provided. The same shifter circuits can also perform complex bit manipulations at high speeds, including butterfly and inverse butterfly operations, parallel extract and deposit operations, group operations, mix operations, permutation operations, as well as instructions executed by existing microprocessors, including shift right, shift left, rotate, extract, deposit and multimedia mix operations. The shifter circuits can be provided in various combinations to provide microprocessor functional units which perform a plurality of bit manipulation operations.

53 Claims, 40 Drawing Sheets

OTHER PUBLICATIONS

Lee, et al., "Efficient Permutation Instructions for Fast Software Cryptography," IEEE Micro, vol. 21, No. 6, pp. 56-69, Nov.-Dec. 1991.

Shi, et al., "Bit Permutation Instructions for Accelerating Software Cryptography," Proceedings of the IEEE International Conf. on Application-Specific Systems, Architectures and Processors, pp. 138-148, Jul. 2000.

Yang, et al., Fast Subword Permutation Instructions Using Omega and Flip Network Stages, Proceedings of the International Conference on Computer Design (ICCD 2000), pp. 15-22, Sep. 2000.

Lee, et al., "How a Processor Can Permute $n$ bits in O(1) cycles," Proceedings of Hot Chips 14—A symposium on High Performance Chips, Aug. 2002.

Shi, et al., "Arbitrary Bit Permutations in One or Two Cycles," Proceedings of the IEEE International Conference on Application-Specific Systems, Architectures and Processors, Jun. 2003.

R. Lee, "Precision Architecture", IEEE Computer, vol. 22, No. 1, pp. 78-91, Jan. 1989.

Hilewitz, et al., "Comparing Fast Implementations of Bit Permutation Instructions," Proceedings of the $38^{th}$ Annual Asilomar Conference on Signals, Systems, and Computers, Nov. 2004.

Sun Microsystems, The VIS™ Instruction Set Version 1.0, Jun. 2002.

Franz, et al., "Computer Based Steganography: How It Works and Why Therefore Any Restrictions on Cryptography are Nonsense, at Best," Information Hiding, Springer Lecture Notes in Computer Science, vol. 1174, pp. 7021, 1996.

V.E. Benes, "Optimal Rearrangeble Multistage Connecting Networks," The Bell System Technical Journal, vol. 43, No. 4, Jul. 1964, pp. 1641-1656.

"Uuencoding," Wikipedia: The Free Encyclopedia, http://en.wikipedia.org/wiki/Uuencode, printed from website on Sep. 1, 2009.

National Center for Biotechnology Information, BLAST, http://www.ncbi.nlm.nih.gov/BLAST, printed from website on Sep. 1, 2009.

Fiskiran, et al., "On-Chip Lookup Tables for Fast Symmetric-Key Encryption," Proceedings of the IEEE International Conf. on Application-Specific Systems, Architectures and Processors, pp. 356-363, Jul. 2005.

Burger, et al., "The SiimpleScalar Tool Set, Version 2.0," University of Wisconsin-Madison Computer Sciences Department Technical Report #1342, 1997.

Ruby B. Lee, "Subword Parallelism with Max-2," IEEE Micro, vol. 16, No. 4, pp. 51-59, Aug. 1996.

Shi, et al., "Subword Sorting with Versatile Permutation Instructions," Proceedings of the International Conference on Computer Design (ICCD 2002) pp. 234-241, Sep. 2002.

The Mathworks, Inc., "Image Processing Toolbox User's Guide: http://www.mathworks.com/access/helpdesk/help/toolbox/images/images.html," printed from website on Sep. 10, 2009.

Hilewitz, et al., "Performing Advanced Bit Manipulations Efficiently in General-Purpose Processors," Proceedings of the 18th IEEE Symposium on Computer Arithmetic, Jun. 25-27, 2007 (10 pages).

Hilewitz, et al., "Fast Bit Compression and Expansion with Parallel Extract and Parallel Deposit Instructions," Proceedings of the IEEE 17th International Conference on Application-Specific Systems, Architectures and Processors (ASAP), pp. 65-72, Sep. 11-13, 2006 (8 pages).

* cited by examiner

MICROPROCESSOR SHIFTER CIRCUITS UTILIZING BUTTERFLY AND INVERSE BUTTERFLY ROUTING CIRCUITS, AND CONTROL CIRCUITS THEREFOR

RELATED APPLICATIONS

The present application claims the priority of U.S. Provisional Application Ser. No. 60/931,493 filed May 23, 2007, the entire disclosure of which is expressly incorporated herein by reference.

STATEMENT OF GOVERNMENT INTERESTS

The present invention was made with government support under Department of Defense Grant No. H98230-04-C-0496. Accordingly, the Government has certain rights to the present invention.

BACKGROUND OF THE INVENTION

1. Field of the Invention

The present invention relates to circuitry for computer systems, and more specifically, to microprocessor shifter circuits utilizing butterfly and inverse butterfly circuits, and control circuits therefor.

2. Related Art

Bit manipulation operations are important features of modern microprocessors. Unfortunately, bit manipulation operations carried out by existing microprocessors are limited in terms of flexibility and ease of implementation at the hardware level. For example, bit manipulation operations performed by existing microprocessors are often limited to shift and rotate operations. Since a microprocessor is typically optimized around the processing of words (i.e., fixed-length groups of binary bits of information), it is not surprising that bit-level operations are not well-supported by current word-oriented microprocessors. Simple "bit-parallel" Boolean operations such as AND, OR, XOR, and NOT are usually supported as the "logical" operations of the Arithmetic-Logic Unit (ALU), the most fundamental functional unit of a microprocessor. However, only very simple non-bit-parallel operations are supported, such as shift and rotate operations, in which all bits of an operand move by the same amount. These operations are usually supported by separate shifter functional units.

A few microprocessor Instruction Set Architectures (ISAs) have more advanced bit operations. However, these operations are implemented by complex shifter functional unit circuitry, which appreciably adds to the size and complexity of the microprocessor. Examples of such operations include subword extract and deposit operations (e.g., "pextrw" and "pinsrw" operations in the INTEL IA-32 ISA), field extract and deposit operations (e.g., "extr" and "dep" operations in HEWLETT PACKARD PA-RISC or INTEL IA-64 ISAs), or rotate and mask operations (e.g., "rldimi" in POWERPC ISA). These can be viewed as variants of the basic shift or rotate operation operations, with certain bits masked out and set to zeros, or sign bits replicated, or bits from a second operand merged into the result. Additionally, some instruction sets have multimedia permute operations that rearrange the subwords packed into one or more registers (e.g., "mix" operation in HEWLETT PACKARD PA-RISC 2.0 and INTEL IA-64 architectures).

There are also many emerging applications, such as cryptography, imaging, and bioinformatics, where even more advanced bit manipulation operations are needed. While circuitry to achieve these operations can be built by assembling simple logical and shift operation circuits, or by implementing same in firmware, such approaches often result in very large circuits or slow execution speeds. Applications using these advanced bit manipulation operations would thus be significantly sped-up if the processor were able to support more powerful bit manipulation instructions. Such operations include arbitrary bit permutations, bit gather operations (performing multiple bit-field extract operations in parallel), and bit scatter operations (performing multiple bit-field deposit operations in parallel).

Accordingly, what would be desirable, but has not yet been provided, are shifter circuits utilizing butterfly and inverse butterfly circuits, and control circuits therefor, which address the foregoing shortcomings of existing microprocessors.

SUMMARY OF THE INVENTION

The present invention relates to microprocessor shifter circuits utilizing butterfly and inverse butterfly circuits, and control circuits therefor. The shifter circuits can be implemented in existing microprocessors, and allow for complex bit manipulations to be performed by such microprocessors at high speeds. The shifter circuits can perform butterfly and inverse butterfly operations, parallel extract and parallel deposit operations, group operations, mix operations, bit permutation operations, as well as instructions executed by existing microprocessors. The shifter circuits can replace existing shifter circuits in microprocessors, so as to provide new ways for conducting existing shift, rotate, extract, deposit, and mix operations, as well as more advanced bit manipulation instructions. The shifter circuits can be implemented with a reduced amount of circuitry, thus conserving chip space. User applications relating to steganography, binary image morphology, transfer coding, bioinformatics, imaging, and integer compression techniques, among other applications, can be implemented using the shifter circuits of the present invention. The shifter circuits can be provided in various combinations to provide microprocessor functional units which perform a plurality of bit manipulation processes.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to microprocessor shifter circuits utilizing butterfly and inverse butterfly circuits, and control circuits therefore, for performing complex bit manipulations at high speeds. The shifter circuits can perform butterfly and inverse butterfly operations, parallel extract and parallel deposit operations, group operations, mix operations, permutation operations, as well as instructions executed by existing microprocessors. The shifter circuits can be provided in various combinations to provide microprocessor functional units which perform a plurality of bit manipulation processes.

Figure 1:
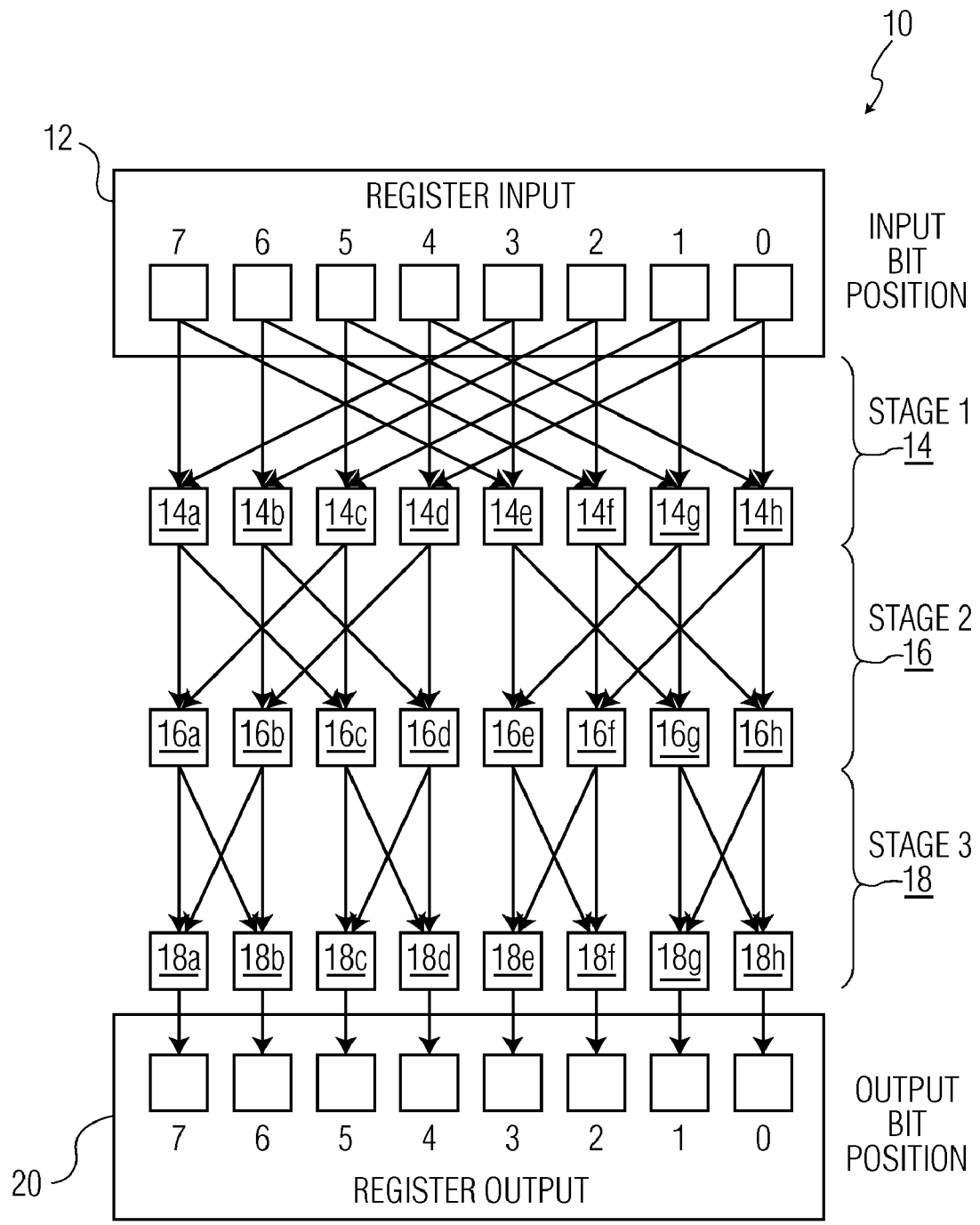
FIG. 1 is a diagram showing a first embodiment of the shifter circuit of the present invention, implemented using a butterfly circuit.

FIG. 1 is a diagram showing a first embodiment of the shifter circuit 10 of the present invention. The shifter circuit 10 includes a register input 12, a first shifter stage 14, a second shifter stage 16, and a third shifter stage 18, and a register output 20. The shifter circuit 10 can replace shifter circuits of existing processors. By the term "processor," it is meant a microprocessor (or other circuitry of existing microprocessors which perform bit operations, such as those discussed above) or any other type of processor, such as digital signal processors, embedded processors, cryptoprocessors, communications processors, System-On-Chip(s) (SOC), etc. The register input 12 and output 20 are showing having a width of 8 bits (i.e., bit positions 0 through 7), but it is to be understood that any desired bit widths could be accommodated. The circuit stages 14-18 and their associated interconnections form a butterfly circuit, wherein the first stage 14 includes multiplexers 14$a$-14$h$, the second stage 16 includes multiplexers 16$a$-16$h$, and the third stage includes multiplexers 18$a$-18$h$. As discussed below, the bit width of the circuit 10 determines the number of stages in the circuit.

Figure 2:
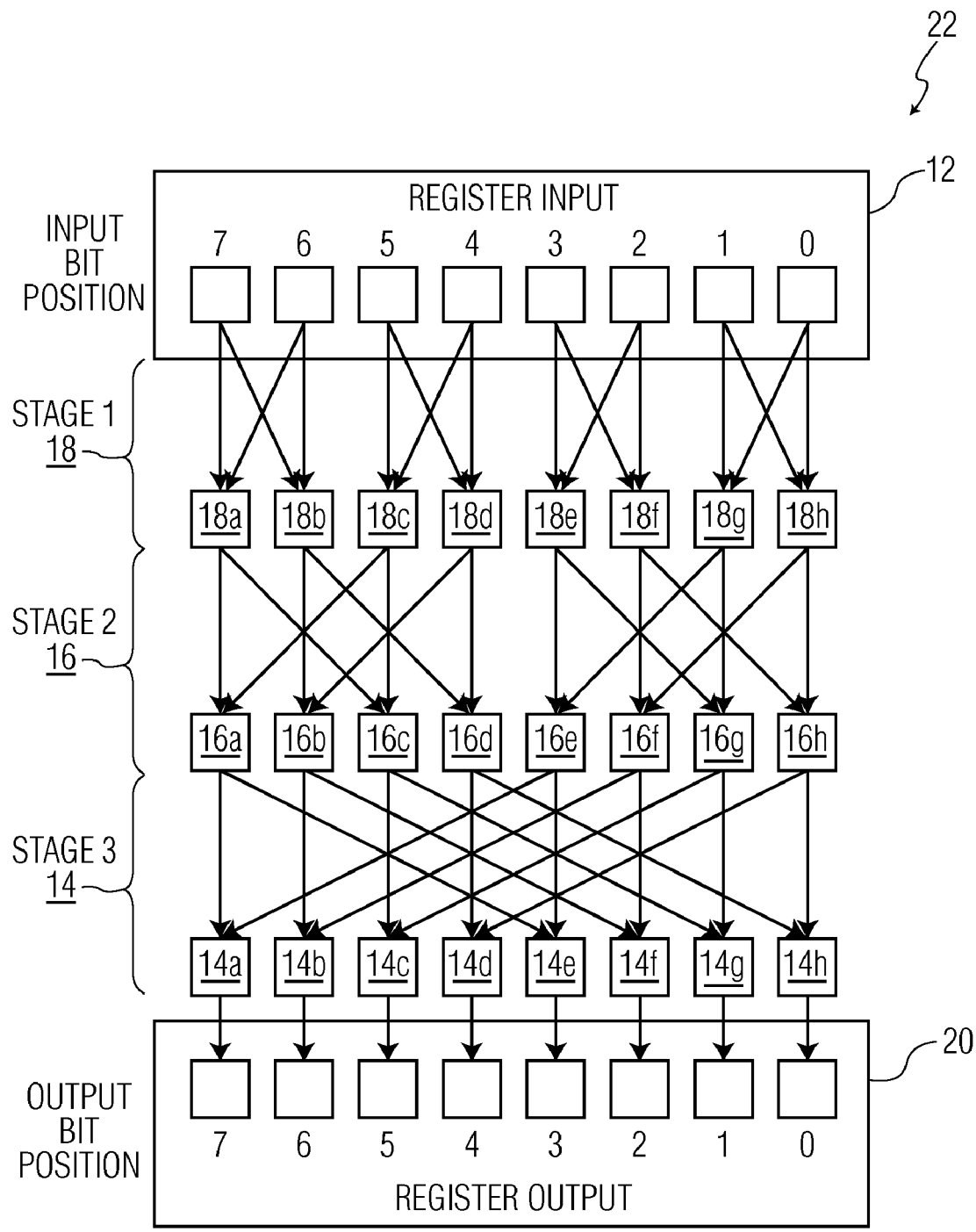
FIG. 2 is a diagram showing another embodiment of the shifter circuit of the present invention, implemented using an inverse butterfly circuit.

FIG. 2 is a diagram showing a second embodiment of the shifter circuit of the present invention, indicated generally at 22, wherein an inverse butterfly configuration is shown. As can be seen, the circuit stages 14-18 and their associated interconnections are reversed, such that the circuit stage 18 is provided as the first circuit stage and is connected to the register input 12, and the circuit stage 14 is provided as the third circuit stage and is interconnected to the register output 20. The circuit stage 16 remains the second circuit stage, interconnected between the first and third circuit stages 18 and 14. As mentioned above, the shifter circuit 22 can replace shifter circuits of existing microprocessors (or other circuitry of existing microprocessors which perform bit operations, such as those discussed above), and any desired bit width could be provided.

The shifter circuits 10 and 22 could be implemented in a microprocessor individually, or they could be connected to each other to form a Benes network, which is a general permutation network. The butterfly configuration of the circuit 10 is referred to herein as "bfly," and the inverse butterfly configuration of the circuit 22 is referred to herein as "ibfly." A single execution of bfly followed by ibfly (or vice versa) can achieve any of the n! permutations of n bits in, at most, 2 instruction cycles of a microprocessor.

The circuits shown in FIGS. 1-2 represent n-bit circuits of lg(n) stages, wherein each stage comprises n/2 2-input switches (n being any desired bit width, generally a power of 2). Each of these circuits takes at most one processor cycle, since they are less complicated than an ALU of the same width (a processor cycle is assumed to be normalized to the latency of an ALU). Further, as discussed in greater detail below, each switch is composed of two 2:1 multiplexers, totaling n×lg(n) multiplexers for each circuit, which results in small circuit area.

Figure 3:
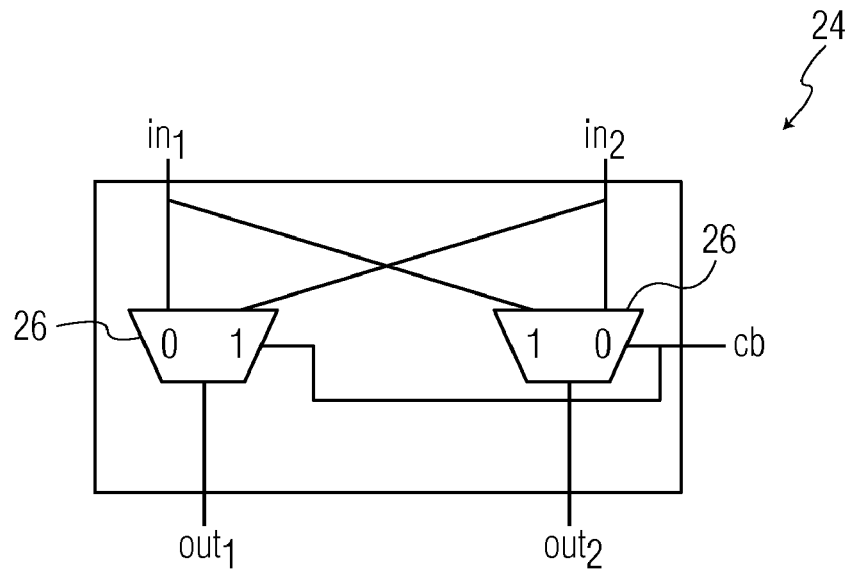
FIGS. 3-4 are circuit diagrams showing, in greater detail, multiplexers utilized by the shifter circuit of the present invention.

Each of the circuit stages 14-18 of FIGS. 1-2 has n/2 switches, with a pair of inputs going into each switch and a pair of outputs coming out. For each switch, the inputs either pass through to the outputs, or they are swapped, as shown in FIG. 3 described below. In the ith stage (i starting from 1), the paired bits are $n/2^i$ positions apart for the butterfly circuit shown in FIG. 1, and $2^{i-1}$ positions apart for the inverse butterfly circuit shown in FIG. 2. A switch either passes through or swaps its inputs based on the value of a control bit. Thus, the operation requires n/2×lg(n) control bits. For n=64, four 64-bit registers are required to hold the 64 data bits and the 32×6 control bits.

An embodiment of the present invention provides an architecture that has only 2 source operands per instruction, and which utilizes 3 Application Registers ($ar.b_1$, $ar.b_2$, $ar.b_3$) associated with the functional unit to supply the control bits during the execution of these instructions. Application Registers are registers which are already available in some Instruction Set Architectures (also abbreviated ISAs), such as the INTEL IA-64 ISA. The control bits are determined either statically by a compiler, or dynamically by software. Other permutation primitives like "grp" discussed below, do not require Application Registers. An arbitrary permutation of the n bits within a register can be performed by a sequence of at most lg(n) grp instructions, or by a sequence of at most 2 instructions using bfly and ibfly instructions. The latter (bfly and ibfly) achieve arbitrary n-bit permutations in O(1) cycles, rather than O(lg(n)) cycles.

FIG. 3 is a circuit diagram showing a switch 24 according to the present invention formed from a pair of 2:1 multiplexers 26. The switch 24 corresponds to a pair of multiplexers shown in FIGS. 1-2, e.g., multiplexers 14a and 14e of FIG. 2 form a single switch 24. Each switch 24 receives two input bits ($in_1$ and $in_2$) and generates two output bits ($out_1$ and $out_2$) which depend on the value of a control bit (cb). If the control bit is set to zero, the circuit 24 passes the input bits directly through as the output bits (i.e., $out_1=in_1$, and $out_2=in_2$). If the control bit is set to one, the circuit 24 swaps the positions of the input bits and passes the swapped bits as the output bits (i.e., $out_2=in_1$, and $out_1=in_2$). In certain embodiments, the two functions of the control bit are swapped.

Figure 4:
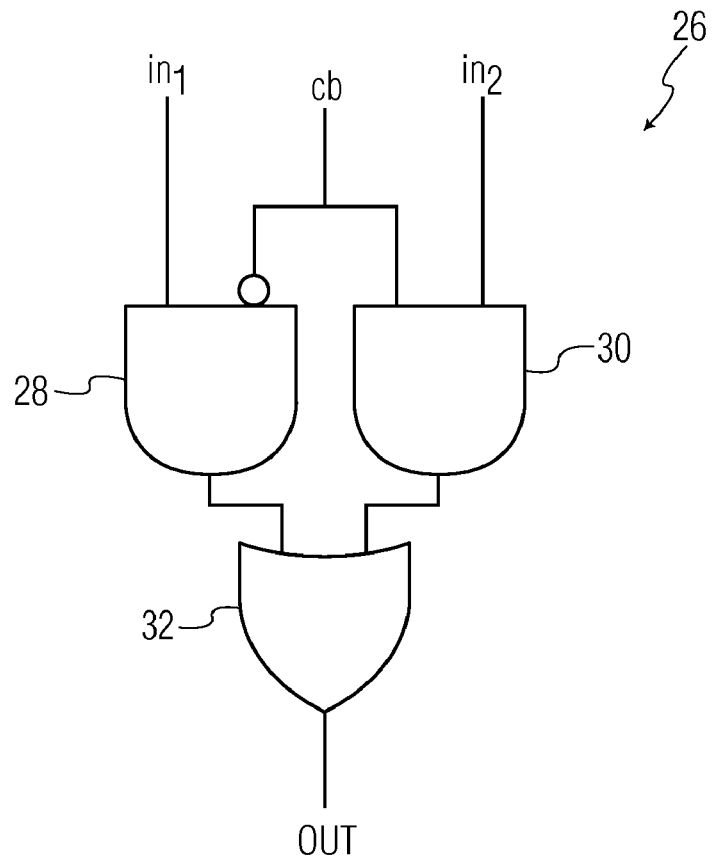

FIG. 4 is a circuit diagram showing an implementation of the multiplexers 26 of FIG. 3 in greater detail. Each of the multiplexers 26 includes a first AND gate 28 having a single inverted input, a second AND gate 30, and an OR gate 32. The control bit cb is provided as inputs to both gates 28 and 30. It is noted that any other suitable circuit configuration for implementing the multiplexers 26 could be utilized without departing from the spirit or scope of the present invention.

Figure 5:
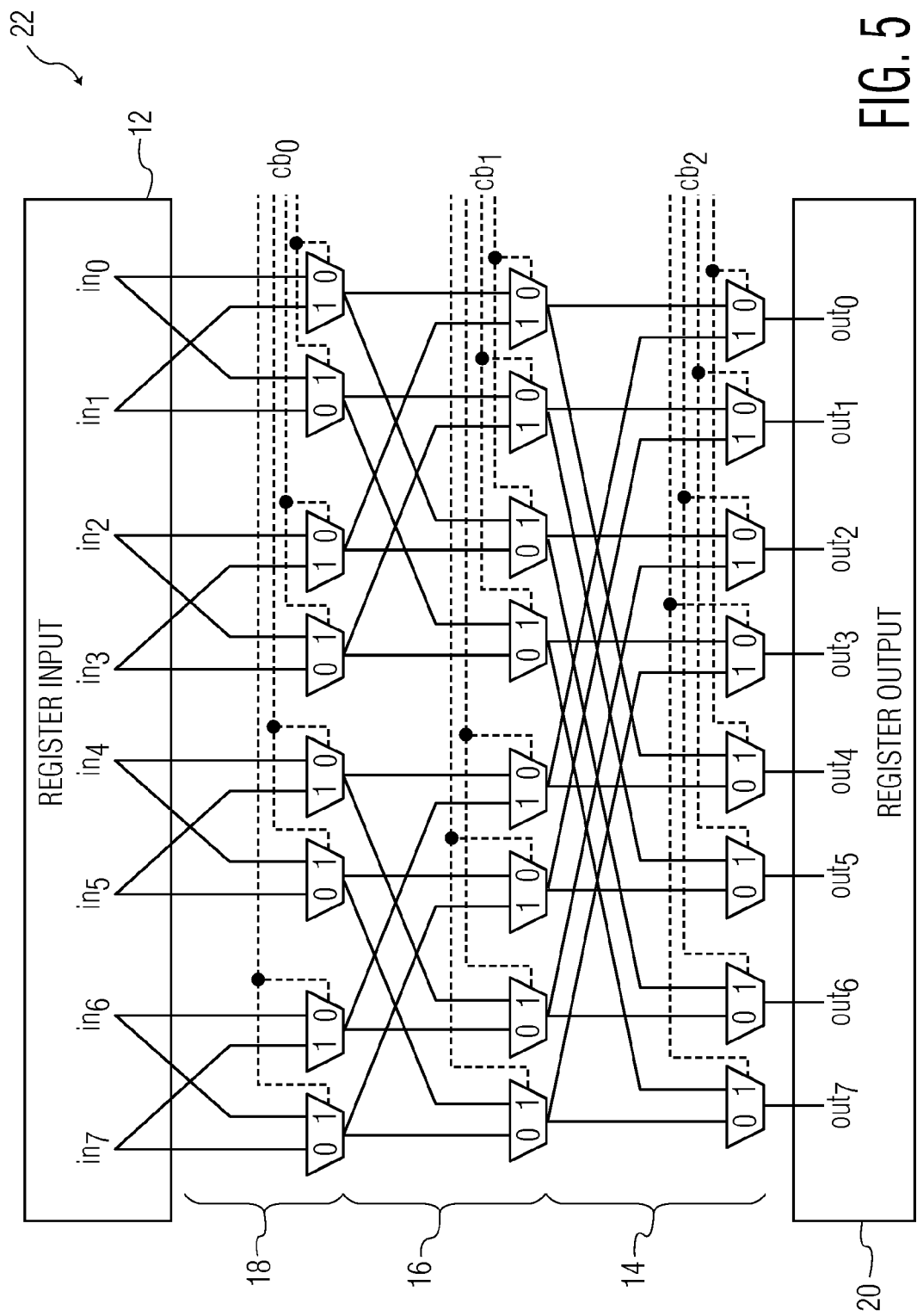
FIG. 5 is a circuit diagram showing the butterfly circuit shifter circuit of the present invention implemented using the multiplexer shown in FIG. 4.

FIG. 5 is a circuit diagram showing the shifter circuit 22 of FIG. 2 implemented using the 2:1 multiplexers of FIGS. 3-4. As can be seen, each of the circuit stages 14-18 utilizes eight 2:1 multiplexers. Control bits $cb_0$-$cb_2$ are supplied to the multiplexers of the circuit stages 14-18 to control operation of the multiplexers. Each of the control bits $cb_0$, $cb_1$ and $cb_2$ represents 4 control bits. The generation of control bits in accordance with the present invention is discussed in further detail herein below.

Figure 6:
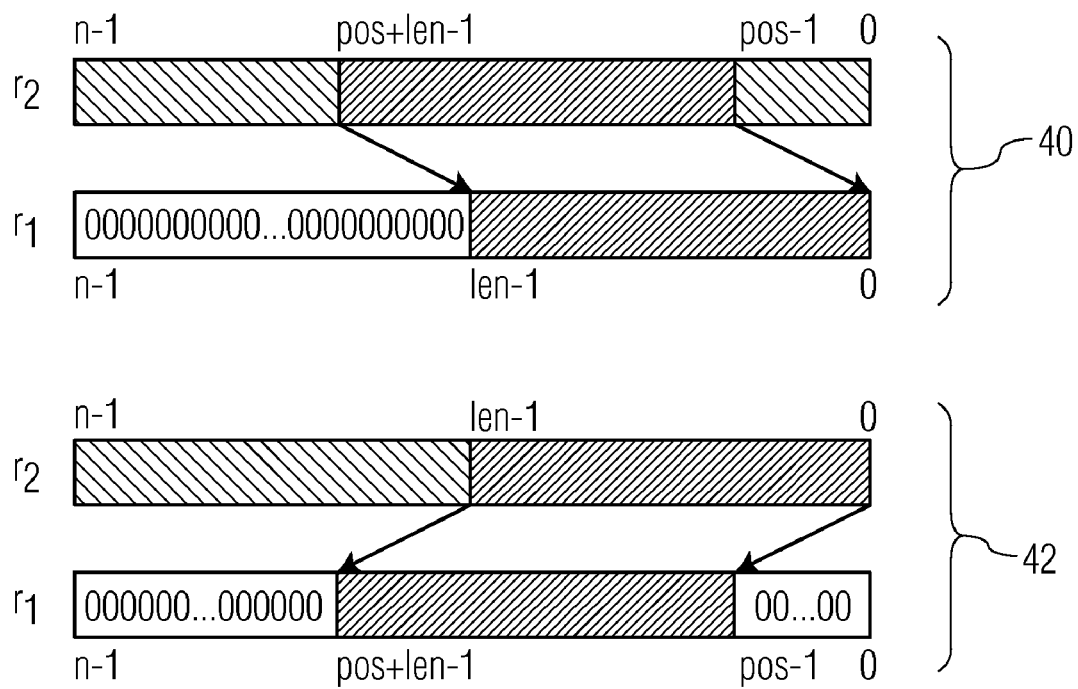
FIG. 6 is a diagram showing bit extract and deposit operations capable of being performed by the present invention.

FIG. 6 is a diagram showing bit extract and deposit operations capable of being performed by the present invention. The extract operation, indicated at 40, selects a single field of bits of arbitrary length from any arbitrary position in the source register (i.e., register input 12 in FIGS. 1-2) and right justifies that field in the register output 20 in FIGS. 1-2. This is equivalent to a shift right and mask operation. The extract operation has both unsigned and signed variants. In the latter, the sign bit of the extracted field is propagated to the most-significant bit of the destination register (i.e., register output 20 in FIGS. 1-2). The deposit operation, indicated at 42, takes a single right-justified field of arbitrary length from the source register (i.e., register input 12 in FIGS. 1-2) and deposits it at any arbitrary position in the destination register (i.e., register output 20 in FIGS. 1-2). The deposit operation is equivalent to a left shift and mask operation. Two variants of the deposit operation are possible: the remaining bits can be zeroed out (as shown at 42 in FIG. 6), or they can be supplied from a second register, in which case a masked merge operation is required.

Figure 7:
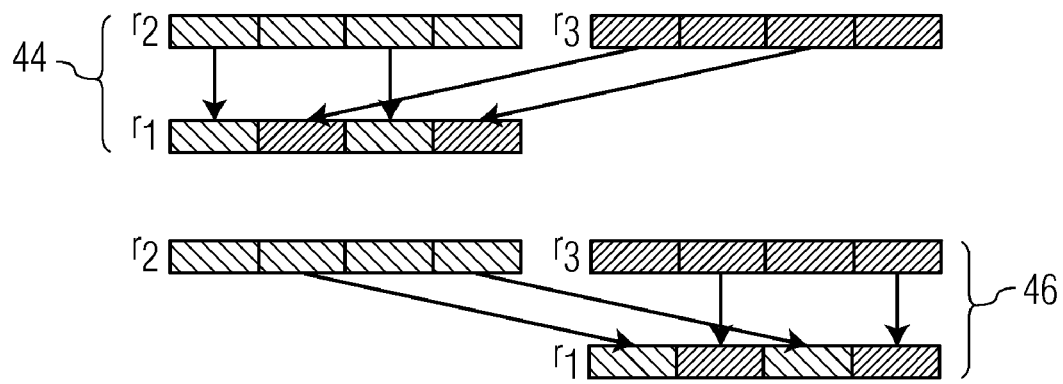
FIG. 7 is a diagram showing bit mix operations capable of being performed by the present invention.

FIG. 7 is a diagram showing bit mix operations capable of being performed by the present invention. The mix operation is a known subword permutation operation, initially designed to accelerate multimedia applications operating on subwords of 8, 16, or 32 bits, packed into a word. The "Mix_left" operation selects the left subwords from each pair of subwords, alternating between the two source registers $r_2$ and $r_3$, as illustrated at 44 in FIG. 7. The "Mix_right" operation does the same on the right subwords of the two source registers, as shown at 46 in FIG. 7. Advantageously, the present invention allows for mixing of subwords smaller than a byte, which is useful for bit matrix transposition and fast parallel sorting procedures. Mix operations for bits, as well as all subword sizes that are powers of 2, are supported by the present invention. This includes 12 mix operations: mix_left and mix_right for each of 6 subword sizes of $2^0, 2^1, 2^2, 2^3, 2^4, 2^5$, for a 64-bit processor. Additionally, the present invention also allows for mixing of bit-fields that are not powers of 2, or of different sizes, as long as the sum of the field sizes equals n, the width of the registers.

Figure 8:
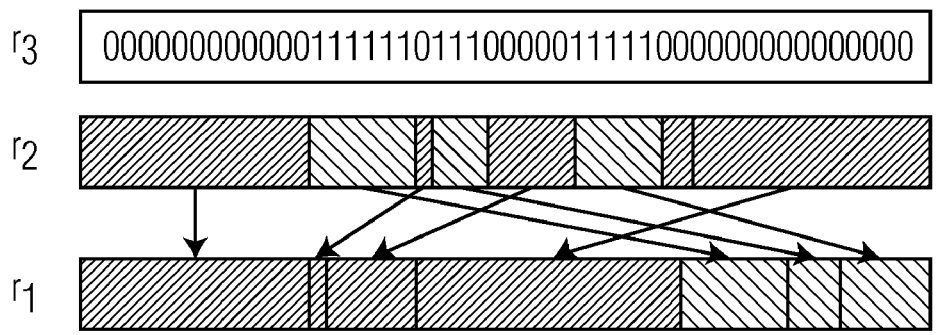
FIG. 8 is a diagram showing the group (grp) instruction capable of being performed by the present invention.

FIG. 8 is a diagram showing the group (grp) instruction capable of being performed by the present invention. The grp instruction is a permutation primitive that gathers to the right the data bits selected by "1"s in the mask, and to the left those selected by "0"s in the mask. Arbitrary bit permutations can be accomplished by a sequence of at most lg(n) of these grp instructions. Its advantage over the faster sequence of 2 instructions (bfly followed by ibfly) for achieving arbitrary n-bit permutations is that it does not need additional (control or application) registers to configure its datapath.

Figure 9:
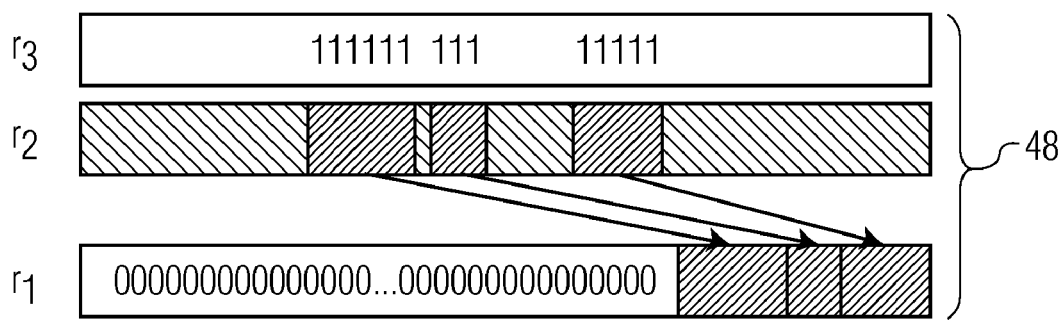
FIG. 9 is a diagram showing parallel extract and parallel deposit operations which are capable of being performed by the present invention.
Figure 9:
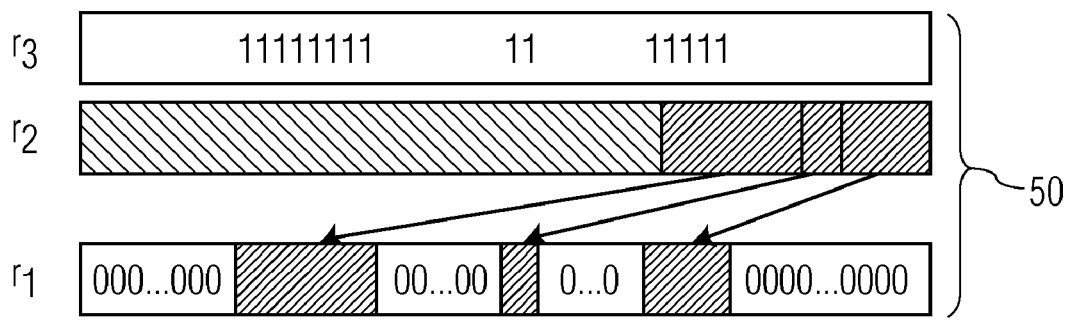

FIG. 9 is a diagram showing parallel extract and parallel deposit operations, indicated generally at 48 and 50, respectively, which are capable of being performed by the present invention. The parallel extract ("pex") and parallel deposit ("pdep") instructions can be viewed as generalizations of the extract and deposit instructions discussed above. Parallel extract performs a bit gather operation; it extracts and compacts bits from one source register from positions selected by "1"s in a second source register (as shown at 48 in FIG. 9). The rest of the bits in the result register are cleared to "0"s. Thus, the parallel extract operation can also be thought of as the right half of the grp operation (grp_right). Parallel deposit performs a bit scatter operation; it deposits bits from one source register to positions selected by "1"s in a second source register (as shown at 50 in FIG. 9). The remaining bits in the result register are cleared to "0"s.

The present invention can support a number of bit manipulation operations, which could be implemented as instructions which are added to the existing instruction set of a microprocessor. These instructions are summarized in Table 1 below:

TABLE 1

| Instruction | Description |
| --- | --- |
| rotr $r_1 = r_2$, shamt | Right rotate of $r_2$. The rotate amount is an immediate in the opcode (shamt). |
| rotr $r_1 = r_2, r_3$ | Right rotate of $r_2$. The rotate amount is specified using a second source register $r_3$. |
| rotl $r_1 = r_2$, shamt | Left rotate of $r_2$. The rotate amount is an immediate in the opcode (shamt). |
| rotl $r_1 = r_2, r_3$ | Left rotate of $r_2$. The rotate amount is specified using a second source register $r_3$. |
| shr $r_1 = r_2$, shamt | Right shift of $r_2$ with vacated positions on the left filled with the sign bit (most significant bit of $r_2$). The shift amount is an immediate in the opcode. |

TABLE 1-continued

| Instruction | Description |
| --- | --- |
| shr $r_1 = r_2, r_3$ | Right shift of $r_2$ with vacated positions on the left filled with the sign bit (most significant bit of $r_2$). The shift amount is specified using a second source register $r_3$. |
| shr.u $r_1 = r_2$, shamt | Right shift of $r_2$ with vacated positions on the left zero-filled. The shift amount is an immediate in the opcode. |
| shr.u $r_1 = r_2, r_3$ | Right shift of $r_2$ with vacated positions on the left zero-filled. The shift amount is specified using a second source register $r_3$. |
| shl $r_1 = r_2$, shamt | Left shift of $r_2$ with vacated positions on the right zero-filled. The shift amount is an immediate in the opcode. |
| shl $r_1 = r_2, r_3$ | Left shift of $r_2$ with vacated positions on the right zero-filled. The shift amount is specified using a second source register $r_3$. |
| extr $r_1 = r_2$, pos, len | Extraction and right justification of single field from $r_2$ of length len from position pos. The high order bits are filled with the sign bit of the extracted field. |
| extr.u $r_1 = r_2$, pos, len | Extraction and right justification of single field from $r_2$ of length len from position pos. The high order bits are zero-filled. |
| dep.z $r_1 = r_2$, pos, len | Deposit at position pos of single right justified field from $r_2$ of length len. Remaining bits are zero-filled. |
| dep $r_1 = r_2, r_3$, pos, len | Deposit at position pos of single right justified field from $r_2$ of length len. Remaining bits are merged from second source register $r_3$. |
| mix {r,l} {0,1,2,3,4,5} $r_1 = r_2, r_3$ | Select right or left subword from a pair of subwords, alternating between source registers $r_2$ and $r_3$. Subword sizes are $2^i$ bits, for i = 0, 1, 2, . . . , 5, for a 64-bit processor. |
| bfly $r_1 = r_2$, ar.$b_1$, ar.$b_2$, ar.$b_3$ | Perform Butterfly permutation of data bits in $r_2$ |
| ibfly $r_1 = r_2$, ar.$ib_1$, ar.$ib_2$, ar.$ib_3$ | Perform Inverse Butterfly permutation of data bits in $r_2$ |
| pex $r_1 = r_2, r_3$, ar.$ib_1$, ar.$ib_2$, ar.$ib_3$ | Parallel extract, static: Data bits in $r_2$ selected by a pre-decoded mask $r_3$ are extracted, compressed and right-aligned in the result $r_1$ |
| pdep $r_1 = r_2, r_3$, ar.$b_1$, ar.$b_2$, ar.$b_3$ | Parallel deposit, static: Right-aligned data bits in $r_2$ are deposited, in order, in result $r_1$ at bit positions marked with a "1" in the statically-decoded mask $r_3$ |
| mov ar.x = $r_2, r_3$ | Move values from GRs to ARs, to set controls (calculated by software) for pex, pdep, bfly or ibfly |
| pex.v $r_1 = r_2, r_3$ | Parallel extract, variable: Data bits in $r_2$ selected by a dynamically-decoded mask $r_3$ are extracted, compressed and right-aligned in the result $r_1$. |
| pdep.v $r_1 = r_2, r_3$ | Parallel deposit, variable: Right-aligned data bits in $r_2$ are deposited, in order, in bit positions marked with a "1" in the dynamically-decoded mask $r_3$. |
| setib ar.$ib_1$, ar.$ib_2$, ar.$ib_3$ = $r_3$ | Set inverse butterfly circuit controls in associated ARs, using hardware decoder to translate the mask $r_3$ to inverse butterfly controls. |
| setb ar.$b_1$, ar.$b_2$, ar.$b_3$ = $r_3$ | Set butterfly circuit controls in associated ARs, using hardware decoder to translate the mask $r_3$ to butterfly controls. |

The conventional shifter instructions executed by existing microprocessors and listed in the top half of Table 1 above (i.e., above the dotted line in Table 1) can also be implemented by the present invention, since they are all based upon rotation operations. The additional functions implemented by the present invention are listed in the bottom half of Table 1 (i.e., below the dotted line in Table 1). An inverse butterfly circuit can achieve any rotation (cyclic shift) of its input, and can perform the following on its input: right and left shifts, extract operations, deposit operations, and mix operations. These operations can be modeled as a rotate operation with additional logic handling zeroing or sign extension from an arbitrary position, or merging bits from the second source operand (for deposit). Mix operations can be modeled as a rotate of one operand by the subword size and then a merge of subwords alternating between the two operands. Since inverse butterfly circuits only perform permutations without zeroing and without replication, an extra 2:1 multiplexer stage at the end of the shifter circuits of the present invention either selects the rotated bits as-is or other bits which are computed as either zero, or the sign bit (replicated), or the bits of the second source operand, depending on the operation.

Figure 10:
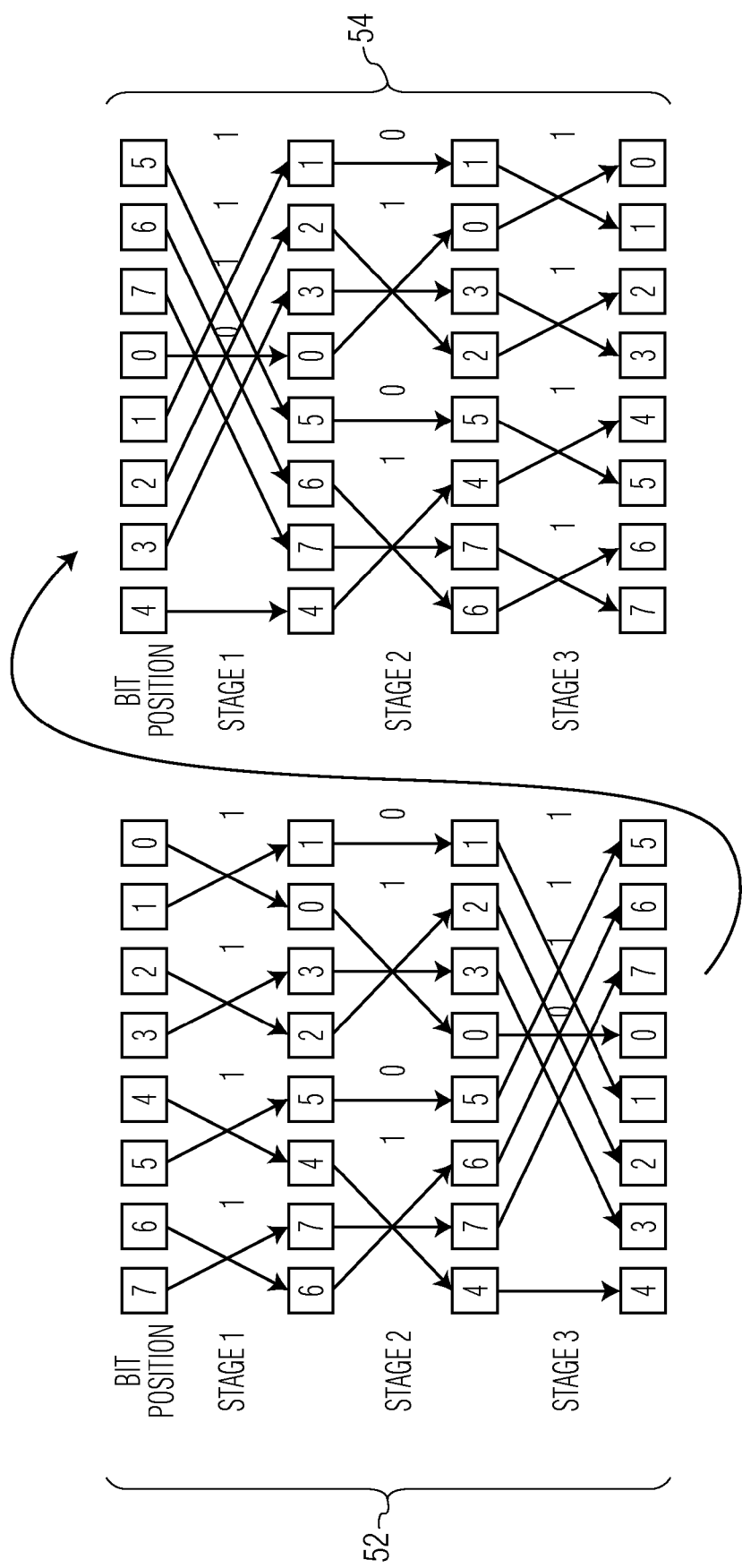
FIG. 10 is a diagram showing symmetrical operations performed by the inverse butterfly and butterfly embodiments of the present invention.

FIG. 10 is a diagram showing symmetrical operations performed by the inverse butterfly (indicated at 52) and butterfly (indicated at 54) embodiments of the present invention. The butterfly and inverse butterfly circuits implemented by the present invention exhibit a reverse symmetry of their stages from input to output. Thus, a rotation on the inverse butterfly circuit is equivalent to a rotation in the opposite direction on the butterfly circuit. Hence, a butterfly circuit can also achieve any rotation of its inputs. A butterfly circuit enhanced with an extra multiplexer stage at the end (as implemented in the present invention) is needed to handle zeroing or sign extension, or merging bits from the second source operand.

The generation of control bits for the shifter circuits of the present invention is now discussed with reference to FIGS. 11-13. To achieve a right (or left) rotation by s positions, for s=0, 1, 2 . . . n−1, using the n-bit wide inverse butterfly circuit with lg(n) stages, the input must be right (or left) rotated by s mod $2^j$ within each $2^j$-bit wide inverse butterfly circuit at each stage j. This is because from stage j+1 on, the inverse butterfly circuit can only move bits at granularities larger than $2^j$ positions (so the finer movements must have already been performed in the prior stages).

An n-bit inverse butterfly circuit can be viewed as two (lg(n)−1)-stage circuits followed by a stage that swaps or passes through paired bits that are n/2 positions apart. To right_rotate the input $\{in_{n-1}, \ldots in_0\}$ by s positions, the two (lg(n)−1)-stage circuits must have right_rotated their half inputs by s'=s mod n/2 and the input to stage lg(n) must be of the form;

$$\{in_{n/2+s'-1} \ldots in_{n/2}in_{n-1} \ldots in_{n/2+2+s}\|in_{s'-1} \ldots in_0 in_{n/2-1} \ldots in_{s'}\} \quad (1)$$

which is true for s less than or greater than n/2.

Figure 11:
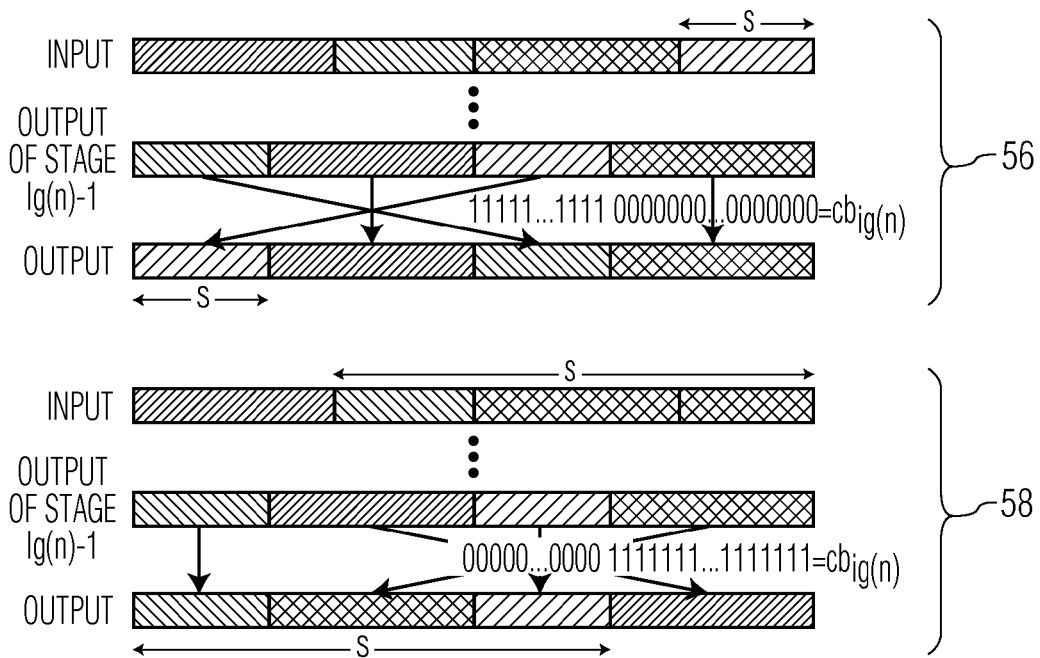
FIGS. 11-12 are diagrams showing control bit states corresponding to bit manipulation procedures.

As shown at 56 in FIG. 11, when the rotation amount s is less than n/2, then the bits that wrapped around in the (lg(n)−1)-stage circuits (indicated by hatching in FIG. 11) must be swapped in the final stage to yield the input right rotated by s:

$$\{in_{s'-1} \ldots in_0 in_{n-1} \ldots in_{n/2+s}\|in_{n/2+s'-1} \ldots in_{n/2}in_{n/2-1} \ldots in_{s'}\} \quad (2)$$

When the rotation amount is greater than or equal to n/2 then the bits that do not wrap in the F (lg(n)−1)-stage circuits (solid) must be swapped in the final stage to yield the input right_rotated by s (as illustrated at 58 in FIG. 11):

$$\{in_{n/2+s'-1} \ldots in_{n/2}in_{n/2-1} \ldots in_{s'} \| in_{s'-1}in_0 in_{n-1} \ldots in_{n/2+s'}\}. \quad (3)$$

Figure 12:
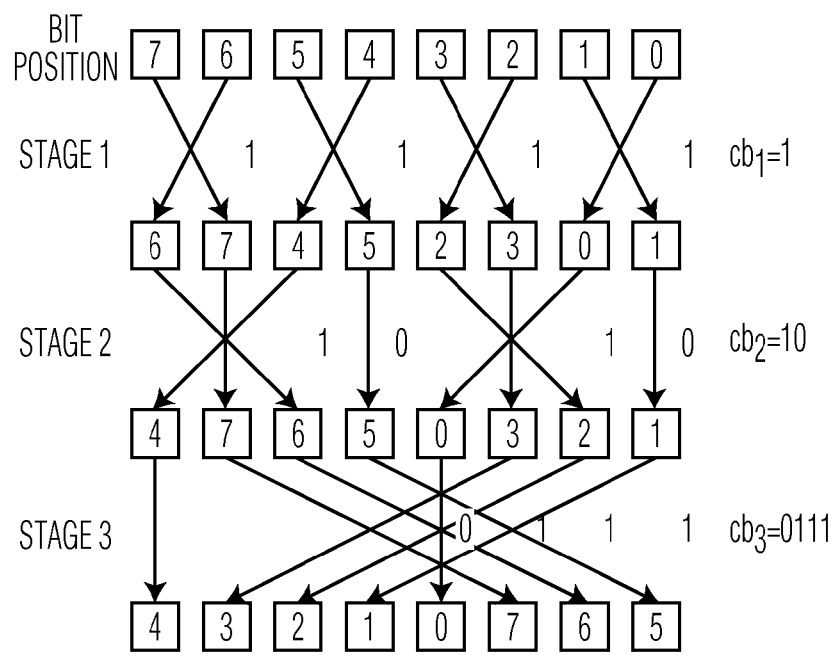

For example, consider the 8-bit inverse butterfly circuit with right rotation amount s=5, depicted in FIG. 12. As s=5 is greater than n/2=4, the bits that did not wrap in stage 2 are swapped in stage 3 to yield the final result. As the rotation amount through stage 2, s mod $2^{2=5}$ mod 4=1, is less than n/4=2, the bits that did wrap in stage 1 are swapped in stage 2 to yield the input to stage 3. As the rotation amount through stage 1, s mod $2^1$=5 mod 2=1, is equal to than n/8=1, the bits that did not wrap in the input, i.e., all the bits, are swapped in stage 1 to yield the input to stage 2.

One can mathematically derive recursive equations for the control bits, $cb_j$, j=1, 2, … lg(n), for achieving rotations on an inverse butterfly datapath. These equations yield the compact circuit shown in FIG. 13 for the rotation control bit generator. The process for generating these equations is now discussed.

From Equations 1-3 and FIG. 11, it is observed that the pattern for the control bits for the final stage, which is referred to as $Cb_{lg(n)}$, for a rotate of s bits, is:

$$cb_{lg(n)} = \begin{cases} 1^s \| 0^{n/2-s}, & s < n/2 \\ 0^{s-n/2} \| 1^{n/2-(s-n/2)}, & s \geq n/2 \end{cases} \quad (4)$$

where $a^k$ is a string of k "a"s, "1" means swap and "0" means "pass through." Note that s=s mod n/2 when s<n/2 and s−n/2=s mod n/2 when s≥n/2:

$$cb_{lg(n)} = \begin{cases} 1^{s \bmod n/2} \| 0^{n/2(s \bmod n/2)}, & s \bmod n < n/2 \\ 0^{s \bmod n/2} \| 1^{n/2-(s \bmod n/2)}, & s \bmod n \geq n/2 \end{cases} \quad (5)$$

$$cb_{lg(n)} = \begin{cases} 1^{s \bmod n/2} \| 0^{n/2-(s \bmod n/2)}, & s \bmod n < n/2 \\ \sim (1^{s \bmod n/2} \| 0^{n/2-(s \bmod n/2)}), & s \bmod n \geq n/2 \end{cases}$$

where ~ indicates negation.

Due to the recursive structure of the inverse butterfly circuit, Equation 5 can be generalized by substituting j for lg(n), $2^j$ for n and $2^{j-1}$ for n/2:

$$cb_j = \begin{cases} 1^{s \bmod 2^{j-1}} \| 0^{2^{j-1}-(s \bmod 2^{j-1})}, & s \bmod 2^j < 2^{j-1} \\ \sim (1^{s \bmod 2^{j-1}} \| 0^{2^{j-1}-(s \bmod 2^{j-1})}), & s \bmod 2^j \geq 2^{j-1} \end{cases} \quad (6)$$

There are j bits in s mod $2^j$, with the most significant bit denoted $s_{j-1}$. The condition s mod $2^j < 2^{j-1}$ is equivalent to $s_{j-1}$ being equal to 0 and the condition s mod $2^j \geq 2^{j-1}$ is equivalent to $s_{j-1}$ being equal to 1:

$$cb_j = \begin{cases} 1^{s \bmod 2^{j-1}} \| 0^{2^{j-1}-(s \bmod 2^{j-1})}, & s_{j-1} = 0 \\ \sim (1^{s \bmod 2^{j-1}} \| 0^{2^{j-1}-(s \bmod 2^{j-1})}), & s_{j-1} = 1 \end{cases} \quad (7)$$

Equation 7 can be rewritten as the pattern XORed with $s_{j-1}$:

$$cb_j = (1^{s \bmod 2^{j-1}} \| 0^{2^{j-1}-(s \bmod 2^{j-1})}) \oplus s_{j-1} \quad (8)$$

Since s mod k≤k−1, k−(s mod k)≥1 and hence the length of the string of zeros in Equation 8 is always ≥1 (k=$2^{j-1}$). Consequently, the least significant bit of the pattern (prior to XOR with $s_{j-1}$) is always "0":

$$cb_j = (1^{s \bmod 2^{j-1}} \| 0^{2^{j-1}-1-(s \bmod 2^{j-1})} \| 0) \oplus s_{j-1}$$

$$cb_j((1^{s \bmod 2^{j-1}} \| 0^{2^{j-1}-1-(s \bmod 2^{j-1})}) \oplus s_{j-1}) \| s_{j-1} \quad (9)$$

The bit pattern inside the inner parenthesis of the bottom Equation 9 is referred to as $f(s, j)$, a string of $2^{j-1}-1$ bits with the s mod $2^{j-1}$ leftmost bits set to "1" and the remaining bits set to "0." This function is only defined for j≥2 and returns the empty string for j=1.

$$f(s, j) = \begin{cases} 1^{s \bmod 2^{j-1}} \| 0^{2^{j-1}-1-(s \bmod 2^{j-1})}, & j \geq 2 \\ \{\}, & j = 1 \end{cases} \quad (10)$$

$$cb_j = (f(s,j) \oplus s_{j-1}) \| s_{j-1} \quad (11)$$

Note that one can derive $f(s,j+1)$ from $f(s, j)$:

$$f(s,j+1) = 1^{s \bmod 2^j} \| 0^{2^j-1-(s \bmod 2^j)} \quad (12)$$

If bit $s_{j-1}$=0 then s mod $2^j$=s mod $2^{j-1}$:

$$f(s, j+1) = 1^{s \bmod 2^{j-1}} \| 0^{2^j-1-(s \bmod 2^{j-1})} \quad (13)$$

$$= 1^{s \bmod 2^{j-1}} \| 0^{2^{j-1}-1-(s \bmod 2^{j-1})} \| 0^{2^{j-1}}$$

$$f(s, j+1) = f(s, j) \| 0^{2^{j-1}}$$

If bit $s_{j-1}$ then s mod $2^j = 2^{j-1}$+s mod S $2^{j-1}$:

$$f(s, j+1) = 1^{2^{j-1}+s \bmod 2^{j-1}} \| 0^{2^j-1-(2^{j-1}+s \bmod 2^{j-1})} \quad (14)$$

$$= 1^{2^{j-1}} \| 1^{s \bmod 2^{j-1}} \| 0^{2^{j-1}-1-(s \bmod 2^{j-1})}$$

$$f(s, j+1) = 1^{2^{j-1}} \| f(s, j)$$

Combining Equations 13 and 14, we get:

$$f(s, j+1) = \begin{cases} f(s, j) \| 0^{2^{j-1}}, & s_{j-1} = 0 \\ 1^{2^{j-1}} \| f(s, j), & s_{j-1} = 1 \end{cases} \quad (15)$$

$$f(s, j+1) = \begin{cases} f(s, j) \| 0 \| 0^{2^{j-1}-1}, & s_{j-1} = 0 \\ 1^{2^{j-1}-1} \| 1 \| f(s, j), & s_{j-1} = 1 \end{cases}$$

Since $f(s, j)$ is a string of $2^{j-1}-1$ bits, we can replace the string of ones in the lower Equation 15 by $f(s, j)$ ORed (+) with 0 or 1, respectively. Similarly, we can replace the string of zeros in Equation 15 by $f(s, j)$ ANDed (·) with 0 or 1, respectively. The value of $s_{j-1}$ determines whether 0 or 1 is used:

$$f(s, j+1) = \begin{cases} f(s, j) + 0 \| 0 \| f(s, j) \cdot 0, & s_{j-1} = 0 \\ f(s, j) + 1 \| 1 \| f(s, j) \cdot 1, & s_{j-1} = 1 \end{cases} \quad (16)$$

$$f(s, j+1) = (f(s, j) + s_{j-1}) \| s_{j-1} \| (f(s, j) \cdot s_{j-1})$$

From Equations 10 and 16 we obtain a simple recursive expression for $f(s, j)$:

$$f(s,j) = \begin{cases} (f(s,j-1)+s_{j-2}\|s_{j-2}\|(f(s,j-1)\cdot s_{j-2}), & j \geq 2 \\ \{\}, & j=1 \end{cases} \quad (17)$$

Equation 11 shows a method for getting the j/2 control bits $cb_j$ for the switches in any stage j of the inverse butterfly circuit using a recursive function f(s, j) and a bit $s_{j-1}$ from the shift amount s. This can also be seen in FIG. 13, described below. For a rotation, every bit moves by the same amount, namely the shift amount s. Hence, the control bits to subsets of switches, belonging to the smaller inverse butterfly circuits up to that stage, are the same.

Figure 13:
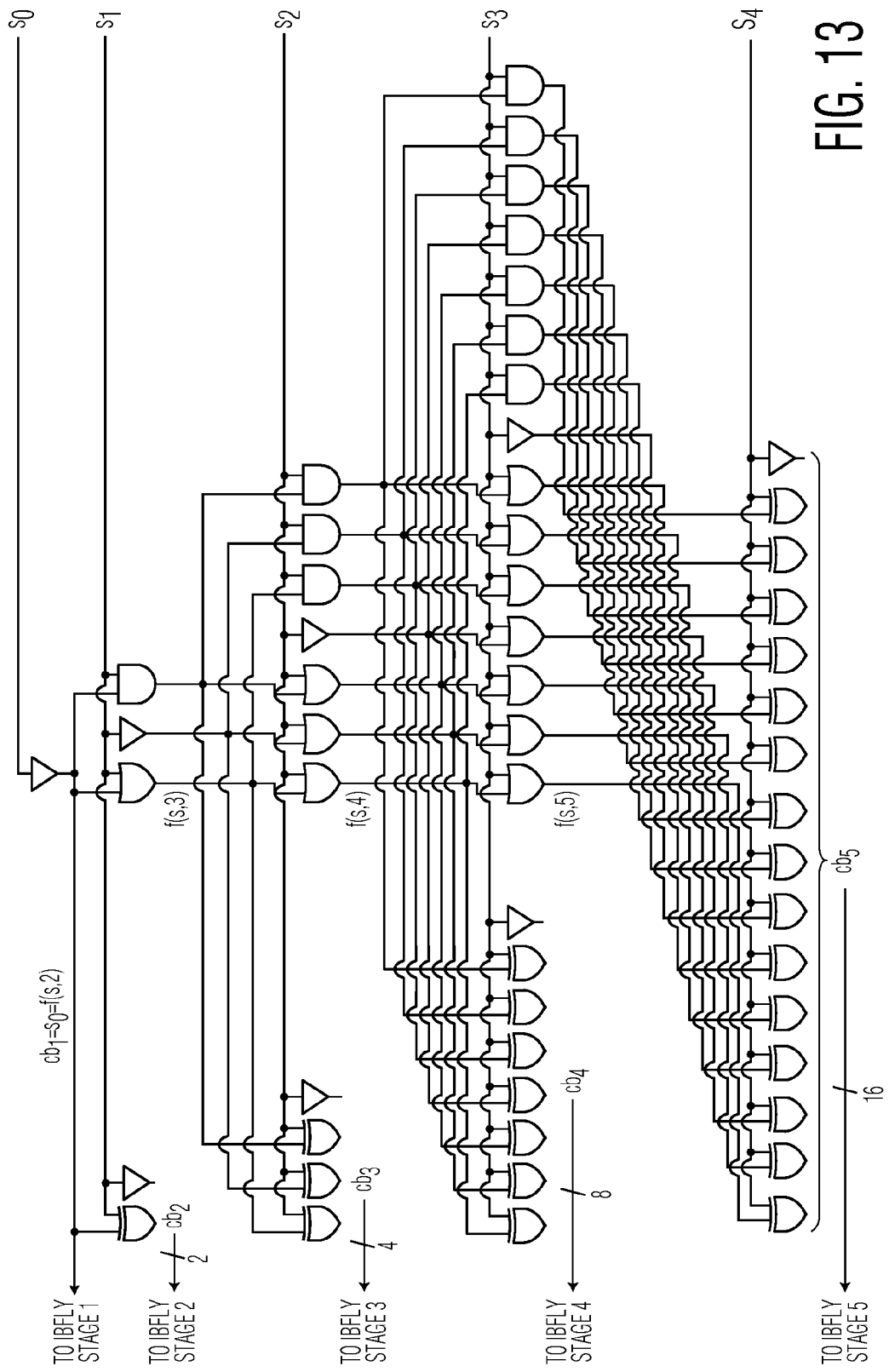
FIG. 13 is a diagram showing a control bit generator circuit according to the present invention for controlling the shift circuits.

Referring to FIGS. 2 and 12, which show an 8-bit inverse butterfly circuit, the 1-bit control bits, $cb_1$, from FIG. 13 goes to four switches in stage 1 that pair bits that are 1 bit apart, which represent four 2-bit inverse butterfly circuits. The 2-bit control bits, $cb_2$, for stage 2 go to four switches that pair bits that are 2 bits apart, which together with stage 1 represent two 4-bit inverse butterfly circuits. The 4-bit control bits, $cb_3$, for stage 3 go to four switches that pair bits that are 4 bits apart, which together with stages 1 and 2 represent the 8-bit inverse butterfly circuit. Equation 11 and FIG. 13 show how these control bits $cb_j$ for each stage j can be generated using the recursive function f(s, j) described in Equation 17.

Equation 11 provides that the control bits $cb_j$ are generated by taking the recursive function f(s, j) and Exclusive-OR it with a bit from the shift amount, $s_{j-1}$, and concatenate the result with $s_{j-1}$. Equation 17 then describes how the function f(s, j) can be recursively generated from the same function for the previous stage, f(s, j−1). This uses the OR function, +, and the AND function with f(s, j−1). The recursive function f(s, j) is derived by f(s, j−1) OR with $s_{j-2}$, concatenated with $s_{j-2}$, then concatenated with f(s, j−1) AND with $s_{j-2}$. This can also be seen in the hardware realization in FIG. 13, described below. It should be clear that other embodiments of control bit generation for doing rotations on an inverse butterfly circuit, or on a butterfly circuit, are possible.

FIG. 13 depicts the hardware implementation of the control bit generator for rotations. Equation 17 is used to derive θ(s, 2), ƒ(s, 3), ƒ(s, 4) and ƒ(s, 5). Also, the control bits for rotations, $cb_1$, $cb_2$, $cb_3$, $cb_4$ and $cb_5$, are obtained using Equation 11. This implementation is based on sharing of gates by reusing ƒ(s, j) for both $cb_j$ and ƒ(s, j+1). It is noted that other implementations of the control bit generator are also possible.

Discussion of the use of these equations is now provided with the example of FIG. 12, the 8-bit inverse butterfly circuit with right rotation amount s=5 ($s_2 s_1 s_0$=101). The first stage control bit, $cb_1$, replicated for the four 2-bit circuits, is given by Equations 11 and 17 and expressed as follows:

$$cb_1 = (f(5,1) \oplus s_0)\|s_0 = \{\} \oplus s_0\|s_0 = s_0 = 1 \quad (18)$$

The second stage control bits, $cb_2$, replicated for the two 4-bit circuits, are given by:

$$cb_2 = (f(5,2) \oplus s_1)\|s_1 \quad (19)$$
$$= ((f(5,1) + s_0\|s_0\|f(5,1)\cdot s_0) \oplus s_1)\|s_1$$
$$= ((\{\} + s_0\|s_0\|\{\} \cdot s_0) \oplus s_1)\|s_1$$
$$= (s_0 \oplus s_1)\|s_1$$
$$= (1 \oplus 0)\|0$$
$$= 10.$$

Note that ƒ(5,2) 1 in the above. The final stage control bits, $cb_3$, are given by:

$$cb_3 = (f(5,3) \oplus s_2)\|s_2 \quad (20)$$
$$= ((f(5,2) + s_1\|s_1\|f(5,2)\cdot s_1) \oplus s_2)\|s_2$$
$$= ((1 + s_1\|s_1\|1 \cdot s_1) \oplus s_2)\|s_2$$
$$= ((1 + 0\|0\|1 \cdot 0) \oplus 1)\|1$$
$$= \sim (100)\|1$$
$$= 0111.$$

FIG. 12 shows that this configuration of the inverse butterfly circuit does indeed right rotate the input by 5 mod 8 (and that the outputs of stage 2 are rotated by 5 mod 4=1 and that the outputs of stage 1 are rotated by 5 mod 2=1).

The other operations (shifts, extract deposit, and mix) shown in Table 1 above can be modeled as a rotation part plus a masked-merge part with zeroes, sign bits or second source operand bits. The rotation part can use the same rotation control bit generator described above to configure the inverse butterfly circuit datapath. The masked-merge part can be achieved by using an enhanced inverse butterfly datapath with an extra multiplexer stage added as the final stage. The mask control bits are "0" when selecting the rotated bits and "1" when selecting the merge bits.

For a right shift by s, the s sign or zero bits on the left are merged in. This requires a control string $1^s\|0^{n-s}$ for the extra multiplexer stage. From the definition of ƒ(s, j), it can be seen that ƒ(s, lg(n)+1) is the string $1^s\|0^{n-1-s}$. Thus, the desired control string is given by ƒ(s, lg(n)+1)∥0 (recall that s<n therefore the least significant bit is always "0", i.e., the least significant bit is always selected from the inverse butterfly datapath). ƒ(s, lg(n)+1) can easily be produced by extending the rotation control bit generator by one extra stage. For left shift, which can be viewed as the left-to-right reversal of right shift, the control bits for the extra stage are obtained by reversing left-to-right the right shift control string to yield $0^{n-s}\|1^s$.

For extract operations, which are like right shift operations with the left end replaced by the sign bit of the extracted field or zeros, the inverse butterfly circuit of the present invention selects in its extra multiplexer stage the rotated bits or zeros or the sign bit of the extracted field i.e., the bit in position pos+len−1 in the source register (see FIG. 6 at 40). The bit can be selected using an n:1 multiplexer. The control bit pattern for this stage is n-len "1"s followed by len "0"s ($1^{n-len}\|0^{len}$) to propagate the sign bit of the extracted field in the output (which is in position len−1) to the high order bits. Note that $cb_{lg(n)+1}(\text{len})=\{f(\text{len}, lg(n)+1)\oplus \text{len}_{lg(n)}\|\text{len}_{lg(n)}\}$ is $1^{len}\|0^{n-len}$ (as len ranges from 0 to n and has lg(n)+1 bits: $\text{len}_{lg(n)} \ldots {}_0$). So, reversing left-to-right $cb_{lg(n)+1}(\text{len})$ yields $0^{n-len}\|1^{len}$ and then negating it produces $1^{n-len}\|0^{len}$, the correct bit pattern for stage lg(n)+1.

For deposit operations, which are like left shift operations with the right and left ends replaced by zeros or bits from the second operand, the inverse butterfly circuit of the present invention selects in its extra multiplexer stage the rotated bits or zeros or bits from the second input operand. The correct pattern is a string of n-pos-len "1"s followed by len "0"s followed by s=pos "1"s ($1^{n-pos-len}\|0^{len}\|1^{pos}$) to merge in bits on the right and left around the deposited field. $cb_{lg(n)+1}(\text{pos+len})=\{f(\text{pos+len}, lg(n)+1)\oplus(\text{pos+len})_{lg(n)}\|(\text{pos+len})_{lg(n)}\}$ is $1^{pos+len}\|0^{n-pos-len}$ (as pos+len ranges from 0 to n and has lg(n)+1 bits: $(pos+len)_{lg(n) \ldots 0}$). Reversing left-to-right this string yields $0^{n-pos-len}\|1^{pos+len}$ and then negating it produces $1^{n-pos-len}\|0^{pos+len}$. Bitwise ORing this with the left shift control string, $0^{n-pos}\|1^{pos}$, yields $1^{n-pos-len}\|0^{len}\|1^{pos}$, the correct pattern for the masked-merge part of the deposit operation is produced.

For mix operations, the enhanced inverse butterfly circuit of the present invention selects in its extra multiplexer stage the rotated bits or the bits from the second input operand. The control bit pattern is simply a pattern of alternating strings of "0"s and "1"s, the precise pattern depending on the subword size and whether mix left or mix right is executed. These patterns can be hard coded in the circuit for the 12 mix operations (6 operand sizes×2 directions).

The foregoing mask-merged bit patterns and mask control are summarized in Table 2 below:

TABLE 2

| Instruction | Merge Bits |
| --- | --- |
| rotr/rotl | — |
| shr | (sign bit)$^n$ |
| shr.u | $0^n$ |
| shl | $0^n$ |
| extr | $(r_2[pos+len-1])^n$ |
| extr.u | $0^n$ |
| dep.z | $0^n$ |
| dep | $r_3$ |
| mix.r | $r_3$ |
| mix.l | $r_3$ |
| bfly/ibfly | — |
| pex/pex.v | — |
| pdep/pdep.v | $0^n$ |
| rotr/rotl | $0^n$ |
| Shr | $1^s \| 0^{n-s}$ |
| Shr.u | $1^s \| 0^{n-s}$ |
| Shl | $0^s \| 1^{n-s}$ |
| extr | $1^{n-len} \| 0^{len}$ |
| extr.u | $1^{n-len} \| 0^{len}$ |
| dep.z | $1^{n-pos-len} \| 0^{len} \| 1^{pos}$ |
| dep | $1^{n-pos-len} \| 0^{len} \| 1^{pos}$ |
| mix.r | $(0^k \| 1^k)^{n/2k}$, k = 1, 2, 4, 8, 16, 32 |
| mix.l | $(1^k \| 0^k)^{n/2k}$, k = 1, 2, 4, 8, 16, 32 |
| bfly/ibfly | $0^n$ |
| pex/pex.v | $0^n$ |
| pdep/pdep.v | $r_3$ |

Figure 14:
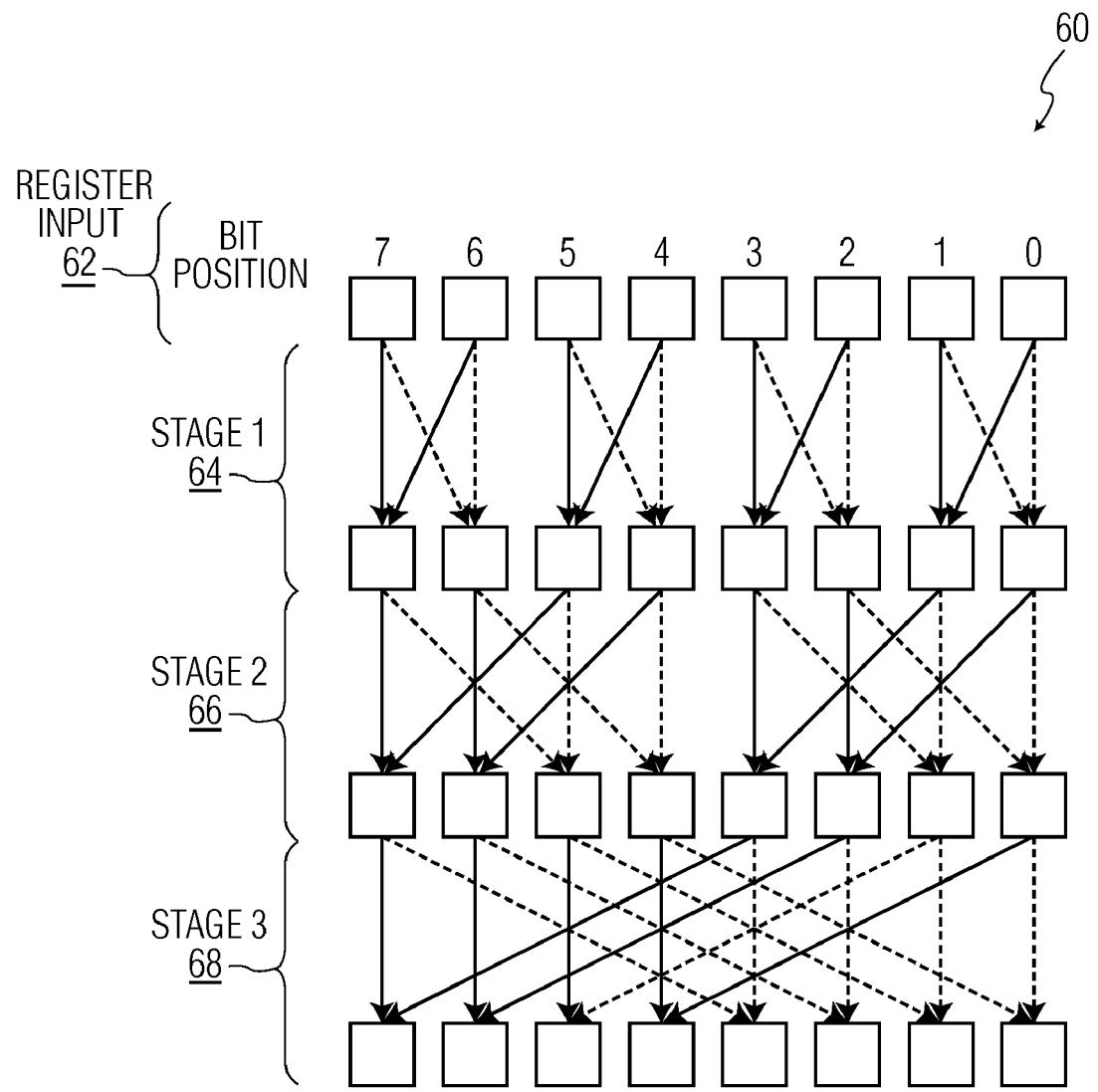
FIG. 14 is a diagram showing subnetworks of the inverse butterfly circuit of the present invention.

The inverse butterfly circuit implemented by the present invention can perform a parallel extract (pex) operation. The inverse butterfly circuit is decomposed into even and odd subcircuits. As shown in FIG. 14, the even subcircuits are shown with dotted lines and the odd subcircuits with solid lines. These can also be called right and left subcircuits. For simplicity and clarity of notation even subcircuits are referred to herein as R (right) and odd subcircuits as L (left). The circuit 60 of FIG. 14 is similar to the inverse butterfly circuit shown in FIG. 2, and includes a register input 62 and three circuit stages 64-68. The proof in support of implementing pex on an inverse butterfly circuit is provided as follows:

Fact 1.

Any single data bit can be moved to any result position by just moving it to the correct R or L subcircuit of the intermediate result at every stage of the inverse butterfly circuit.

Proof.

This can be proved by induction on the number of stages. At stage 1, the data bit is moved to its final position mod 2 (i.e., to R or L). At stage 2, it is moved to its final position mod 4, and so on. At stage lg(n), it is moved to its final position mod $2^{lg(n)}$=n, which is its final result position.

Fact 2.

A permutation is routable on an inverse butterfly circuit if the destinations of the bits constitute a complete set of residues mod m (i.e., the destinations equal 0, 1, ..., m−1 mod m) for each subcircuit of width m.

Proof.

Based on Fact 1, bits are routed on the inverse butterfly circuit by moving them to the correct position mod 2 after the first stage, mod 4 after the second stage, etc. Consequently, if the two bits entering stage 1, (with 2-bit wide inverse butterfly circuits as shown in FIG. 14), have destinations equal to 0 and 1 mod 2 (i.e., one is going to R and one to L), Fact 1 can be satisfied for both bits and they are routable through stage 1 without conflict. Subsequently, the four bits entering stage 2 (with the 4-bit wide butterfly circuits) must have destinations equal to 0, 1, 2 and 3 mod 4 to satisfy Fact 1 and be routable through stage 2 without conflict. A similar constraint exists for each stage.

Theorem 1.

Any Parallel Extract instruction on n=$2^{lg(n)}$ bits can be implemented with one pass through an inverse butterfly circuit of lg(n) stages without path conflicts (with the un-selected bits on the left zeroed out).

Proof.

The pex operation compresses bits in their original order into adjacent bits in the result. Consequently, two adjacent selected data bits that enter the same stage 1 subcircuit must be adjacent in the output. In other words, one bit has a destination equal to 0 mod 2 and the other has a destination equal to 1 mod 2—the destinations constitute a complete set of residues mod 2 and thus are routable through stage 1. The selected data bits that enter the same stage 2 subcircuit must be adjacent in the output and thus form a set of residues mod 4 and are routable through stage 2. A similar situation exists for the subsequent stages, up to the final n-bit wide stage. No matter what the bit mask of the overall pex operation is, the selected data bits will be adjacent in the final result. Thus the destination of the selected data bits will form a set of residues mod n and the bits will be routable through all lg(n) stages of the inverse butterfly circuit.

Parallel deposit can be performed using the butterfly circuit of the present invention, since the parallel deposit operation is the inverse of the parallel extract operation. Also, the grp operation discussed above can be mapped to two parallel inverse butterfly circuits, since grp is a combination of a grp_right (or pex) and a grp_left (a mirrored pex).

A decoder for the parallel extract (and parallel deposit) instruction takes as its input the n-bit mask and produces the n/2×lg(n) control bits for the inverse butterfly (or butterfly) circuit. The decoder can be designed to consist of only two types of operations that can be performed in software or implemented as circuits: a parallel prefix population counter, which counts the ones from position 0 (on the right) to every bit position from 0 to n−2, and a set of left rotators that complement bits upon wraparound (LROTC—Left ROTate and Complement). The theoretical underpinnings for a parallel extract decoder are discussed below in connection with FIG. 15.

Figure 15:
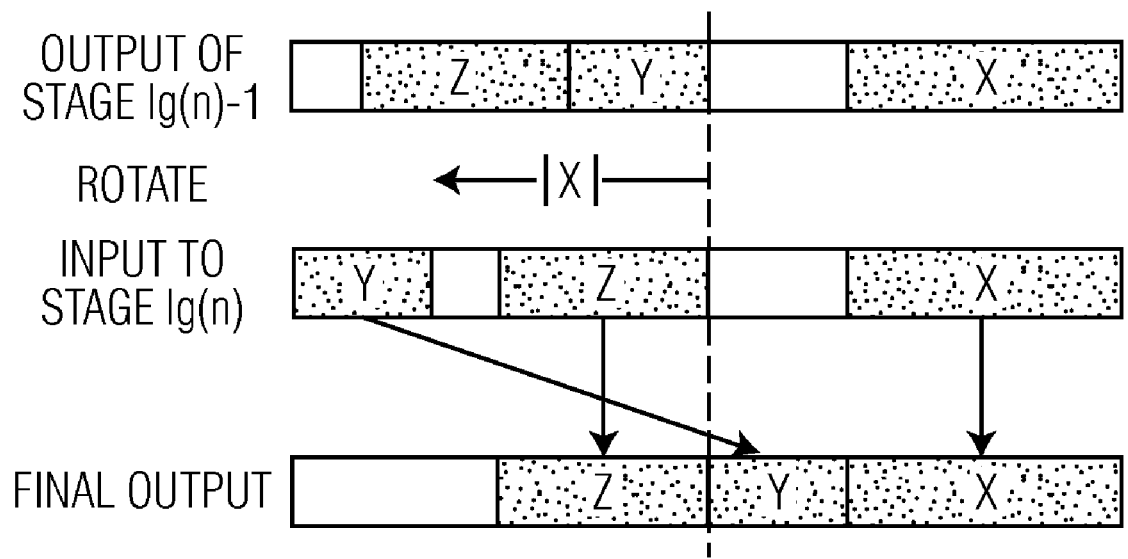
FIG. 15 is a diagram showing the final stage of the pex operation, as processed by the shifter circuit of the present invention.

FIG. 15 is a diagram showing the final stage of the pex operation, as processed by the shifter circuit of the present invention. In the final stage, X represents the selected data bits that pass through in R, Y represents the selected data bits that are transferred from L to R, and Z represents the selected data bits that pass through in L (R is used to denote the right subnet and L is used to denote the left subnet in an inverse butterfly circuit, as discussed above in connection with FIG. 14).

X is the rightmost bits of R, as the output of pex is the selected data bits compressed and right justified in the result. Y is rotated left from the midpoint by the size of X, |X|, at the input to the final stage so that when it is swapped into R in the final stage it is contiguous to X on its right. Z is the rightmost bits in L at the input to the final stage, so that when it is passed through in L, it is contiguous with the bits in R. Thus, the control bit pattern for the final stage is $1^{n/2-|X|}||0^{|X|}$, where "1" denotes swap, and "0" denotes pass-through of the paired bits in L and R, in the last stage. |X| is equal to the count of "1"s in the right half of the bit mask as all the selected data bits in the right half of the input have already been compressed and right justified prior to the input to the final stage. This pattern can be generated by a left rotate and complement on wraparound (LROTC) operation of the one string of length n/2. For every position in the rotation, a "1" is wrapped around from the left and complemented to obtain a "0" on the right. The end result, after a LROTC by |X| bits, is a string with the |X| rightmost bits set to "0" and the rest set to "1."

Referring to the top row of FIG. 15, Y and Z can be viewed as having been left rotated by |X| from being the rightmost bits of L at the output of stage lg(n)−1. Consequently, it is possible to iterate backwards through the stages, performing a pex operation within each half subcircuit and then explicitly left rotate each local L at the input of the next stage by the number of selected data bits in the local R at the input of the next stage prior to the swapping or passing through of bits in this next stage.

Rather than rotating the data bits explicitly, it is possible to compensate for the rotation by modifying the routing through the subsequent stages. This can be achieved by rotating the control bits by the same number of positions, complementing upon wraparound (LROTC). These rotations are propagated forward. Consequently, the control bits for a stage, obtained by a LROTC of the one string by the count of "1"s in the right half of the local bit mask, are further modified by a LROTC operation by the count of "1"s in the right half of the next larger local bit mask, and so on. The result is a single LROTC operation of the one string by count of "1"s in the right half the local bit mask through bit 0, the least significant bit. Overall, the counts are needed of the k rightmost bits, for k=0 to n−2—the set of prefix population counts.

Figure 16:
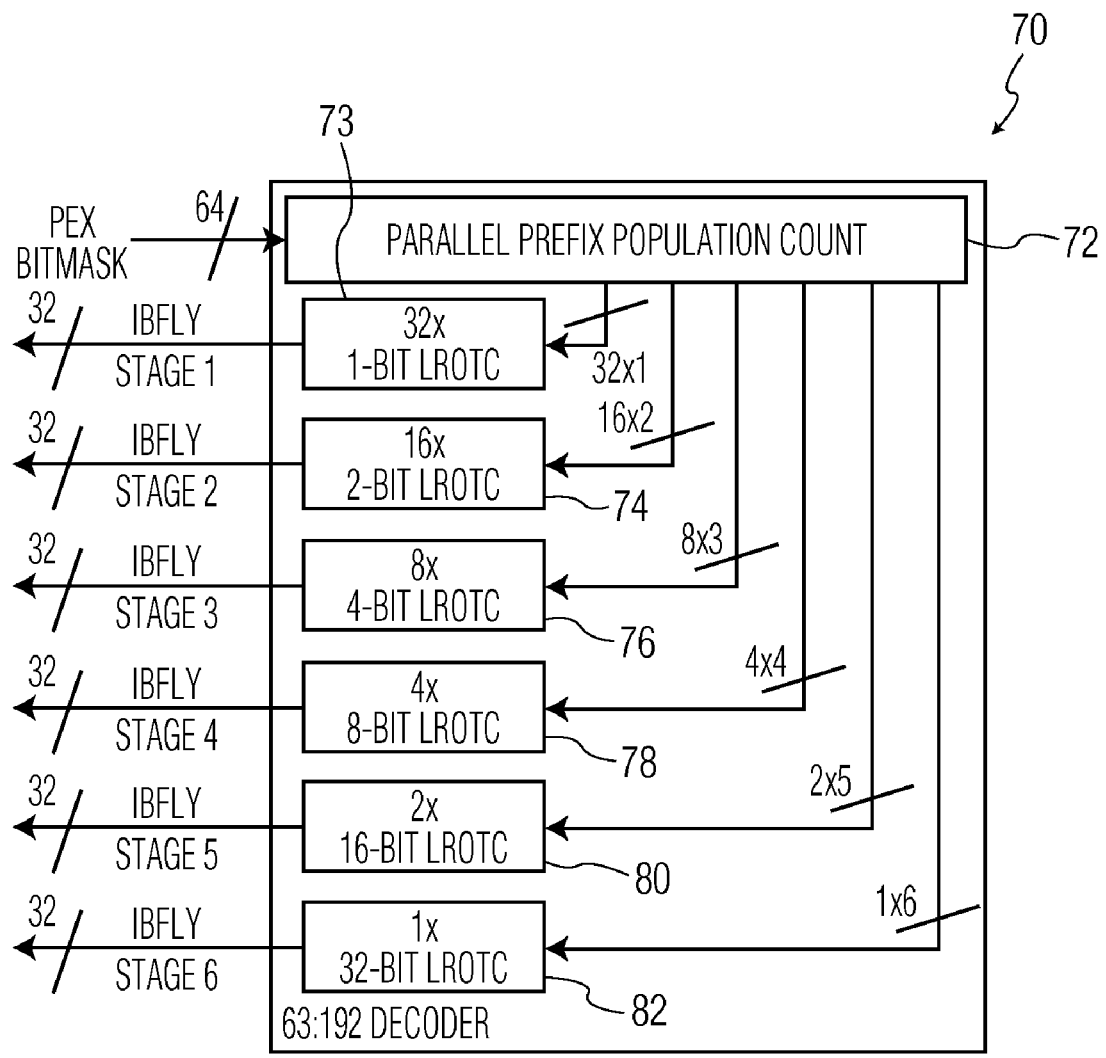
FIG. 16 is a block diagram showing the decoder for a parallel extract instruction in accordance with the present invention.

The counting of the number of "1"s is done in parallel by the Parallel Prefix Population Count operation, while the rotation is done by the LROTC operation at each stage. The full decoding algorithm (which could be performed in hardware or software) is given below;

FIG. 16 is a block diagram showing the parallel extract decoder in accordance with the present invention, indicated generally at 70. The decoder 70 includes a parallel prefix population counter 72, thirty-two 1-bit LROTC operation module 73, sixteen 2-bit LROTC operation module 74, eight 4-bit LROTC operation module 76, four 8-bit LROTC operation module 78, two 16-bit LROTC operation module 80, and one 32-bit LROTC operation muddle 82. The decoder 70 operates in accordance with Algorithm 1. The decoder 70 can be used for pdep, except that the ordering of the resulting sets of n/2 control bits for the lg(n) stages is reversed.

It is noted that three classes of parallel extract and parallel deposit instructions can be handled by the present invention. The first consists of static versions of these instructions, where software or the compiler "pre-decodes" the mask in the second source register into control bits for the datapath, and moves the control bits into the Application Registers (ARs), or any registers that may be used to control the ibfly circuit. This uses the mov instruction in Table 1, followed by the pex or pdep instructions. The second class is dynamic mask decoding by a hardware implementation of the decoder of FIG. 16. This uses the pex.v or pdep.v instructions in Table 1. The third class is loop-invariant pex and pdep. Here, the mask is known only at runtime but remains fixed for a long input stream. The hardware decoder of FIG. 16 can output the control bits to the application registers once, and subsequently the static versions of pex and pdep are used. This uses the setib and setb instructions in Table 1, followed by static pex or pdep instructions.

Figure 17A:
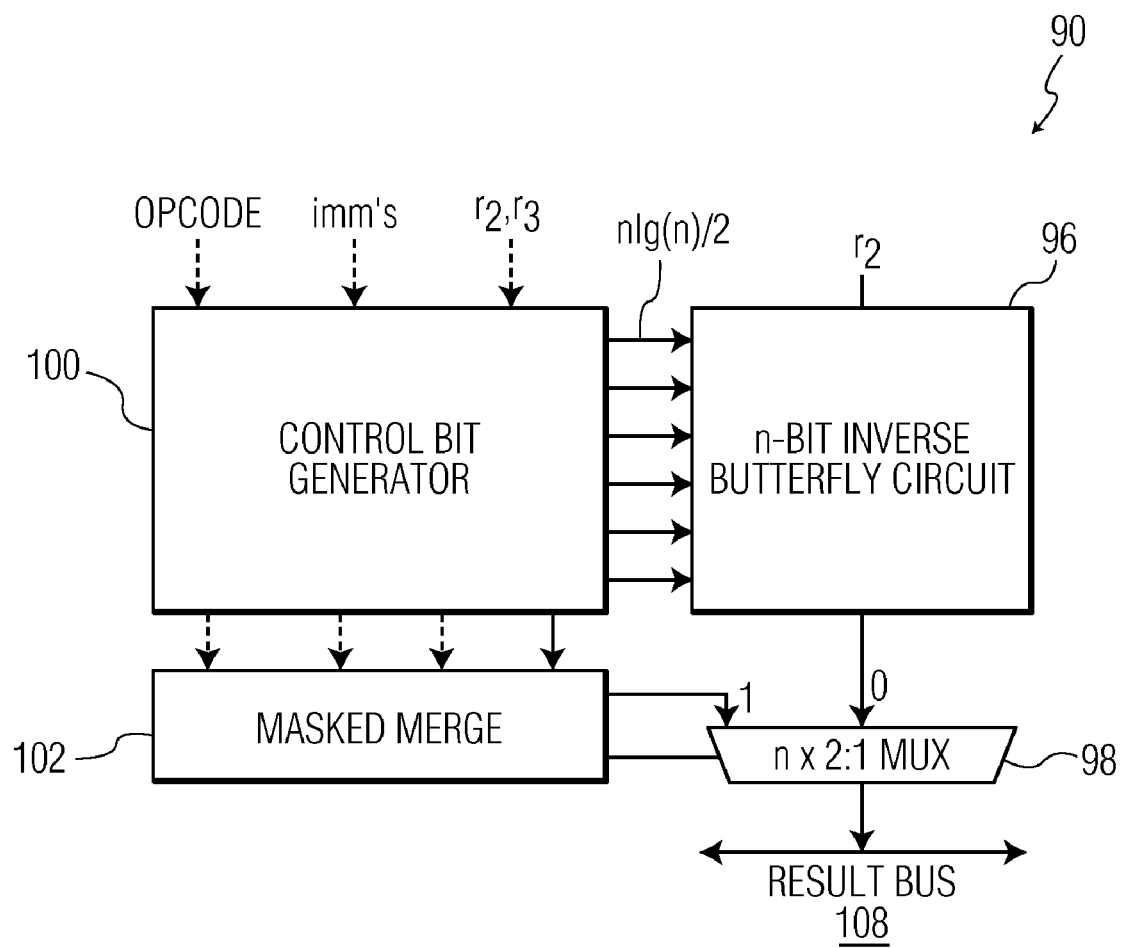
FIGS. 17A-17B are block diagrams showing shift-permute functional units in accordance with the present invention.

FIG. 17A is a block diagram showing a shift-permute functional unit 90 in accordance with the present invention. The unit 90 supports instructions of existing microprocessors, such as the instructions listed in the top-half of Table 1 above. The unit 90 includes an n-bit inverse butterfly circuit 96 (n being the desired bit width), n 2:1 multiplexers 98, a control bit generator 100 (which contains the control circuit discussed above in connection with FIG. 13), and a masked merge unit 102 (which generates the merge bits and mask control for the extra multiplexer stage). Processing results are transmitted to a microprocessor using a result bus 108.

Figure 17B:
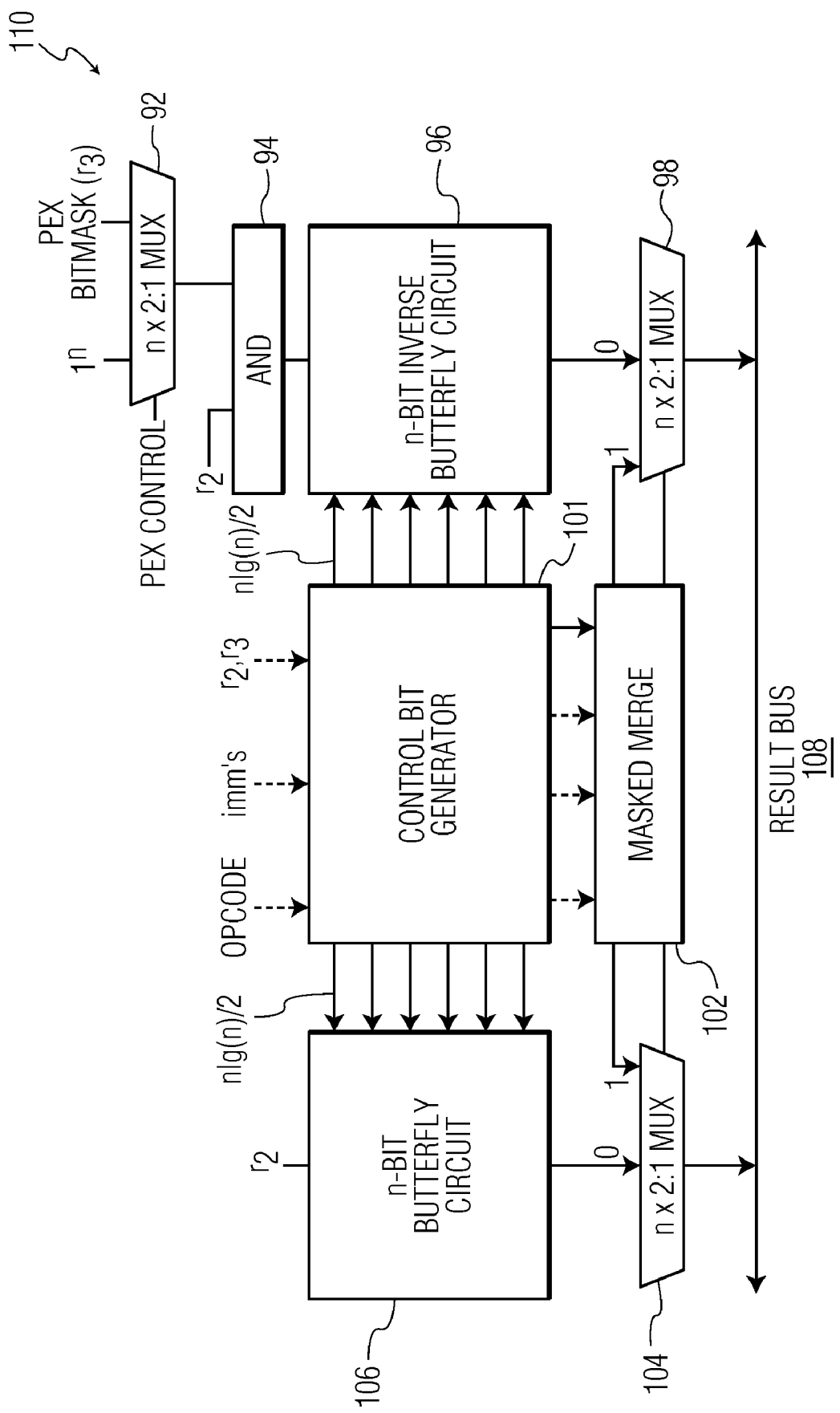

FIG. 17B is a block diagram showing another embodiment of the shift-permute functional unit of the present invention, indicated generally at 110. The unit 110 includes the same n-bit inverse butterfly circuit 96, n 2:1 multiplexers 98 and 104, and masked merge unit 102 as the unit 90 shown in FIG.

---

Algorithm 1: To generate the nlg(n)/2 inverse butterfly (or butterfly) control bits from the n-bit mask.
Input: mask; the pex (or pdep) bitmask
Output: ibcb; the lg(n) × n/2 matrix containing the inverse butterfly control bits
bcb; the lg(n) × n/2 matrix containing the butterfly control bits Let x||y indicate the concatenation of bit patterns x and y. PP_POPCNT(a) is the parallel prefix population count of "1"s in bitfield a. mask{h:v} is the bitfield from bit h to bit v of the mask. $1^k$ indicates a bit-string of k ones. LROTC(a, rot) is a "left rotate and complement on wrap" operation, where a is the input and rot is the rotation amount.

1. Calculate the prefix population counts:
    For i = 1, 2, ..., n−2
        pc[i] = PP_POPCNT(mask{i:0})
2. Calculate the inverse butterfly (and butterfly) control bits for each stage by performing LROTC($0^k$, pc[m]), where k is the size of the local R and m is the set of the leftmost bit positions of the local R's:
    ibcb = bcb = { }
    For i = 1, ..., lg(n)        //for each stage
        k = n/$2^i$        //number of bits in local R
        For j = 1, 3, 5, ... $2^i$−1        //for each local R
            m = j×k−1        //the leftmost bit position of the local R
            temp = LROTC($1^k$, pc[m])
            ibcb[lg(n)−i+1] =        //for inverse butterfly datapath
            temp||ibcb[lg(n)−i+1]
            bcb[i] = temp|| bcb[i]        //for butterfly datapath 17A, in addition to n 2:1 multiplexers 92, AND gate 94, a modified control bit generator 101, and an n-bit butterfly circuit 106. A pex/pdep decoder (shown in FIG. 18A, discussed below) is provided, within the control bit generator 101. The shift-permute functional unit 110 can support all the instructions listed above in connection with Table 1. For the grp instruction to also be supported, a second inverse butterfly circuit and a second decoder would be required. However, the bfly and ibfly instructions can be used to achieve permutations and pex can be used to emulate grp, thereby obviating the need for a second inverse butterfly circuit and decoder. The last 4 instructions in Table 1 are needed only if dynamic and loop-invariant variants of the pex and pdep instructions are implemented. Note that the control bits fed to the butterfly circuit 106 are reversed left-to-right and also reversed top to bottom in terms of the order of the control bits for the stages. Also note that the butterfly circuit 106 is considered optional (and shown in phantom) as the functionality can be emulated using the inverse butterfly circuit at the cost of some performance. One pass of the butterfly circuit can be emulated with at most lg(n) passes of the inverse butterfly circuit. Also, the latency of the control bit generation is serialized with respect to the latency of the butterfly circuit, since the control bits that take longest to generate are needed to control the first stage of the butterfly circuit, which is the last stage of the inverse butterfly circuit. Thus, the inverse butterfly datapath is faster, since its control bit generation latency is overlapped with its datapath latency.

Figure 18A:
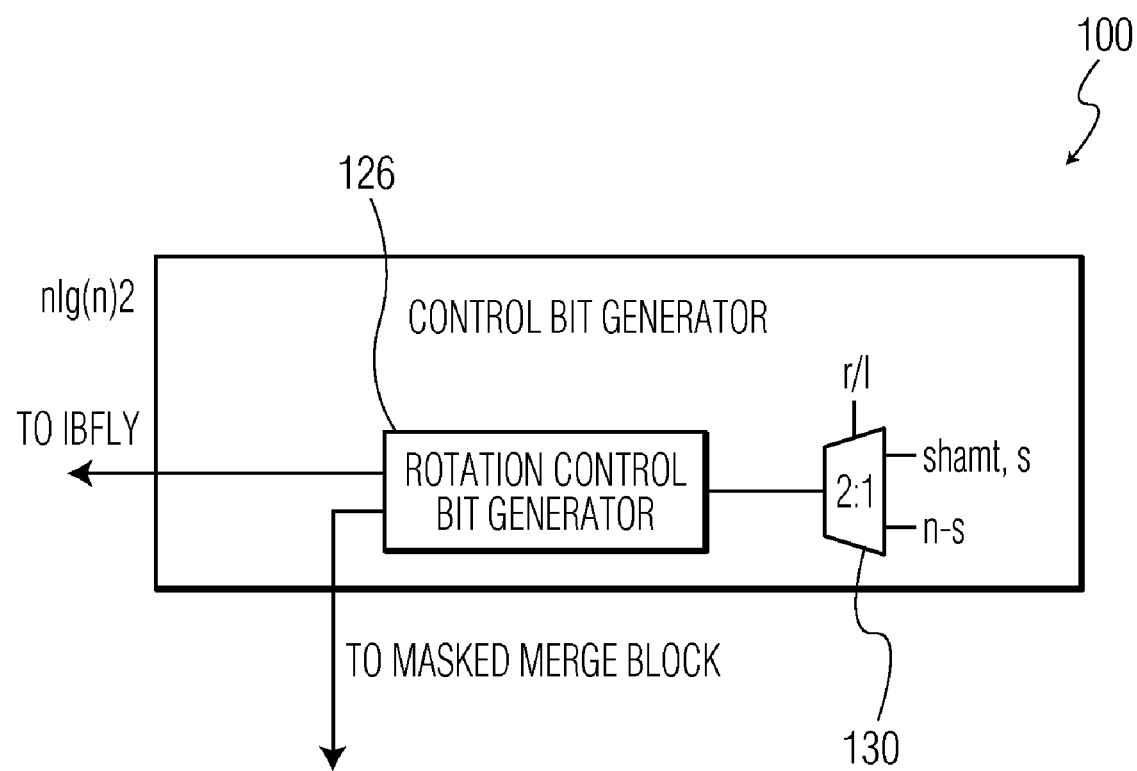
FIGS. 18A-18B are block diagrams showing the control bit generators of FIG. 17A-17B in greater detail.

FIG. 18A is a diagram showing the control bit generator 100 of FIG. 17A in greater detail. The control bits are provided by a rotation control bit generator 126 (see FIG. 13), which is controlled by a 2:1 multiplexer 130.

Figure 18B:
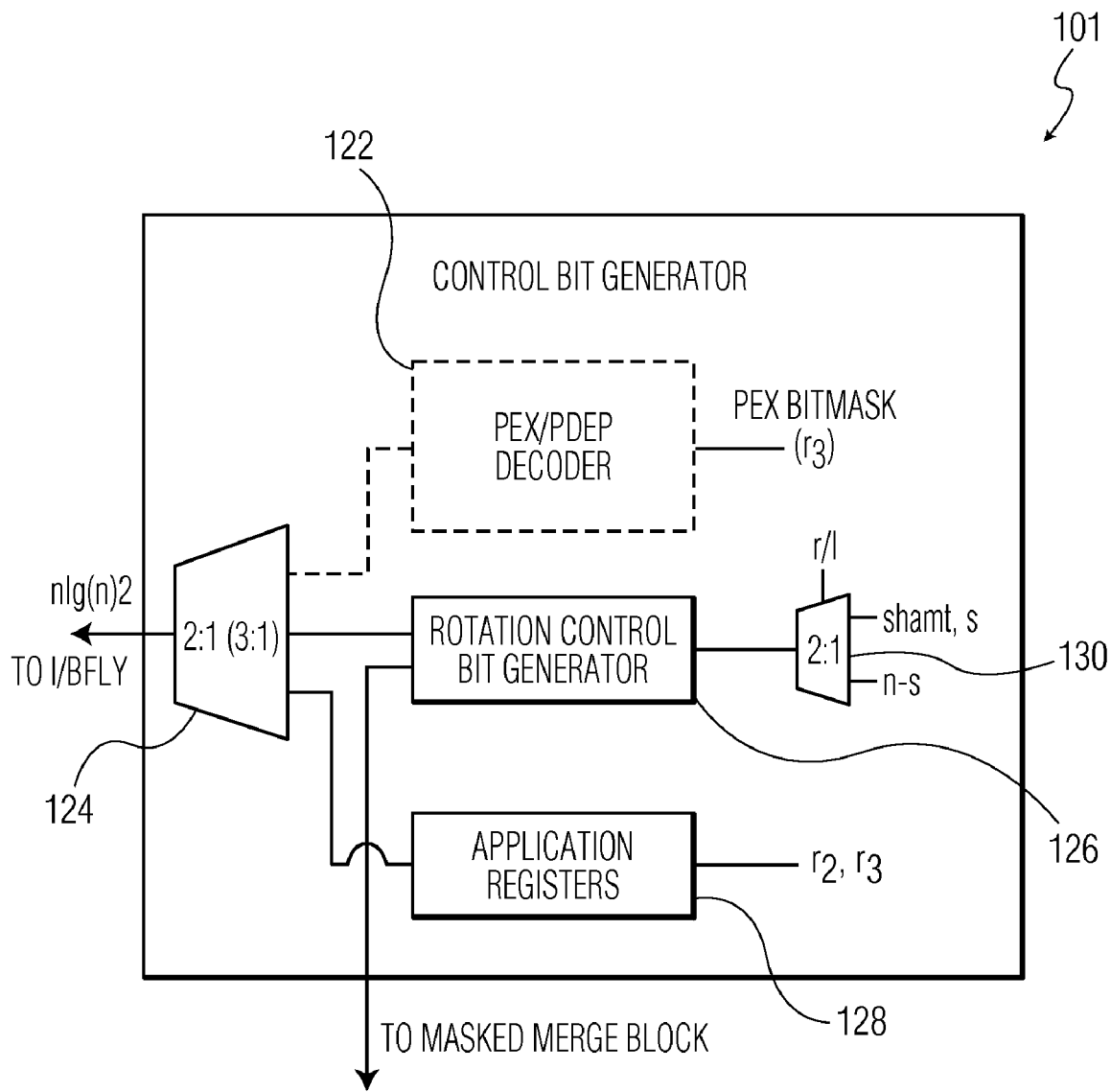

FIG. 18B is a diagram showing the control bit generator 101 of FIG. 17B in greater detail. The source of the control bits can be from the rotation control bit generator 126 (see FIG. 13), a pex/pdep decoder 122 (see FIG. 16), or application registers 128. The pex/pdep decoder 122 supplies the bits for the dynamic pex and pdep operations. This block is consider optional, as the pex/pdep decoder 122 is large and has long latency (2 cycles), and is only needed for variable pex.v or pdep.v instructions which are rarely used. Hence, it is shown in phantom. The rotation control bit generator 126 is extended to produce $Cb_{lg(n)}$. The shift amount is s for right rotates, right shifts, mix_left (the left subwords are shifted right in the second operand) and extracts; it is n-s for left rotates, left shifts, mix_right and deposits. Also, output is $f(s, lg(n))$ to the masked-merge block for use in computing the masked-merge controls. The final source of the control bits is from the application registers for use in the bfly and ibfly permutation instructions or static pex and pdep instructions. Multiplexers 124 and 130 are also provided.

The merge and mask control bits implemented by masked merge unit 102 of FIGS. 17A and 17B include those summarized in Table 2 above. The merge bits can be:
  the zero string for unsigned right shift, left shift, unsigned extract, deposit-and-zero, and parallel deposit;
  the sign bit for arithmetic right shift;
  the sign bit of the extracted field (bit pos+len−1 of the source operand) for signed extract; or
  the second source operand $r_3$ for deposit-and-merge and mix.

The mask control bits are "0" when selecting the rotated bits output from the butterfly or inverse butterfly circuit and "1" when selecting the merge bits. The patterns are:
  the zero string for right and left rotate, bfly and ibfly permutation instructions and parallel extract (which do not merge bits);
  the second source operand $r_3$ for parallel deposit; or
  various strings of "1"s and "0"s for shifts, extract, deposit and mix.

Table 3 below presents a high level comparison of the present invention to known barrel and log shifter designs:

TABLE 3

|  | Barrel Shifter | Log Shifter | Our IBFLY Shifter |
| --- | --- | --- | --- |
| # Elements | $n^2$ | $n \times lg(n)$ or $n \times log_4(n)$ | $n \times lg(n)$ |
| # Control Lines | n | $lg(n)$ | $n/2 \times lg(n)$ |
| Gate delay (Datapath) | 1 | $lg(n)$ or $log_4(n)$ | $lg(n)$ |
| Mux width (Capacitance) | n | 2 or 4 | 2 |

The first two lines of Table 3 contain the components that contribute to circuit area. Both the log shifter and the inverse butterfly version of the present invention have n×lg(n) elements, while the barrel shifter has $n^2$ elements. The log shifter also has the fewest control lines (lg(n)) while the present invention has the most as each switch, or pair of elements, requires an independent control bit. The next two lines pertain to latency. The datapath of the barrel shifter has a single gate delay while the log shifter and the present invention have lg(n) gate delay. However, both the log shifter and the present invention utilize narrow multiplexers with lower capacitance at output nodes.

The method of logical effort was first used to compare the delay along the critical paths for the barrel shifter, the log shifter, and the inverse butterfly shifter. This estimated the critical path in terms of FO4 gate equivalents, which is the delay of an inverter driving 4 similar inverters. The latency of only the basic shifter operations on these datapaths was compared. As the 64-bit barrel shifter is impractical due to the capacitance on the output lines, a 64-bit shifter was implemented as an 8-byte barrel shifter followed by an 8-bit barrel shifter, which limits the number of transmission gates tied together to 8. The delay only from the input to the decoder through the two shifter levels for the barrel shifter and through the three shifter levels for the log shifter was considered.

For the present invention, the delay from the input to the control bit generator (i.e., the rotation control bit generator of FIG. 13) through the output of the inverse butterfly circuit was considered. According to the logical effort calculations, the delay for the barrel shifter is 15.1 FO4 and the delay for the log shifter is 13.0 FO4, while the delay for inverse butterfly shifter is 15.5 FO4. Thus, the delay along the critical path for the barrel shifter and the present invention is comparable, and the present invention is 19% slower than a log shifter. Note that this is only a rough estimation of delay along the critical path without circuit optimization. Custom circuit design of the present invention will result in a much faster circuit.

Since the log shifter is the faster and more compact of the two current shifter designs, it was implemented for testing purposes along with the present invention, using a standard cell library. All designs were synthesized to gate level, optimizing for shortest latency, using Design Compiler mapping to a TSMC 90 nm standard cell library. The results are summarized in Tables 4-6 below.

TABLE 4

| Functional Unit | Latency (ns) | Relative Latency | Area (NAND gates) | Relative Area |
| --- | --- | --- | --- | --- |
| Log Shifter | 0.30 | 1 | 6.2K | 1 |
| Our IBFLY shifter | 0.35 | 1.18 | 4.3K | 0.69 |
| ALU | 0.38 | 1.27 | 8.2K | 1.31 |

Table 4 shows the result of a basic shifter that only implements shift and rotate instructions. For the log shifter, parallel datapaths were implemented for left and right shifts. The present invention has 1.18× the latency of the log shifter, which is similar to the logical effort calculation. The present invention is also smaller than the log shifter, at approximately 70% of the area (note that a single datapath log shifter would have smaller area; additionally, accounting for the wires will increase the area for the ibfly-based shifter relative to the log shifter, as mentioned). For comparison, we also implemented an ALU (supporting add, subtract, and, or, not, xor with register or immediate operands) synthesized using the same standard cell library. The present invention is faster (92% latency) and smaller (52% area) than this ALU.

TABLE 5

| Functional Unit | Latency (ns) | Relative Latency | Area (NAND gates) | Relative Area |
|---|---|---|---|---|
| Log Shifter | 0.41 | 1 | 6.4K | 1 |
| Our IBFLY shifter | 0.42 | 1.03 | 5.3K | 0.83 |
| ALU | 0.40 | 0.99 | 6.6K | 1.03 |

Table 5 shows the result when both shifter architectures are enhanced to support extract, deposit, and mix instructions. The critical path of the log shifter is now through the extract sign bit propagation, so the latency is now comparable to that of the inverse butterfly-based shifter of the present invention. The present invention is still only 83% of the area of the log shifter. The results for an ALU of similar latency are also included (which has a comparable circuit area, in NAND gate equivalents).

TABLE 6

| Functional Unit | Latency (ns) | Relative Latency | Area (NAND gates) | Relative Area |
|---|---|---|---|---|
| Log Shifter | 0.41 | 1 | 6.4K | 1 |
| ibfly, pex | 0.48 | 1.18 | 8.2K (1.2K for ARs) | 1.29 |
| ibfly, bfly, pex, pdep | 0.49 | 1.20 | 11.9K (2.5K for ARs) | 1.87 |
| bfly, pdep (no shifter) | 0.48 | 1.19 | 3.6K (1.5K for ARs) | 0.57 |
| ALU | 0.49 | 1.20 | 5.3K | 0.83 |

Table 6 shows the results when support is added to the present invention for advanced bit manipulation operations, but not to the log-shifter. The first line in table 6 represents the log shifter circuit from Table 5, included as the baseline. The second line is a unit that supports the ibfly and static pex instructions. The functionality of the butterfly circuit can be emulated using inverse butterfly, albeit with a multi-cycle penalty. The latency increases are due to extra multiplexing for the control bits and output. The area increases due to the ARs, the extra multiplexers, and the pex masking. This unit has 1.18× the latency and 1.29× the area of the log shifter. The third line in Table 6 is a unit that also supports butterfly and static pdep. The latency increases slightly due to output multiplexing and the area increases due to the second (butterfly) datapath and second set of three ARs. This unit has 1.20× the latency and 1.87× the area of the log shifter. Alternatively, a separate unit can be added to perform just bfly and pdep (line 4 in Table 6), thereby enabling simultaneous superscalar execution with the ibfly-pex-shifter unit (line 2 in Table 6). It can be seen that the shift-permute unit of the present invention (line 3 in Table 6) can be split into two units at no additional increase in area. The results for an ALU of similar latency are also included, wherein the ALU is smaller than the log shifter due to the relaxed latency constraint. The shift-permute unit (line 3) now has 2.25× the area of the ALU, but smaller sizes are possible.

FIGS. 19A-31 are diagrams showing implementation of a parallel deposit (pdep) operation using the butterfly circuit embodiment of the shifter circuit of the present invention. As illustrated in FIGS. 19A-30, a control bit of "0" indicates that a "swap" function is performed (i.e., a bit of information at a given position in one stage shifts to a different position at a subsequent stage), and a control bit of "1" indicates that a "pass-through" function is performed (i.e., a bit of information at a given position in one stage passes through to the same position at a subsequent stage). Of course, this could be reversed as desired (with appropriate changes to the underlying gate logic of the circuits), without departing from the spirit or scope of the present invention. For example, as shown in FIG. 10 discussed above, a control bit value of "1" corresponds to a swap function, while a control bit value of "0" corresponds to a pass-through function.

Figure 19A:
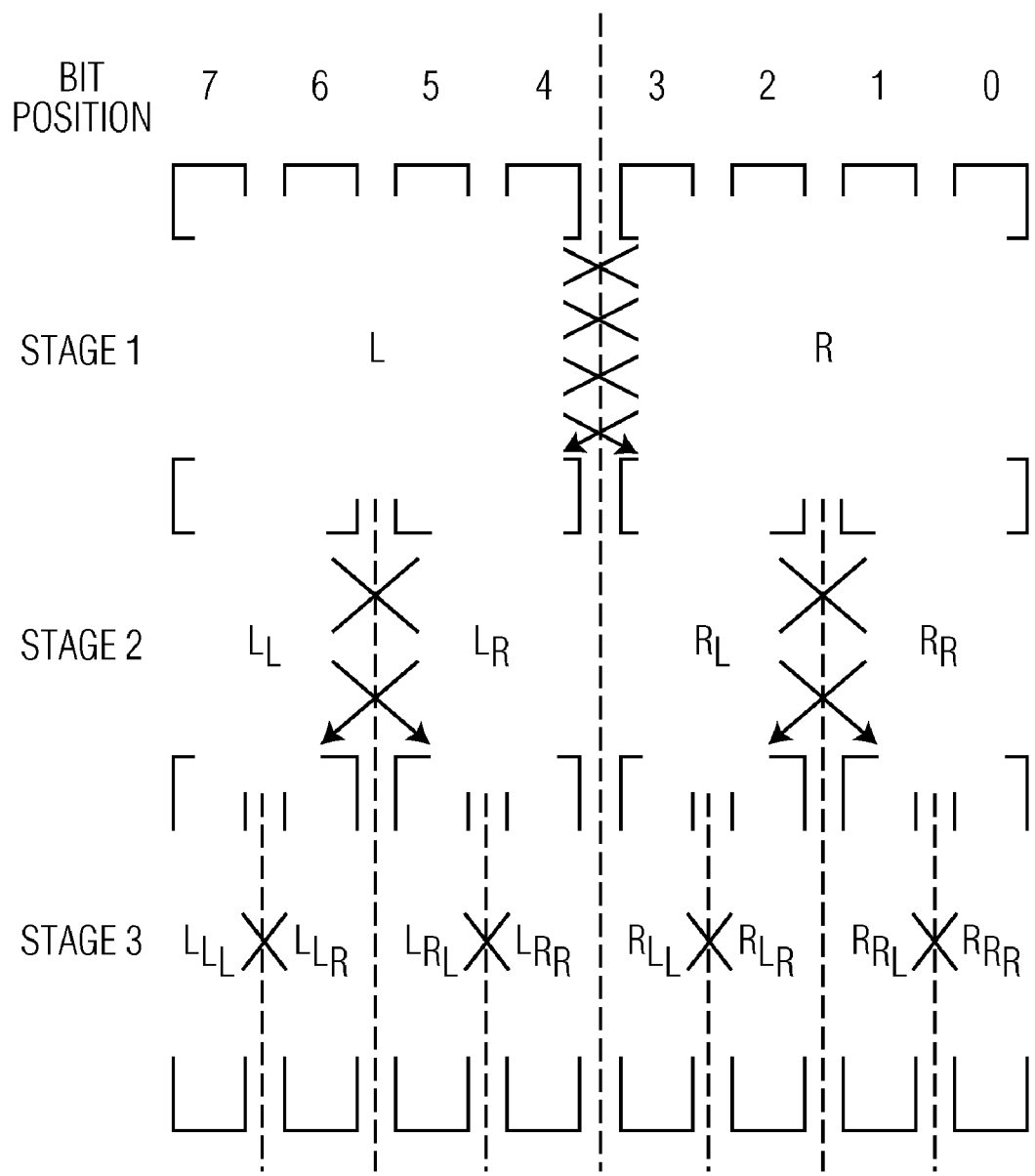
FIGS. 19A-31 are diagrams showing implementation of a parallel deposit (pdep) operation using the butterfly network embodiment of the shifter circuit of the present invention.
Figure 19B:
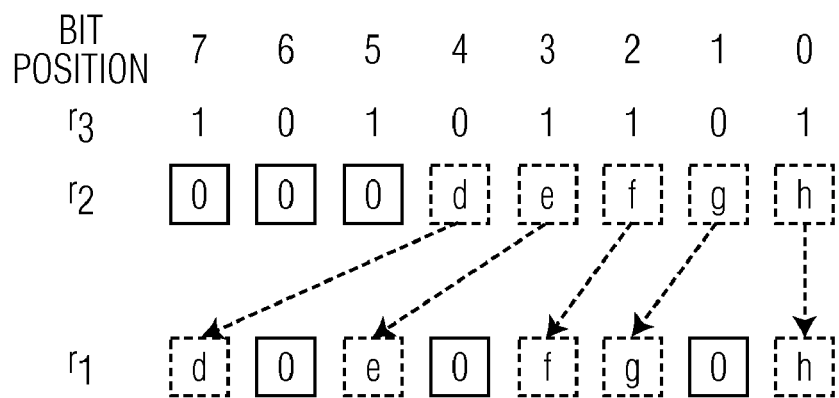
Figure 20:
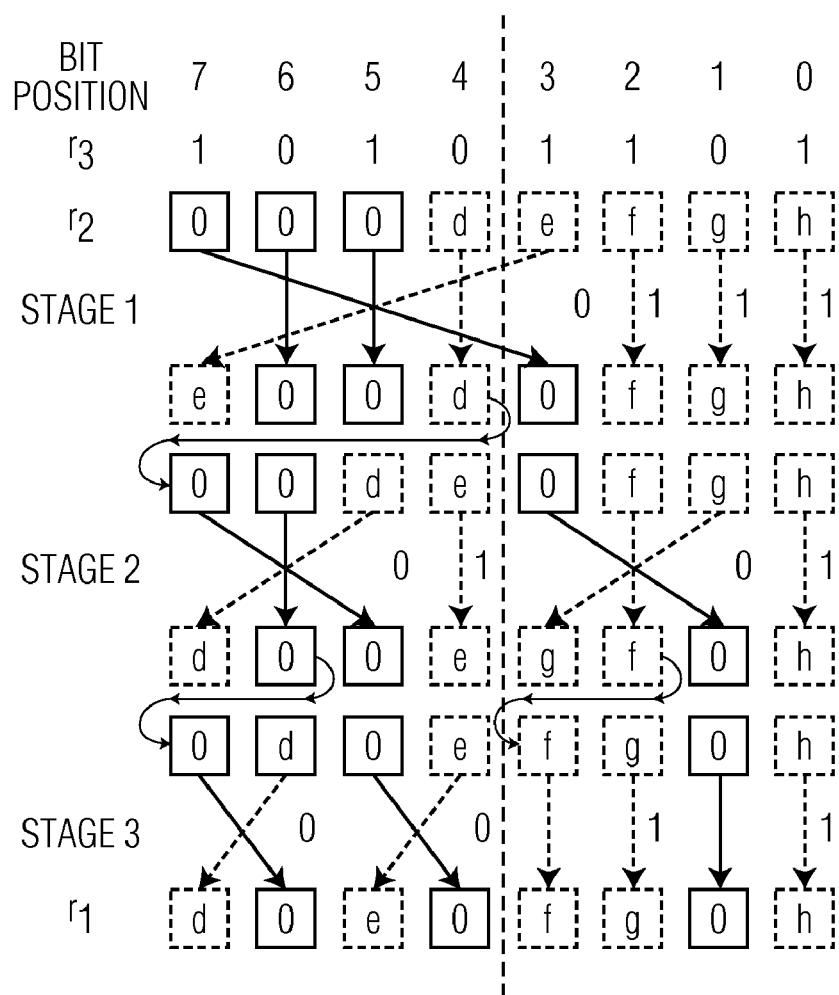

FIG. 19A illustrates left half (L) and right half (R) swapping procedures capable of being implemented by the present invention, at each stage of the butterfly circuit, as well as hierarchical subscript notation utilized for indicating respective swapping halves through the various circuit stages of a butterfly circuit. FIG. 19B shows an example pdep operation with mask=10101101. FIG. 20 shows this pdep operation broken down into steps on the butterfly circuit. In the first stage, we transfer from the right (R) to the left half (L) the bits whose destination is in L, namely bits d and e. Prior to stage 2, we right rotate e00d by 3, the number of bits that stayed in R, to right justify the bits in their original order, 00de, in the L half. Note that bits that stay in the right halt, R, are already right-justified.

In each half of stage 2 we transfer from the local R to the local L the bits whose final destination is in the local L. So in R, we transfer g to $R_L$ and in L we transfer d to $L_L$. Prior to stage 3, we right rotate the bits to right justify them in their original order in their new subnetworks. So d0 is tight rotated by 1, the number of bits that stayed in $L_R$, to yield 0d, and gf is right rotated by 1, the number of bits that stayed in $R_R$, to yield fg.

Figure 21:
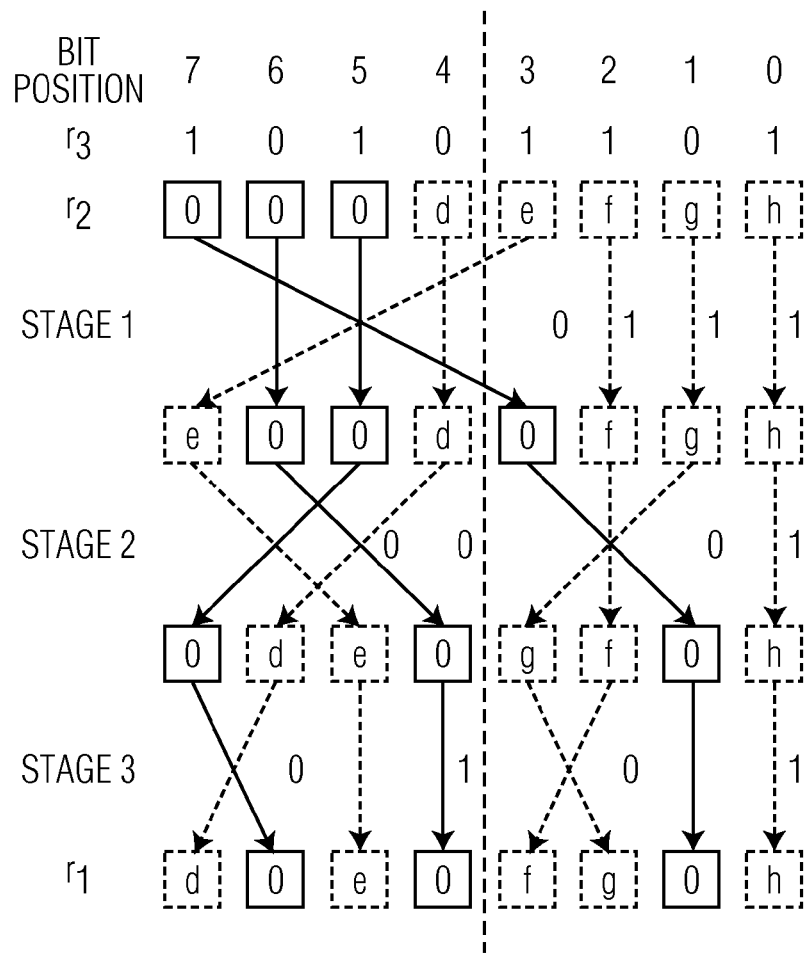

In each subnetwork of stage 3 we again transfer from the local R to the local L the bits whose final destination is in the local L. So in $L_L$ we transfer d and in $L_R$ we transfer e. After stage 3 we have transferred each bit to its correct final destination: d0e0fg0h. Note that we use a control bit of "0" to indicate a swap, and a control bit of "1" to indicate a pass through operation. Rather than explicitly right rotating the data bits in the L half after each stage, we can compensate by modifying the control bits. This is shown in FIG. 21.

Provided below is an explanation as to how the pdep operation can be mapped to the butterfly circuit:
Fact 3:
Any single data bit can be moved to any result position by moving it to the correct half of the intermediate result at every stage of the butterfly circuit.

This can be proved by induction on the number of stages. At stage 1, the data bit is moved within n/2 positions of its final position. At stage 2, it is moved within n/4 positions of its final result, and so on. At stage lg(n), it is moved within $n/2^{lg(n)}=1$ position of its final result, which is its final result position. Referring back to FIG. 20, Fact 3 is utilized to decide which bits to keep in R and which to transfer from R to L at each stage.

Fact 4:

If the mask has k "1"s in it, the k rightmost data bits are selected and moved, i.e., the selected data bits are contiguous. They never cross each other in the final result.

This fact is by definition of the pdep instruction. See the example of FIG. 19, where there are 5 "1"s in the mask and the selected data bits are the 5 rightmost bits, defgh; these bits are spread out to the left maintaining their original order, and thus never crossing each other in the result.

Fact 5:

If a data bit in the right half (R) is swapped with its paired bit in the left half (L), then all selected data bits to the left of it will also be swapped to L (if they are in R) or stay in L (if they are in L).

Since the selected data bits never cross each other in the final result (Fact 4), once a bit swaps to L, the selected bits to the left of it must also go to L. Hence, if there is one "1" in the mask, the one selected data bit, d0, can go to R or L. If there are two "1"s in the mask, the two selected data bits, $d_1 d_0$, can go to RR or LR or LL. That is, if the data bit on the right stays in R, then the next data bit can go to R or L, but if the data bit on the right goes to L, the next data bit must also go to L. If there are three "1"s, the three selected data bits, $d_2 d_1 d_0$, can go to RRR, LRR, LLR or LLL. For example, in stage 1 of FIG. 20, the five bits have the pattern LLRRR as e is transferred to L and d must then stay in L.

Fact 6:

The selected data bits that have been swapped from R to L, or stayed in L, are all contiguous mod n/2 in L.

From Fact 5, the destinations of the k selected data bits $d_{k-1} \ldots d_0$ must be of the form L ... L R ... R, a string of zero or more L's followed by zero or more R's. Define X as the bits staying in R, Y as the bits going to L that start in R and Z as the bits going to L that start in L. It is possible that:

i. X alone exists—when there are no selected data bits that go to L,
ii. Y alone exists—when all bits that start in R go to L and there are no selected data bits that start in L and,
iii X and Y exist—when some bits that start in R stay in R and some go to L and there are no selected data bits that start in L and,
iv. X and Z exist—when all the bits in R are going to R, and all bits going to L start in L, or
v. X, Y and Z exist.

When X alone exists (i), there are no bits that go to L, so Fact 6 is irrelevant.

The structure of the butterfly circuit requires that when bits are moved in a stage, they all move by the same amount. Fact 4 states that the selected data bits are contiguous. Together these imply that when Y alone exists or X and Y exist (ii and iii), Y is moved as a contiguous block from R to L and Fact 6 is trivially true.

When X and Z exist (iv), Z is a contiguous block of bits that does not move so again Fact 6 is trivially true.

Figure 22:
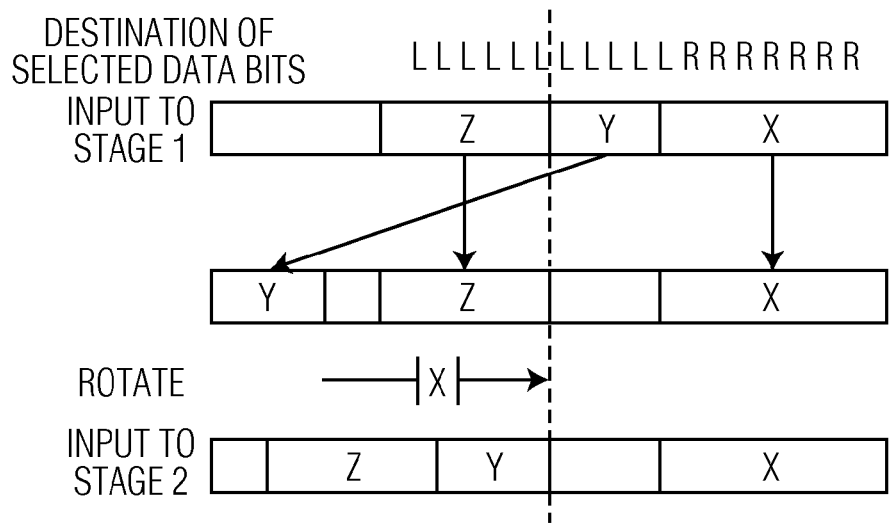

When X, Y and Z exist (v), Y comprises the leftmost bits of R, and Z the rightmost bits in L since they are contiguous across the midpoint of the stage (Fact 4). When Y is swapped to L, since the butterfly circuit moves the bits by an amount equal to the size of L or R in a given stage, Y becomes the leftmost bits of L. Thus Y and Z are now contiguous mod n/2, i.e., wrapped around, in L, as shown in FIG. 22. Thus, Fact 6 is true in all cases.

For example, in FIG. 20 at the input to stage 1, X is bits fgh, Y is bit e and Z is bit d. Y is the leftmost bit in R and Z is the rightmost bit in L. After stage 1, Y is the leftmost bit in L and is contiguous with Z mod 4, within L, i.e., de is contiguous mod 4 in e00d.

Fact 7:

The selected data bits in L can be rotated so that they are the rightmost bits of L, and in their original order.

From Fact 6, the selected data bits are contiguous mod n/2 in L. At the output of stage 1 in FIG. 22, these bits are offset to the left by the size of X (the number of bits that stayed in R), denoted by |X|. Thus, if we explicitly rotate right the bits by |X|, the selected data bits in L are now the rightmost bits of L in their original order (see FIG. 22). In FIG. 20, Fact 7 was utilized prior to stages 2 and 3.

At the end of this step, we have two half-sized butterfly circuits, L and R, with the selected data bits right-aligned and in order in each of L and R (last row of FIG. 22). The above can now be repeated recursively for the half-sized butterfly circuits, L and R, until each L and R is a single bit. This is achieved after lg(n) stages of the butterfly circuit (see the final output in FIG. 20).

The selected data bits emerge from stage 1 in FIG. 22 rotated to the left by |X|. In Fact 7, the selected data are explicitly rotated b its back to the fight by |X|. Instead, we can compensate for the rotation by modifying the control bits of the subsequent stages to limit the rotation within each sub-network. For example, if the n-bit input to stage 1 is rotated by k positions, the two n/2-bit inputs to the L and R subnetworks are rotated by k (mod n/2) within each subnetwork. At the output of stage lg(n), the subnetworks are 1-bit wide so the rotations are absorbed.

Fact 8:

If the data bits are rotated by x positions left (or right) at the input to a stage of a butterfly circuit, then at the output of that stage we can obtain a rotation left (or right) by x positions of each half of the output bits by rotating left (or right) the control bits by x positions and complementing upon wrap around.

Figure 23:
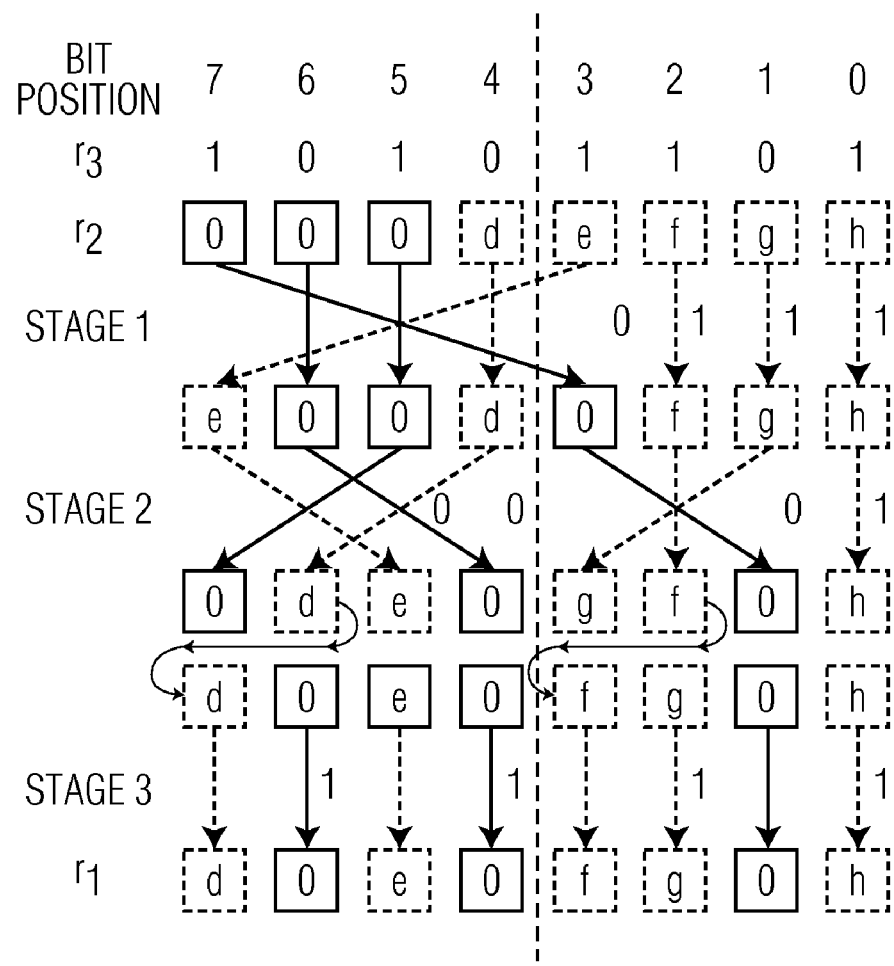

Consider again the example of FIG. 20. The selected data bits emerge from stage 1 left rotated by 3 bits, i.e., L is e00d, left rotated by 3 positions from 00de. In FIG. 20, we explicitly rotated the data bits back to the right by 3. Instead, we can compensate for this left rotation by left rotating and complementing upon wrap around by 3 positions the control bits of the subsequent stages. This is shown in FIG. 23. For stage 2, the control bit pattern of L, after left rotate and complement by 3, becomes 01→11→10→00. The rotation by 3 is limited to a rotation by 3 mod 2=1 within each half of the output of L of stage 2. In FIG. 23, we show the explicit rotation of the output of stage 2 before it is input to stage 3 to transform from d0,0e in FIG. 20 to 0d,e0. For stage 3, the rotation and complement by 3 of the two single control bits in L become three successive complements: 0→1→0→1, and the left rotation of L is absorbed as the overall output is still d0e0. Hence, FIG. 23 shows how the control bits in stages 2 and 3 compensate for the left rotate by 3 bits at the output of stage 1 (compare with FIG. 20).

FIG. 21 shows the control bits after also compensating for the left rotate by 1 bit of $R_L$ and $L_L$, prior to stage 3 in FIG. 23. The explicit right rotation prior to stage 3 is eliminated. Instead, the two control bits in $R_L$ and $L_L$ transform from 1→0 to absorb the rotation. The overall result in FIG. 21 remains the same as in FIG. 20, by compensating for the explicit data rotations in FIG. 20 with rotations of the control bits instead, complementing them on wraparound.

Figure 24:
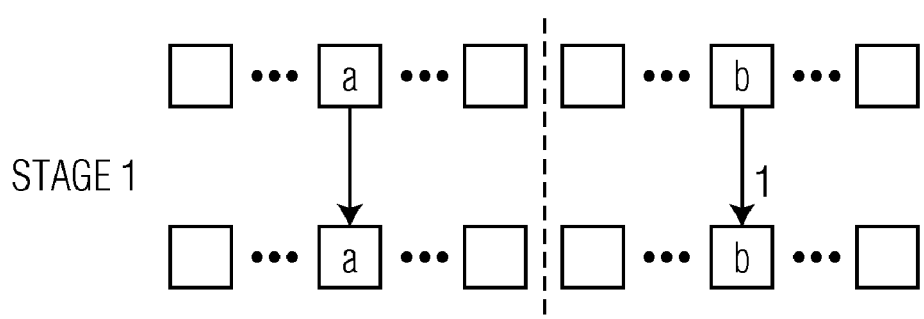
Figure 25:
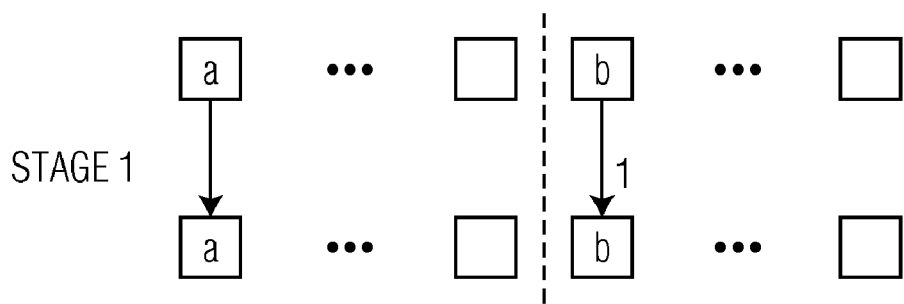
Figure 26:
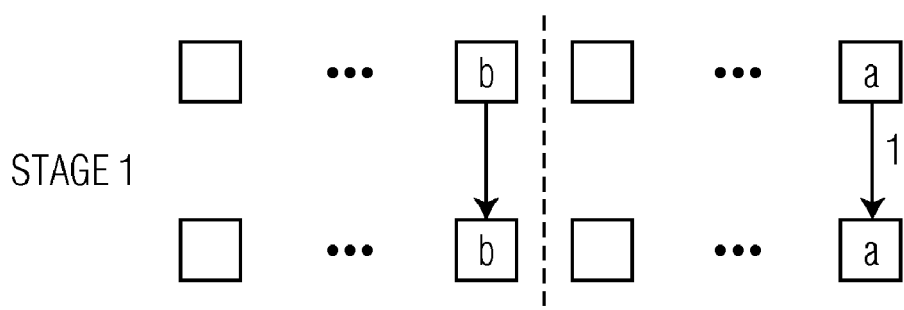
Figure 27:
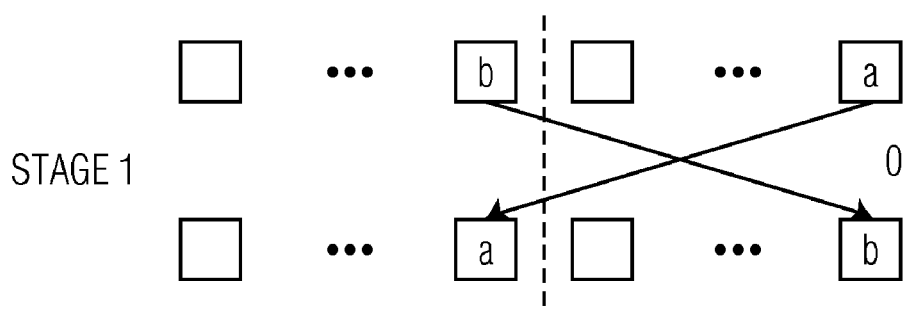
Figure 28:
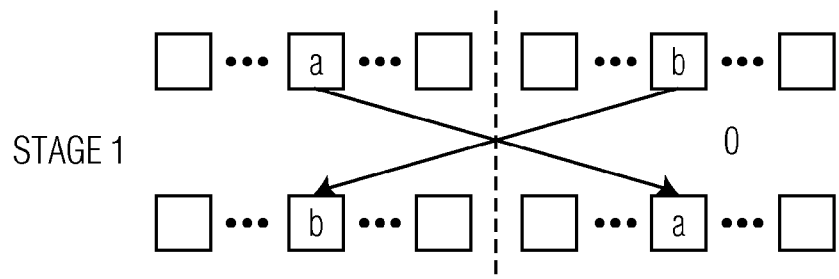
Figure 29:
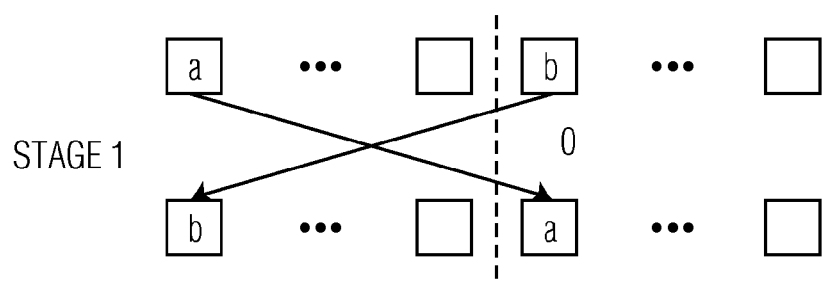
Figure 30:
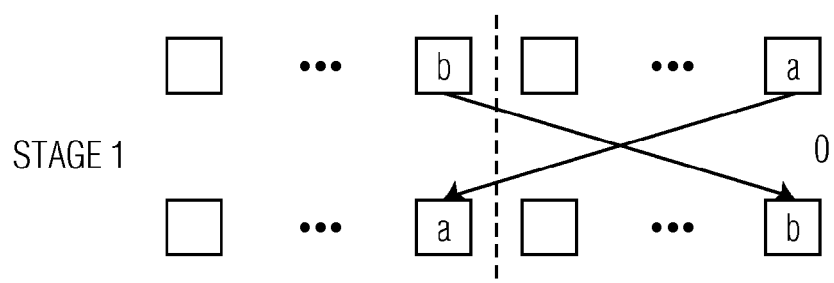
Figure 31:
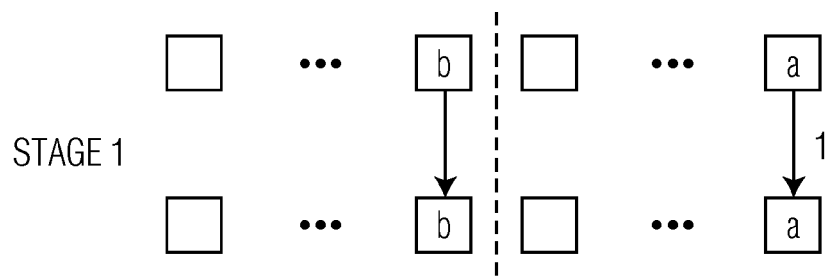

An explanation is now provided as to why the control bits are complemented when they wrap around. The goal is to keep the data bits in the half they were originally routed to at each stage of the butterfly circuit, in spite of the rotation of the input. FIG. 24 shows a pair of bits, a and b, that were originally passed through. It is desired to route a to L and b to R in spite of any rotation. As the bits are rotated (see FIG. 25), the control bit is rotated with them, keeping a in L and b in R, as desired. When the bits wrap around, (see FIG. 26), a wraps to R and b crosses the midpoint to L. If the control bit is simply rotated with the paired bits, then a is now passed through to R and b is passed through to L, which is contrary to the originally desired behavior. If instead the control bit is complemented when it wraps around (see FIG. 27), then a is swapped back to L and b is swapped back to R, as is desired.

Similarly, if a and b were originally swapped (see FIG. 28), a should be routed to R and b to L. As the bits rotate (see FIG. 29), we simply rotate the control bit with them. When the bits wrap around (see FIG. 30), input a wraps to R and b crosses to L. When they are swapped, a is routed to L and b to R, contrary to their original destinations. If the control bit is complemented on wraparound, a is passed through to R and b is passed through to L, conforming to the originally desired behavior.

Thus, complementing the control bit when it wraps (see FIG. 31) causes each of the pair of bits to stay in the half it was originally routed to despite the rotation of the input pushing each bit to the other half. This limits the rotation of the input to be within each half of the output and not across the entire output.

Provided below is a theorem to formalize the overall result:

Theorem 2:

Any parallel deposit instruction on n bits can be implemented with one pass through a butterfly circuit of $\lg(n)$ stages without path conflicts (with the bits that are not selected zeroed out externally).

Proof:

Assume there are k "1"s in the right half of the bit mask. Then, based on Fact 3, the k rightmost data bits (block X) must be kept in the right half (R) of the butterfly circuit and the remaining contiguous selected data bits must be swapped (block Y) or passed through (block Z) to the left half (L). This can be accomplished in stage 1 of the butterfly circuit by setting the k rightmost configuration bits to "1" (to pass through X and Z), and the configuration bits of the remaining selected bits to "0" (to swap Y).

At this point, the selected data bits in the right subnetwork (R) are right-aligned but those in the left subnetwork (L) are contiguous mod n/2, but not right aligned (Fact 4, FIG. 22); they are rotated left by the size of block X or the number of bits kept in R. We can compensate for the left rotation of the bits in L and determine the control bits for subsequent stages as if the bits in L were right aligned. This is accomplished by left rotating and complementing upon wraparound the control bits in the subsequent stages of L by the number of bits kept in R (once these control bits are determined pretending that the data bits in L are right aligned). Modifying the control bits in this manner will limit the rotation to be within each half of the output until the rotation is absorbed after the final stage (Fact 8).

Now the process above can be repeated on the left and right subnets, which are themselves butterfly networks: count the number of "1"s in the local right half of the mask and then keep that many bits in the right half of the subnetwork, and swap the remaining selected data bits to the left half. Account for the rotation of the left half by modifying subsequent control bits. This can be repeated for each subnetwork in each subsequent stage until the final stage is reached, where the final parallel deposit result will have been achieved (see FIG. 21).

Various functional units can be constructed in accordance with the present invention, for implementing any desired combinations of parallel extract, parallel deposit, butterfly permutations, and inverse butterfly permutations. Examples of such functional units will now be discussed with reference to FIGS. 32-37.

Figure 32:
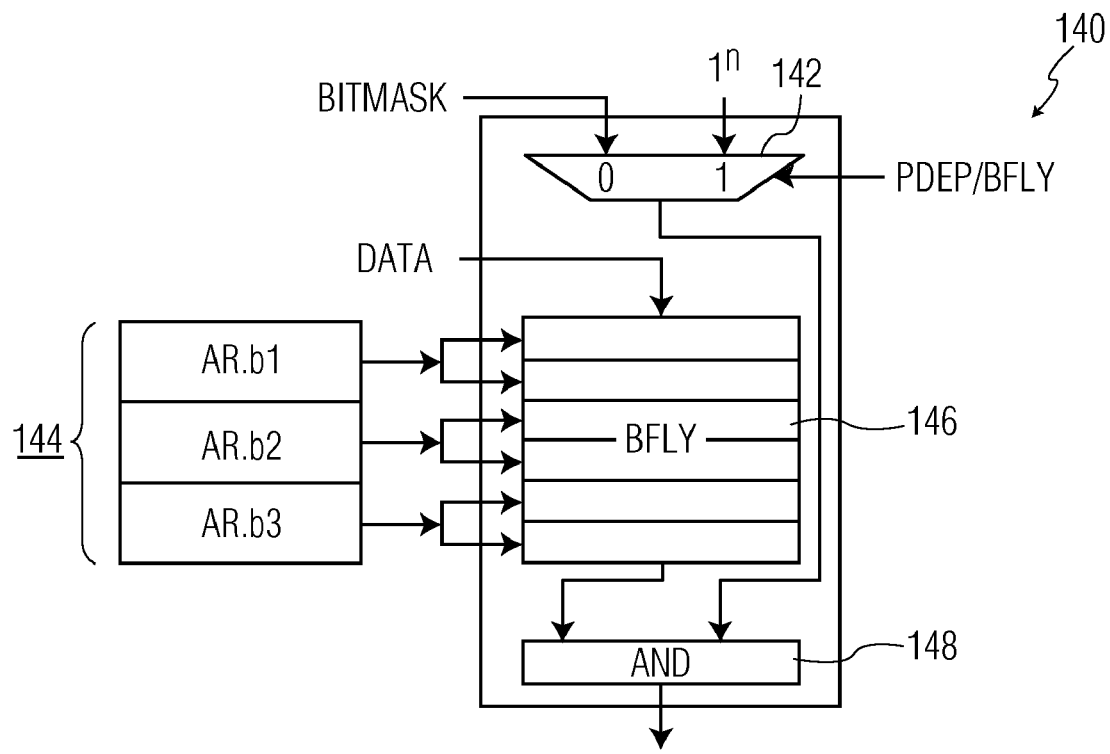
FIGS. 32-37 are diagrams showing various functional units in accordance with the present invention for implementing combinations of parallel extract, parallel deposit, butterfly permutations, and inverse butterfly permutations.

FIG. 32 is a diagram showing a functional unit 140 in accordance with the present invention, which supports parallel deposit and butterfly permutation instructions. The unit 140 includes a butterfly circuit 146 and a masking stage (multiplexer 142 and AND gates 148) and extra register storage (registers 144) to hold the configuration for the butterfly circuit (FIG. 16 shows the control generation for a 64-bit functional unit with 6 stages). The masking stage zeroes the bits not selected in the pdep operation. For bfly, we use a mask of all "1"s. The extra registers 144 are associated with the functional unit and hold the control bits for the butterfly circuit. Some ISAs have pre-defined application registers that can be used as these extra registers: they are called special function registers in PA-RISC or application registers (ARs) in the Intel Itanium ISA. The functional unit 140 supports butterfly permutations since the application registers 144 can be explicitly loaded with the configuration for some permutation. Parallel deposit is also supported. The ARs 144 can be loaded with this configuration and then the input is permuted through the butterfly circuit 146; the bits that are not needed are then masked out using the bit mask that defines the desired parallel deposit operation.

Figure 33:
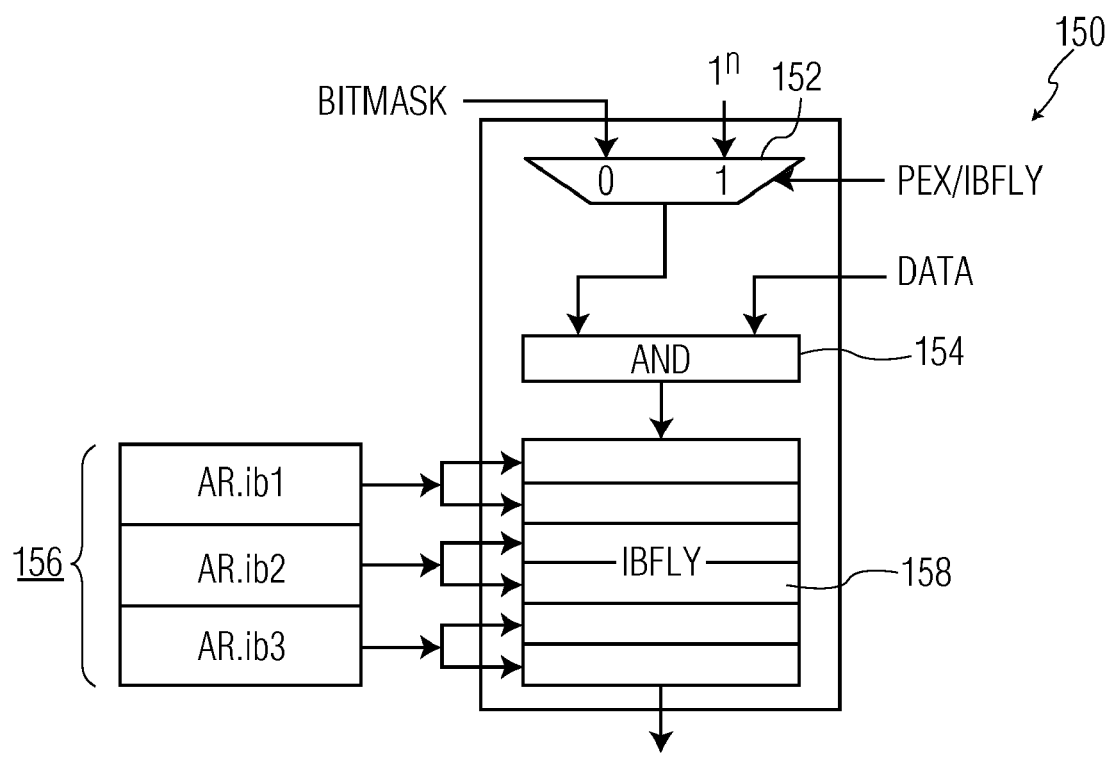

FIG. 33 is a diagram showing another functional unit 150 in accordance with the present invention, based upon an inverse butterfly circuit. The functional unit 150 contains a masking stage (multiplexer 152 and AND gate 154) followed by an inverse butterfly circuit 158 and a set of application registers 156 to hold the configuration. The ARs 156 are loaded with the configuration for some inverse butterfly permutation or a parallel extract operation. For parallel extract we mask out the undesired bits with the bit mask and then we permute through the inverse butterfly circuit.

Figure 34:
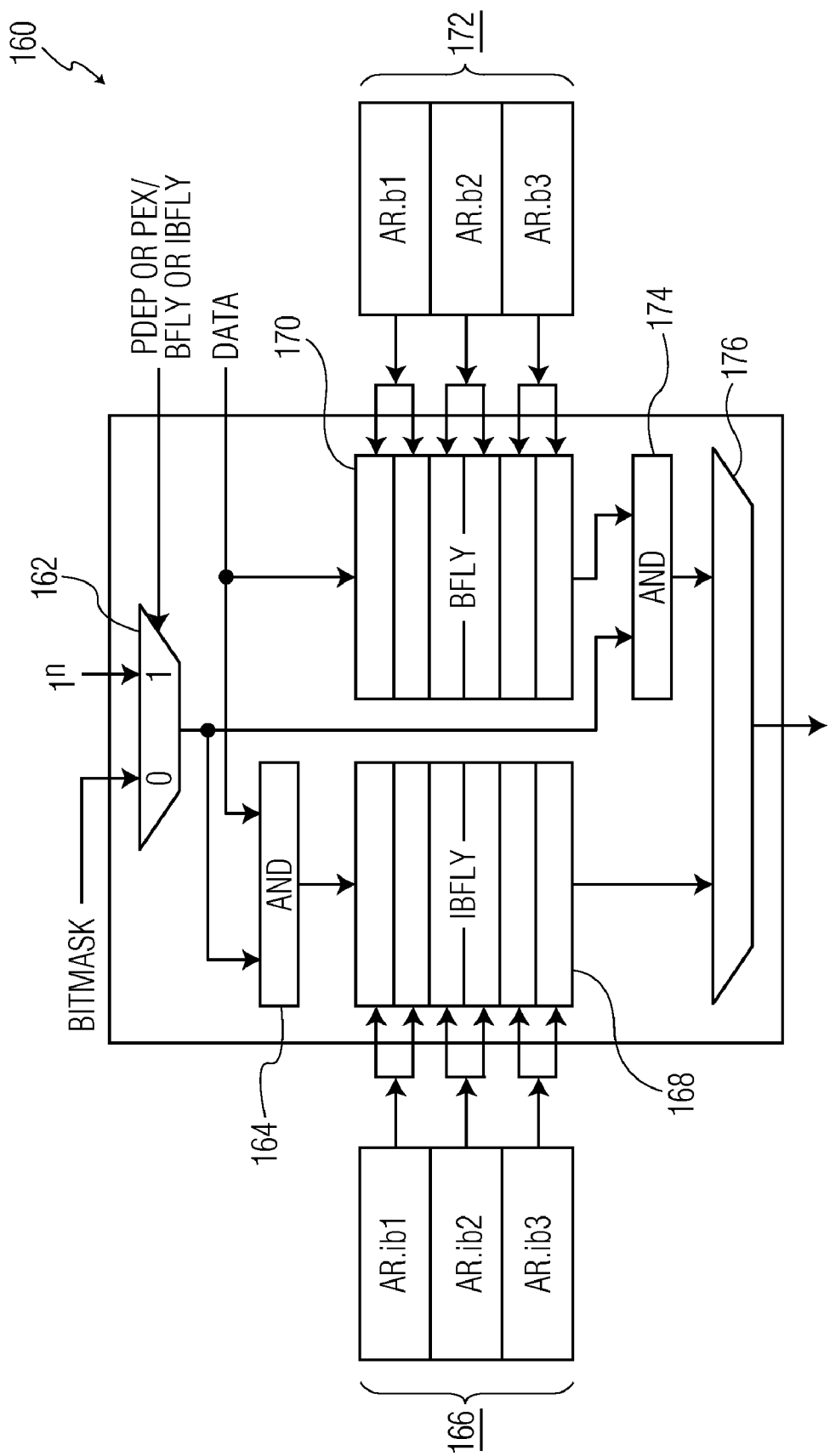

FIG. 34 is a diagram showing another functional unit 160 in accordance with the present invention, which includes butterfly and inverse butterfly circuits. The unit 160 can handle parallel extract, parallel deposit, butterfly permutations, and inverse butterfly permutations, and includes multiplexers 162 and 176, AND gates 164 and 174, application registers 166 and 172, inverse butterfly circuit 168, and butterfly circuit 170.

Figure 35:
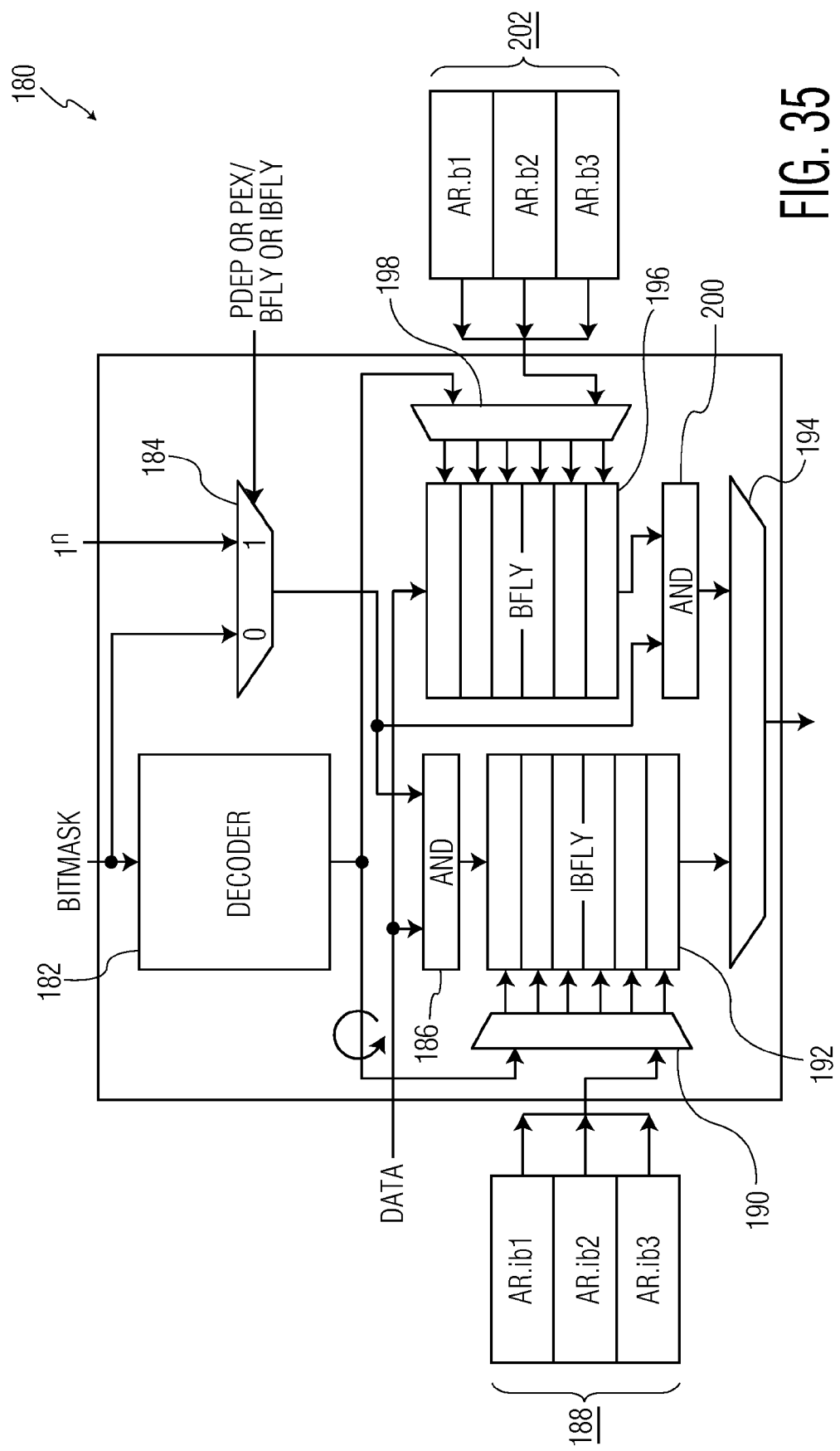

FIG. 35 is a diagram showing another functional unit 180 in accordance with the present invention, which is similar in construction to the functional unit 160 of FIG. 34 and includes a decoder 182 and associated multiplexers 190 and 198. Similar to the functional unit 160 of FIG. 34, the unit 180 includes multiplexers 184 and 194, AND gates 186 and 200, application registers 188 and 202, inverse butterfly circuit 192, and butterfly circuit 196. The unit 160 allows for static parallel deposit or parallel extract operations (i.e., operations where the control bits are calculated a priori by a programmer or a compiler). The unit 180 further allows for variable parallel deposit or parallel extract operations (i.e., where the control bits for the butterfly or inverse butterfly are calculated by the hardware decoder 182, dynamically during the program's execution, and not statically by the programmer or compiler). The input of the decoder 182 is the n-bit mask and the output is the set of $n/2 \times \lg(n)$ control bits for pdep or pex. The decoder circuit 182 can be used for both pex and pdep with the caveat that the ordering of the stages that control bits are routed to is reversed (the circular arrow in FIG. 35 indicates reversing the stages).

Figure 36:
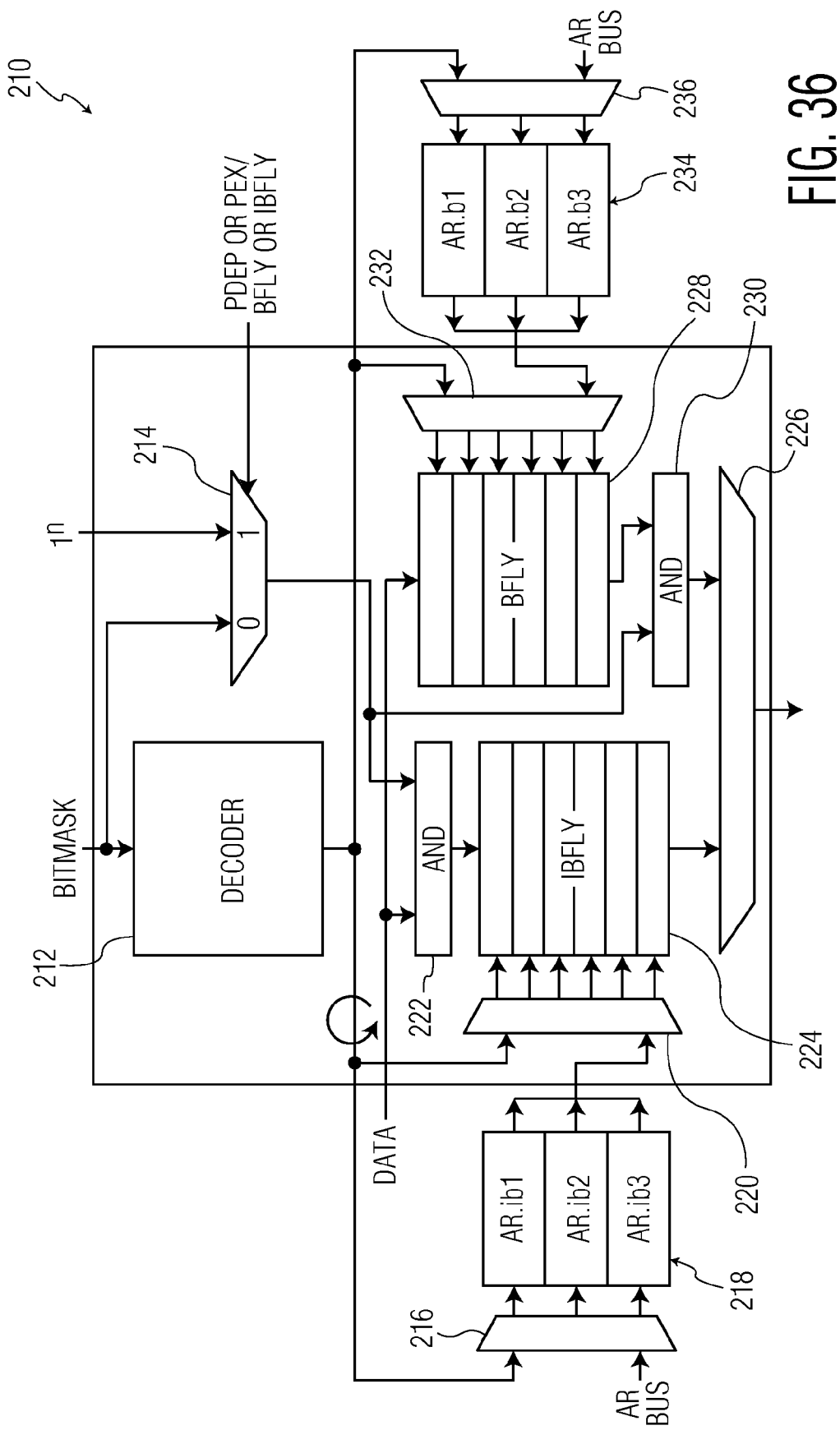

FIG. 36 is a diagram showing another functional unit 210 in accordance with the present invention, which handles loop invariants. In loop invariant conditions, the configuration is only known at runtime but it is unchanging across many iterations of a loop. Similar to the functional unit 180 shown in FIG. 35, a decoder circuit 212 and associated multiplexers 220 and 232 are provided. Additional multiplexers 216 and 236 are provided, which allow for selective loading of a configuration for pex or pdep operations into the application registers 218 and 234. This has the advantage of removing the decoder from the critical path, thus decreasing latency for the subsequent pex or pdep instructions, and also possibly conserving power by shutting down the decoder circuitry. The other components of the functional unit 210 are similar to the functional units discussed above, and include multiplexers 214 and 226, AND gates 222 and 230, inverse butterfly circuit 224, and butterfly circuit 228.

Figure 37:
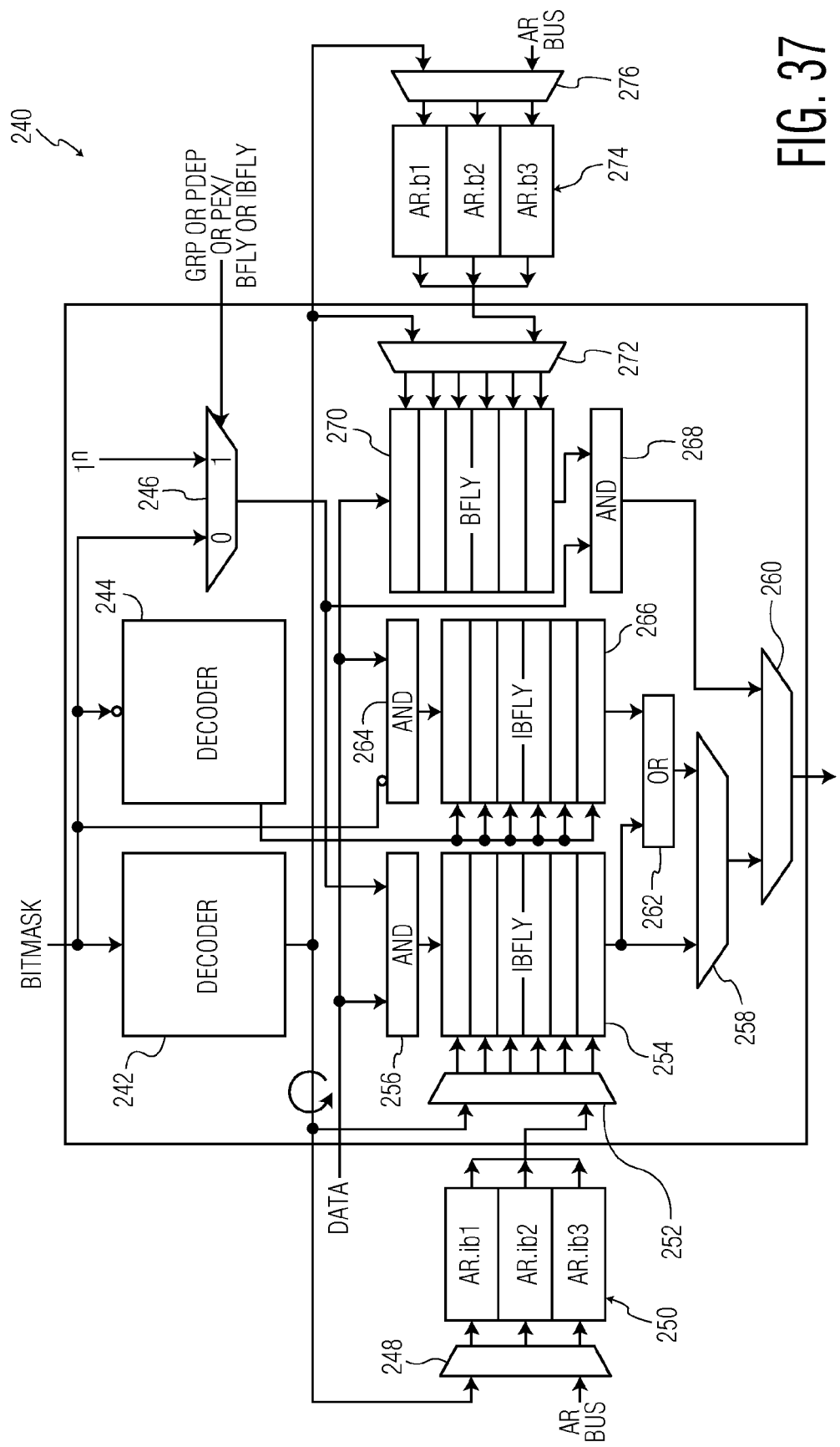

FIG. 37 is a diagram showing another functional unit 240 in accordance with the present invention, which supports the grp permutation instruction. The grp permutation instruction is equivalent to a standard parallel extract ORed with a "parallel extract to the left" of the bits selected with "0"s. To provide this functionality, an additional decoder 242 is provided, as well as an additional AND gate 264 an OR gate 262, a secondary inverse butterfly circuit 266, and an additional multiplexer 258. The remaining components (i.e., decoder 244, multiplexers 246 and 260, AND gates 256 and 268, multiplexers 248, 252, 272, and 276, application registers 250 and 274, inverse butterfly circuit 254, and butterfly circuit 270) are identical to the components of the functional unit 210 shown in FIG. 36.

The various functional units discussed above in connection with FIGS. 32-37 can implement a wide variety of advanced bit manipulation instructions. Table 7 below summarizes these instructions, as well as the processor cycles required for each instruction. Note that Table 7 is similar to the bottom half of Table 1, with the addition of the grp instruction and associated cycle counts. A 64-bit word size, without loss of generality, is assumed:

Static versions of pex and pdep are used when desired mask patterns are known at compile time. In the static version of the pex instruction, GR $r_2$ is and'ed with mask GR $r_3$, then permuted using inverse butterfly application registers $ar.ib_{1-3}$, with the result placed in GR $r_1$. For static pdep, GR $r_2$ is permuted using butterfly application registers $ar.b_{1-3}$, then and'ed with mask GR $r_3$, with the result placed in GR $r_1$.

Dynamic or variable versions of pex and pdep are used when desired mask patterns are only known at runtime. In the pex.v instruction, the data bits in GR $r_2$ selected by the "1" bits in the mask GR $r_3$ are placed, in the same order, in GR $r_1$. In the pdep.v instruction, the right justified bits in GR $r_2$ are placed in the same order in GR $r_1$, in the positions selected by "1"s in mask GR $r_3$. For both instructions, the mask $r_3$ is translated dynamically by a decoder into control bits for an inverse butterfly or butterfly circuit.

Suppose the particular pattern of bit scatter or gather is determined at execution time, but this pattern remains the same over many iterations of a loop. This is referred to as a loop-invariant pex or pdep operation. The setib and setb instructions invoke a hardware decoder to dynamically translate the bitmask GR $r_3$ to control bits for the datapath stages; these control bits are written to the inverse butterfly or butterfly application registers, respectively, for later use in static pex and pdep instructions. Table 7 also shows the grp instruction which can perform arbitrary n-bit permutations. It is noted that the grp instruction can be emulated by a short sequence of pex and Boolean instructions.

The last column of Table 7 shows the expected number of cycles taken for the execution of the instruction. All static instructions (with pre-loaded ARs) take a single cycle, comparable to the time taken for an add instruction. The hardware decoder takes about 2 cycles, hence the setib and setb instructions take 2 cycles each. The variable pex.v and pdep.v and grp instructions each take up to 3 cycles each because they have to go through the hardware decoder first and then incur

TABLE 7

| Instruction | Description | Cycles |
|---|---|---|
| bfly $r_1 = r_2$, $ar.b_1$, $ar.b_2$, $ar.b_3$ | Perform Butterfly permutation of data bits using controls in associated ARs | 1 |
| ibfly $r_1 = r_2$, $ar.ib_1$, $ar.ib_2$, $ar.ib_3$ | Perform Inverse Butterfly permutation of data bits using controls in associated ARs | 1 |
| pex $r_1 = r_2, r_3$, $ar.ib_1$, $ar.ib_2$, $ar.ib_3$ | Parallel extract, static: Data bits in $r_2$ selected by a mask $r_3$ are extracted, compressed and right-aligned in the result $r_1$, using datapath controls which have been pre-decoded from the mask and placed in the associated ARs | 1 |
| pdep $r_1 = r_2, r_3$, $ar.b_1$, $ar.b_2$, $ar.b_3$ | Parallel deposit, static: Right-aligned data bits in $r_2$ are deposited, in order, in result $r_1$ in bit positions marked with a "1" in the mask $r_3$, which has been pre-decoded to give datapath controls placed in the associated ARs. | 1 |
| mov ar.x = $r_2, r_3$ | Move values from GRs to ARs, to set datapath controls (calculated by software) for pex, pdep, bfly or ibfly | 1 |
| pex.v $r_1 = r_2, r_3$ | Parallel extract, variable: Data bits in $r_2$ selected by a dynamically-decoded mask $r_3$ are extracted, compressed and right-aligned in the result $r_1$. | 3 |
| pdep.v $r_1 = r_2, r_3$ | Parallel deposit, variable: Right-aligned data bits in $r_2$ are deposited, in order, in result $r_1$ in bit positions marked with a "1" in the dynamically-decoded mask $r_3$. | 3 |
| setib $ar.ib_1, ar.ib_2, ar.ib_3 = r_3$ | Set inverse butterfly datapath controls in the associated ARs, using hardware decoder to translate the mask $r_3$ to inverse butterfly controls. | 2 |
| setb $ar.b_1, ar.b_2, ar.b_3 = r_3$ | Set butterfly datapath controls in the associated ARs, using hardware decoder to translate the mask $r_3$ to butterfly controls. | 2 |
| grp $r_1 = r_2, r_3$ | Perform Group permutation (variable): Data bits in $r_2$ corresponding to "1"s in $r_3$ are grouped to the right, while those corresponding to "0"s are grouped to the left. | 3 |

For bfly and ibfly, the data bits in GR $r_2$ are permuted and placed in the destination register GR $r_1$. Application registers $ar.b_i$ and $ar.ib_i$, i=1, 2, 3, are used to hold the configuration bits for the butterfly or inverse butterfly datapath, respectively, and these registers must first be loaded by the mov_ar instruction. The mov_ar instruction in Table 7 is used to move the contents of two general-purpose registers to the application registers. The sub-opcode, x, indicates which application register, or pair of application registers, are written.

some additional datapath latency through the inverse butterfly or butterfly circuits and the output multiplexers. It is noted that the cycle counts depend on what a given processor uses to determine the cycle time. Here, it is assumed, without loss of generality, that the latency of an ALU is used to determine the cycle time. Also, it is noted that these cycle counts can change depending on the circuit optimization performed.

Table 8 summarizes applications in which the present invention can be implemented. Check marks indicate definite usage, check marks in parenthesis indicate usage in alternative algorithms and question marks indicate potential usage. The use of the mov ar instruction is assumed (but not shown in Table 8) whenever the bfly, ibfly, or static pex and pdep instructions are used. Note that these are just representative applications and do not constrain the use of the proposed instructions and shifter circuits in other applications or in different ways in these applications.

TABLE 8

| Application | | bfly and ibfly | pex | setib | pdep | setb | pex.v | pdep.v | grp |
|---|---|---|---|---|---|---|---|---|---|
| Cryptology | | ✓ | ? | ? | ? | ? | ? | ? | (✓) |
| Binary Compression | | | ✓ | | | | | | |
| Binary Decompression/Expansion | | | | | ✓ | | | | |
| LSB Steganography | Encoding | | | | ✓ | ✓ | | | |
| | Decoding | | ✓ | ✓ | | | | | |
| Binary Image Morphology | | | ✓ | | | | (✓) | | |
| Transfer Coding | Encoding | | | | ✓ | | | | |
| | Decoding | | ✓ | | | | | | |
| Bioinformatics | Compression | | ✓ | | | | | | |
| | Reversal | ✓ | | | | | | | |
| | Translation | | | | ✓ | | | | |
| | Alignment | | ✓ | | | | | | |
| Compressed Integers | Encoding | | | | ✓ | | | | |
| | Decoding | | ✓ | | | | | | |
| Random Number Generation | | | | | | | | ✓ | |

Table 8 shows that static pex and pdep are the most frequently used. The variable pdep.v is not used at all, and the variable pex.v is only used twice. The loop-invariant pex and pdep instructions, indicated by the use of setib and setb instructions, are only used for the LSB Steganography application. The grp instruction is only used in a block cipher.

Figure 38:
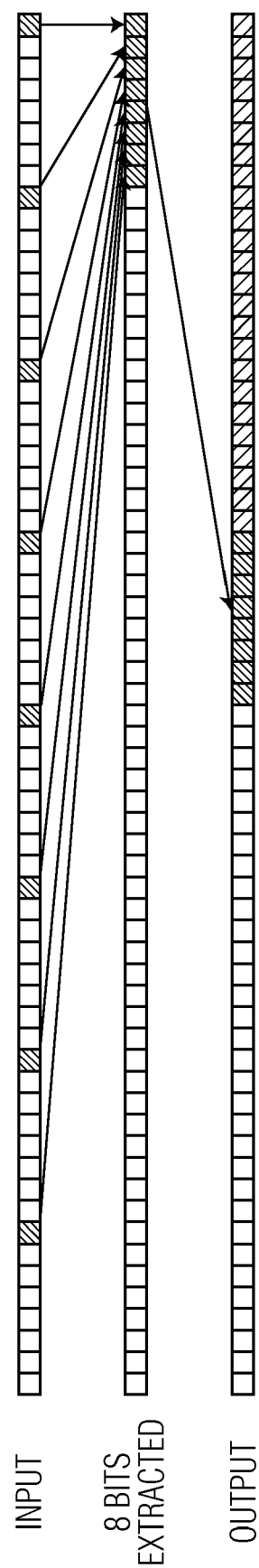
FIG. 38 is a diagram showing a bit compression procedure capable of being carried out by the present invention.

FIG. 38 is a diagram showing a bit compression procedure capable of being carried out by the present invention. The ITANIUM IA-64 and IA-32 parallel compare instructions produce subword masks—the subwords for which the relationship is false contain all zeros and for which the relationship is true contain all ones. This representation is convenient for subsequent subword masking or merging. The SPARC VIS parallel compare instruction produces a bit mask of the results of the comparisons. This representation is convenient if some decision must be made based on the outcome of the multiple comparisons. Converting from the subword representation to the bitmask representation for k subwords requires k extract instructions to extract a bit from each subword and k−1 deposit instructions to concatenate the bits; a single static pex instruction accomplishes the same thing.

The SSE instruction pmovmskb serves a similar purpose; it creates an 8- or 16-bit mask from the most significant bit from each byte of a MMX or SSE register and stores the result in a general purpose register. However, pex offers greater flexibility than the fixed pmovmskb, allowing the mask, for example, to be derived from larger subwords, or from subwords of different sizes packed in the same register.

Similarly, binary image compression performed by MATLAB's bwpack function benefits from pex. Binary images in MATLAB are typically represented and processed as byte arrays—a byte represents a pixel and has permissible values 0x00 and 0x01. However, certain optimized algorithms are implemented for a bitmap representation, in which a single bit represents a pixel.

To produce one 64-bit output word requires only 8 static pex instructions to extract 8 bits in parallel from 8 bytes and 7 dep instructions to pack these eight 8-bit chunks into one output word (see FIG. 38). For decompression, as with the bwunpack function, only 7 extr instructions are required to pull out each byte and only 8 pdep instructions to scatter the bits of each byte to byte boundaries.

Figure 39:
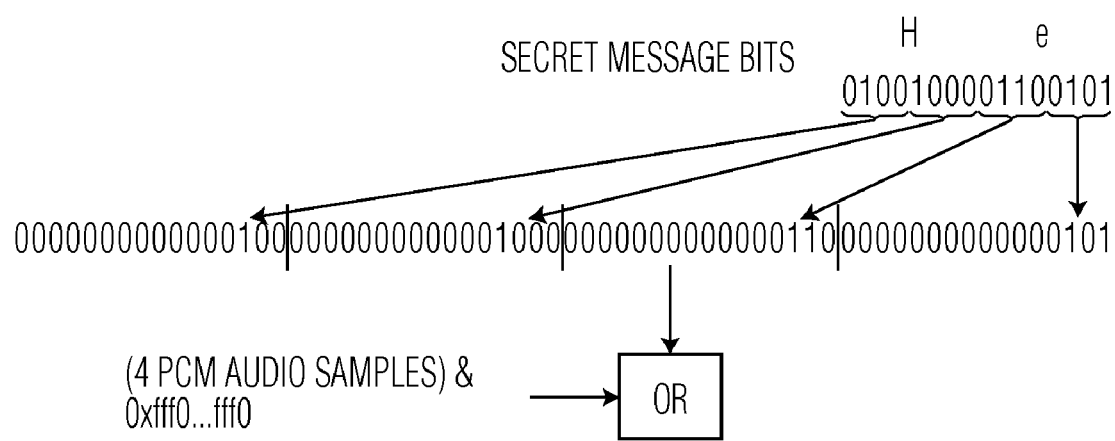
FIG. 39 shows a steganography procedure capable of being carried out by the present invention.

FIG. 39 shows a steganography procedure capable of being carried out by the present invention. Steganography refers to the hiding of a secret message by embedding it in a larger, innocuous cover message. A simple type of steganography is least significant bit (LSB) steganography in which the least significant bits of the color values of pixels in an image, or the intensity values of samples in a sound file, are replaced by secret message bits. LSB steganography encoding can use a pdep instruction to expand the secret message bits and place them at the least significant bit positions of every subword. Decoding uses a pex instruction to extract the least significant bits from each subword and reconstruct the secret message.

LSB steganography is an example of an application that utilizes the loop-invariant versions of the pex and pdep instructions. The sample size and the number of bits replaced are not known at compile time, but they are constant across a single message. FIG. 39 depicts an example LSB steganography encoding operation in which the 4 least significant bits from each 16-bit sample of PCM encoded audio is replaced with secret message bits.

Figure 40:
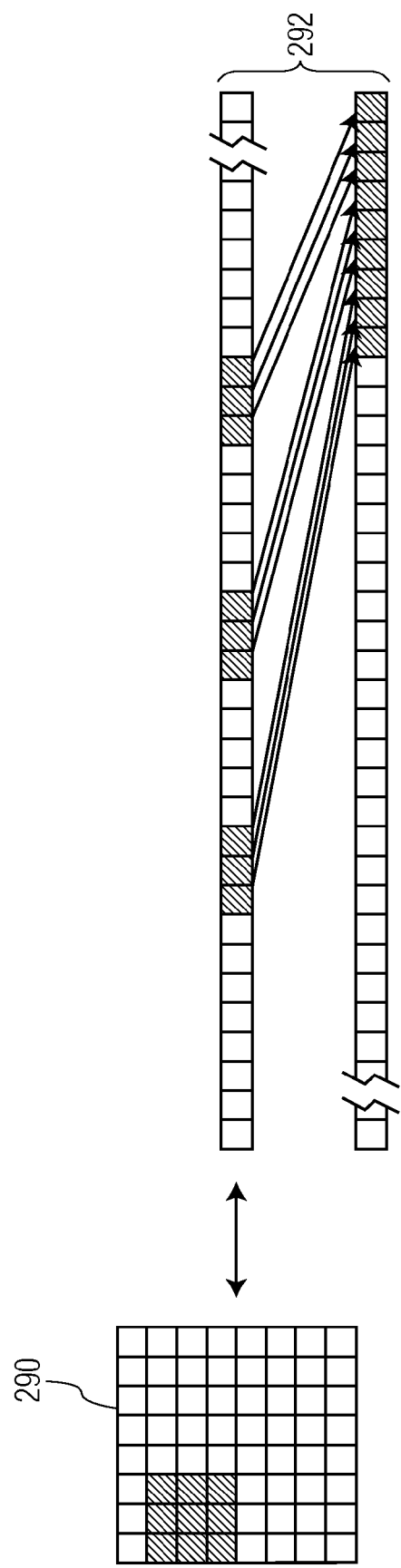
FIG. 40 shows a binary image morphology procedure capable of being carried out by the present invention.

FIG. 40 shows a binary image morphology procedure capable of being carried out by the present invention. Binary image morphology is a collection of techniques for binary image processing such as erosion, dilation, opening, closing, thickening, thinning, etc. The bwmorph function in MATLAB implements these techniques primarily through one or more table lookups applied to the 3×3 neighborhood surrounding each pixel (i.e. the value of 9 pixels is used as index into a 512 entry table). In its current implementation, bwmorph processes byte array binary images, not bitmap images, possibly due to the difficulty in extracting the neighborhoods in the bitmap form.

If the images are processed in bitmap form, a single pex instruction extracts the entire index at once (assuming a 64-bit word contains an 8×8 block of 1-bit pixels, illustrated at 290 in FIG. 40). As the algorithm steps through the pixels, the neighborhood moves (illustrated at 292 in FIG. 40). This means that the bitmask for extracting the neighborhood is shifted and a dynamic pex.v instruction may be needed. Alternatively, the data might be shifted, rather than the mask, such that the desired neighborhood always exists in a particular set of bit positions. In this case, the mask is fixed, and only a static pex is needed. Table 8 indicates the latter—with pex indicated by a check mark and pex.v in parenthesis for the alternative algorithm.

Figure 41:
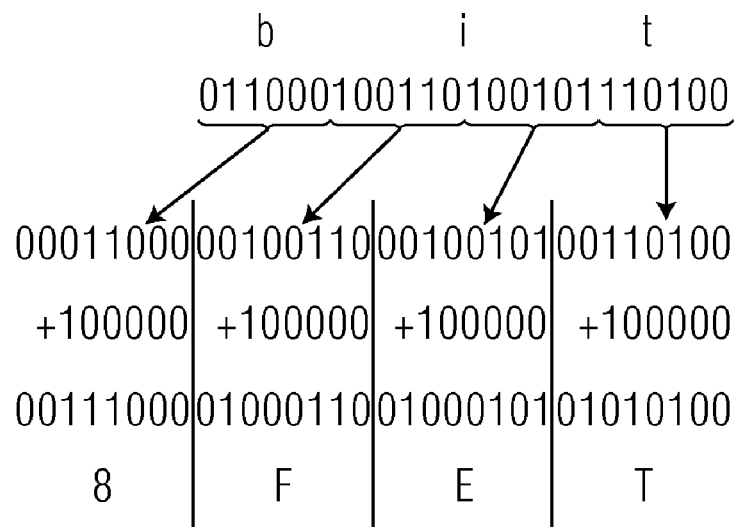
FIG. 41 shows a transfer coding procedure capable of being carried out by the present invention.

FIG. 41 shows a transfer coding procedure capable of being carried out by the present invention. Transfer coding is the term applied when arbitrary binary data is transformed to a text string for safe transmission using a protocol that expects only text as its payload. Uuencoding is one such encoding originally used for transferring binary data over email or usenet. In uuencoding, each set of 6 bits is aligned on a byte boundary and 32 is added to each value to ensure the result is in the range of the ASCII printable characters. Without pdep, each field is individually extracted and has the value 32 added to it. With pdep, 8 fields are aligned at once and a parallel add instruction adds 32 to each byte simultaneously (FIG. 41 shows 4 parallel fields). Similarly, for decoding, a parallel subtract instruct deducts 32 from each byte and then a single pex compresses eight 6-bit fields.

Figure 42:
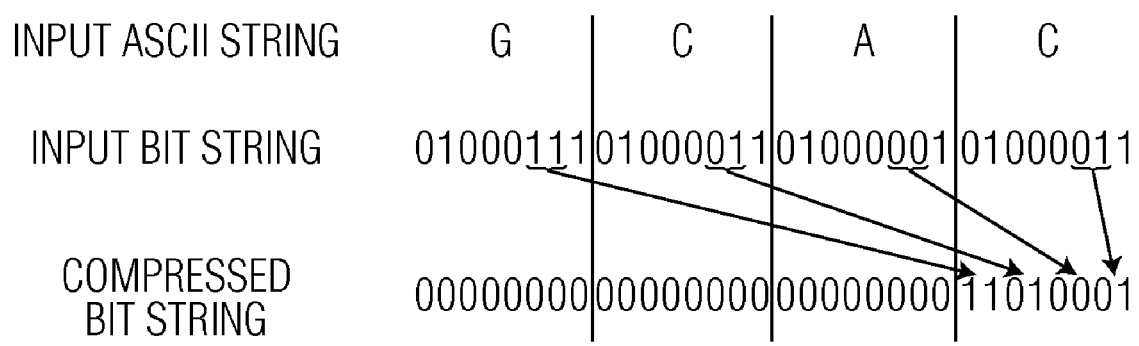
FIGS. 42-44 show sample bioinformatics operations which are capable of being carried out by the present invention.
Figure 43:
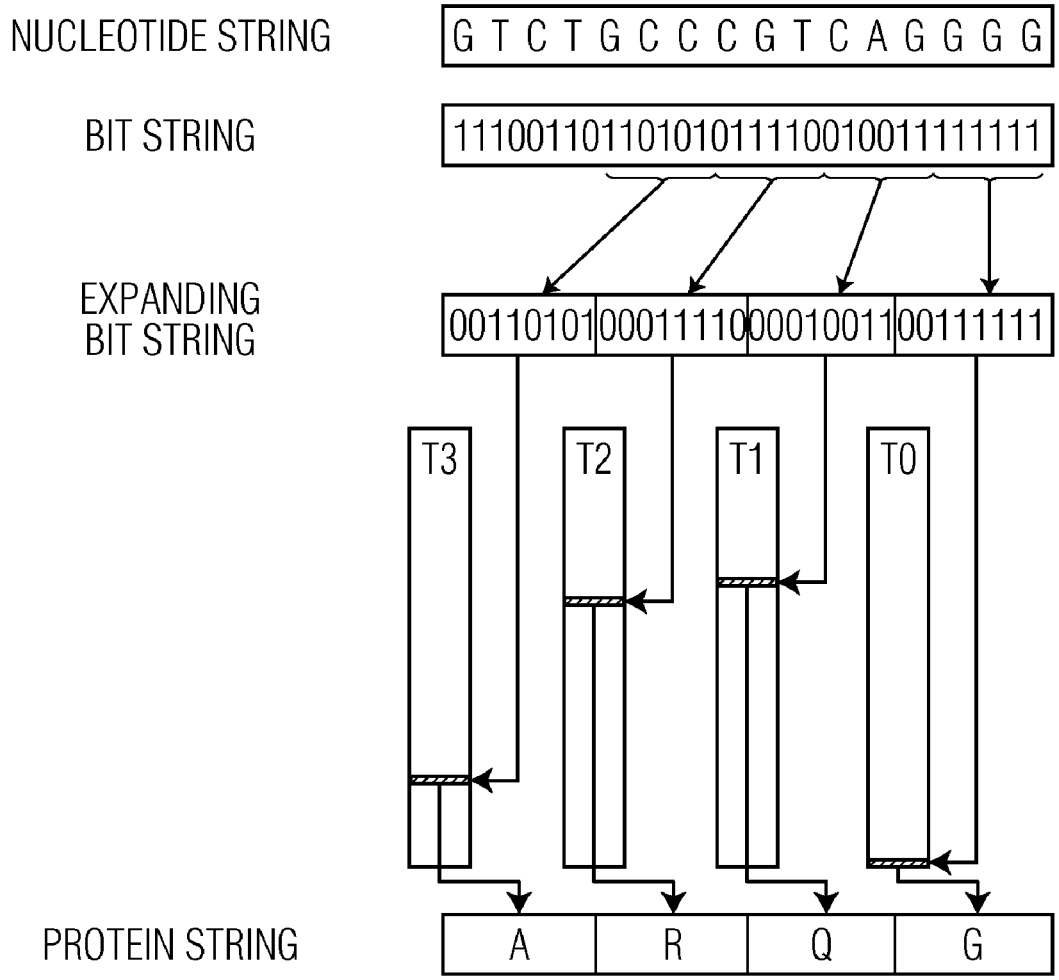
Figure 44:
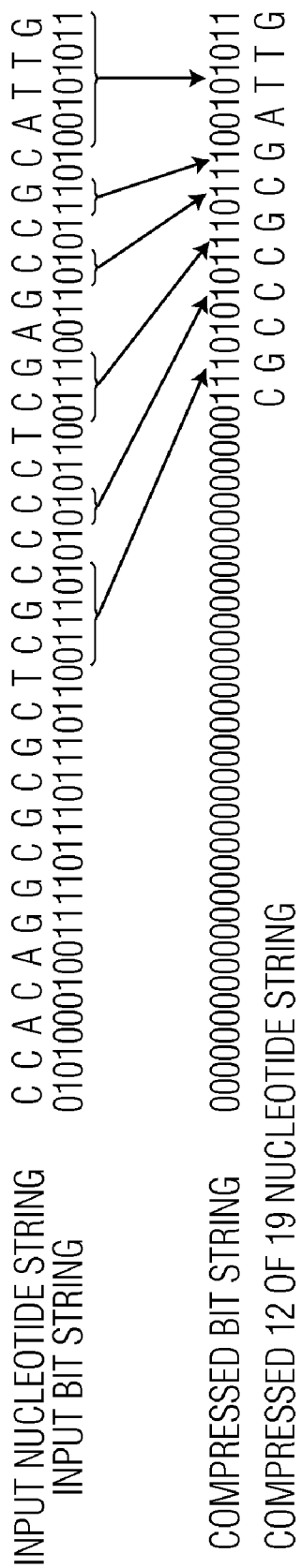

FIGS. 42-44 show sample bioinformatics operations which are capable of being carried out by the present invention. Pattern matching and bit scatter/gather operations are also found in bioinformatics—the field of analysis of genetic information. DNA, the genetic code contained within the nucleus of each cell, is a strand of the nucleotide bases adenine, cytosine, guanine, and thymine. These bases are typically represented by an ASCII string using the 8-bit characters A, C, G and T. However, a 2-bit encoding of the nucleotides is more efficient and can significantly increase performance of matching and searching operations on large genomic sequences (the human genome contains 3.2 billion nucleotides). The ASCII codes for the characters A, C, G and T differ in bit positions 2 and 1 (A: 00, C: 01, G: 11, T: 10) and these two bits can be used to encode each nucleotide. Thus, a fourfold compression of a genomic sequence simply requires a single pex instruction to select bits 2 and 1 of each byte of a word (see FIG. 42).

A strand of DNA is a double helix there are really two strands with the complementary nucleotides, A↔T and C↔G, aligned. When performing analysis on a DNA string, often the complementary string is analyzed as well. To obtain the complementary string, the bases are complemented and the entire string is reversed, as the complement string is read from the other end. The reversal of the DNA string amounts to a reversal of the ordering of the pairs of bits in a word. This is a straightforward bfly or ibfly permutation.

The DNA sequence is transcribed by the cell into a sequence of amino acids or a protein. Often, the analysis of the genetic data is more accurate when performed on a protein basis, such as is done by the BLASTX program. A set of three bases, or 6 bits of data, corresponds to a protein codon. Translating the nucleotides to a codon requires a table lookup operation using each set of 6 bits as an index. An efficient algorithm can use pdep to distribute eight 6-bit fields on byte boundaries, and then use the result as a set of table indices for a parallel table lookup (ptlu) instruction to translate the bytes, as shown in FIG. 43. A parallel table lookup instruction takes as input a word consisting of packed indices, each index being used to read out an entry of a table. For example, with a 32 bit register word, and tables each of which have 256 entries, 8 bit indices can be packed into the word to read out 4 different tables in parallel. These 4 results can be used immediately as in FIG. 43, or they can be combined by combinatorial logic to provide one result word which can then be stored back into the processor's register file. The pdep instruction of the present invention is used in FIG. 43 to expand bits from a bit string into the 8 bit indices used for the parallel table lookup. Also, the pex instruction of the present invention could be utilized to implement retrieving the packed indices for the operand input for such a parallel table lookup instruction.

For example, to match a pattern comprising many features where "1" indicates a match and "0" indicates no match, arbitrary subsets of the binary "1's" can be efficiently collected and compressed with this parallel extract instruction. The resulting compressed bits can be used as indices into the parallel table lookup instruction. This enables very fast action depending on which patterns are matched.

When aligning two DNA sequences, certain algorithms such as the known BLASTZ program use a "spaced seed" as the basis of the comparisons. This means that n out of m nucleotides are used to start a comparison rather than a string of n consecutive nucleotides. The remaining slots effectively function as wild cards, often causing the comparison to yield better results. For example, BLASTZ uses 12 of 19 (or 14 of 22 nucleotides) as the seed for comparison. The program compresses the 12 bases and uses the seed as an index into a hash table. This compression is a pex operation selecting 24 of 38 bits, as illustrated in FIG. 44.

Figure 45:
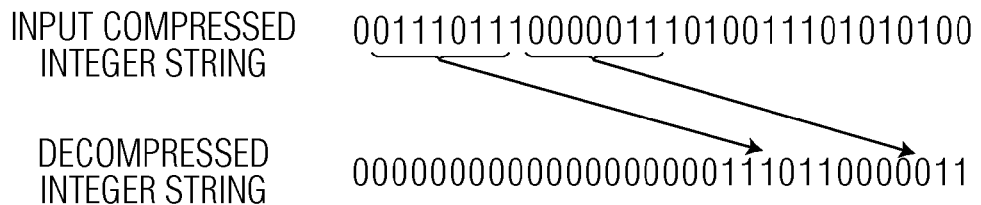
FIG. 45 shows an integer compression technique capable of being carried out by the present invention.

FIG. 45 shows an integer compression technique capable of being carried out by the present invention. Internet search engine databases, such as Google's, consist of lists of integers describing frequency and positions of query terms. These databases are compressed to minimize storage space, memory bus traffic and cache usage. To support fast random access into these databases, integer compression—using less than four bytes to represent an integer—is utilized. One integer compression scheme is a variable byte encoding in which each byte contains 7 data bits and a flag bit indicating whether the current byte is an intermediate part of the current integer (flag="0") or ends the current integer (flag="1"). Pex can accelerate the decoding of integers by compacting 7-bit fields from each byte (FIG. 45), and pdep can speedup encoding by placing consecutive 7-bit chunks of an integer on byte boundaries.

The present invention can also be used in random number generation and cryptology applications. Random numbers are very important in cryptographic computations for generating nonces, keys, random values, etc. Random number generators contain a source of randomness (such as a thermal noise generator) and a randomness extractor that transforms the randomness so that it has a uniform distribution. The INTEL random number generator uses a von Neumann extractor. This extractor breaks the input random bits, $X = x_1 x_2 x_3 \ldots$, into a sequence of pairs. If the bits in the pair differ, the first bit is output. If the bits are the same, nothing is output. This operation is equivalent to using a pex.v instruction on each word X from the randomness pool with the mask:

$$\text{Mask} = x_1 \oplus x_2 \| 0 \| x_3 \oplus x_4 \| 0 \| \qquad (21)$$

or equivalently, $$\text{Mask} = (X \oplus (X << 1)) \& 0xAAA \ldots A. \qquad (22)$$

A number of popular ciphers, such as DES, have permutations as primitive operations. Inclusion of permutation instructions such as bfly, ibfly (or grp) can greatly improve the performance of the inner loop of these functions. Also, these instructions can be used as powerful primitive operations in the design of the next generation of ciphers and hash functions (especially for the Cryptographic Hash Algorithm Competition (SHA-3)). Since all the pex and pdep instructions—static, loop-invariant and variable—are also very likely to be useful for cryptanalysis algorithms, they are indicated as "?" in Table 8.

Figure 46:
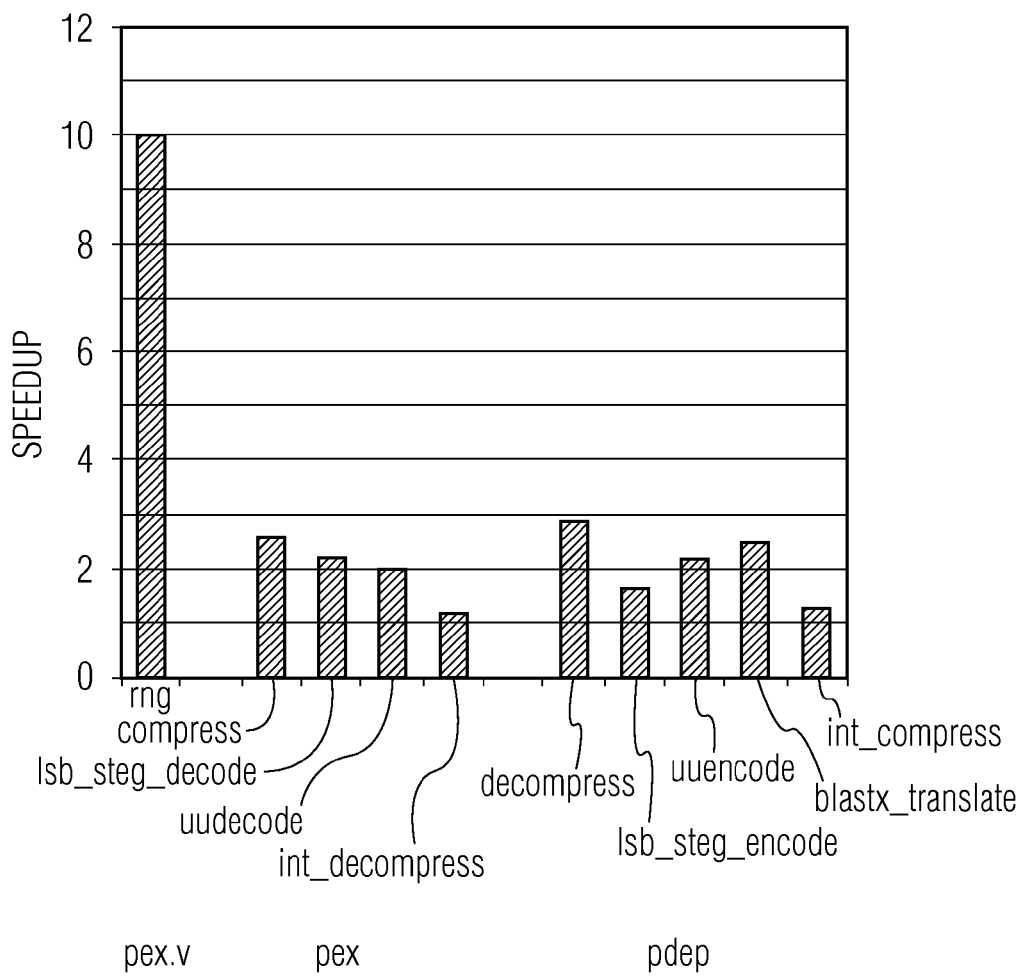
FIG. 46 shows performance results, normalized to the baseline Alpha ISA cycle counts, of the present invention.

Kernels for the above binary compression and decompression, steganography, transfer coding, bioinformatics translate, integer compression, and random number generation applications were coded and simulated using the SimpleScalar Alpha simulator enhanced to recognize our new instructions. The latencies of the instructions in the simulator are as given in Table 7. FIG. 46 shows performance results, normalized to the baseline Alpha ISA cycle counts. The processor with pex and pdep instructions exhibits speedups over the base ISA ranging from 1.13× to 10.04×, with an average of 2.29×(1.94× excluding the rng benchmark).

Random number generation exhibited the greatest speedup due to the fact that a variable pex.v operation is performed. A single pex.v instruction replaces a very long sequence of instructions that loops through the data and mask and conditionally shifts each bit of the input to the correct position of the output based on whether the corresponding bit of the mask is '0' or '1'. Of the benchmarks for static pex and pdep, the simple bit compression and decompression functions exhibited the greatest speedup as these operations combine many basic instructions into one pex or pdep. The speedup is lower in the steganography encoding case because there are only 4 fields per word, and also in the uudecode and BLASTX translate case because there are fewer fields overall. The lowest speedups were for integer compression cases as a smaller fraction of the runtime is spent on compression or decompressing bit fields.

To evaluate the cost of implementing the advanced bit manipulation functional units described above in connection with FIGS. 32-37, it is necessary to understand the implementation of the major components in such a functional unit. The most complex component is the hardware decoder that takes a register value (representing a bitmask) and turns it into the control bits of the stages of the butterfly or inverse butterfly datapath. Therefore, in order to evaluate the functional unit circuit latency and area, we must first define what is contained within the hardware decoder component. Provided below is an algorithm to obtain the n/2×lg(n) butterfly or inverse butterfly control bits from the n-bit pdep or pex bitmask. A hardware decoder circuit can then be constructed which implements this algorithm In the case of static pex or pdep instructions, the algorithm can be used by the compiler to generate the control bits for the inverse butterfly or butterfly datapath. In the case of dynamic or loop-invariant pex and pdep instructions, the hardware decoder is used.

The steps in the proof to Theorem 2 give an outline for how to decode the n-bit bitmask into controls for each stage of a butterfly datapath. For each right half of a stage of a subnetwork, we count the number of "1"s in that local right half of the mask, say k "1"s, and then set the k rightmost control bits to "1"s and the remaining bits to "0"s. This serves to keep block X in the local R half and export Y to the local L half. We then assume that we explicitly rotate Y and Z to be the rightmost bits in order in the local L half. Then, we iterate through the stages and come up with an initial set of control bits. After this, we eliminate the need for explicit rotations of Y and Z by modifying the control bits instead. This is accomplished by a left rotate and complement upon wrap around (LROTC) operation, rotating the control bits by the same amount obtained when assuming explicit rotations.

This process can be considerably simplified, as follows. First, note that when we modify control bits to compensate for a rotation in a given stage, we do so by propagating the rotation through all the subsequent stages. This means that when the control bits of a local L are modified, they are rotated and complemented upon wrap around by the number of "1"s in the local R, and by the number of "1"s in the local R of the preceding stage, and by the number of "1"s in all the local R's of all preceding stages up to the R in the first stage. In other words, the control bits of the local L are rotated by the total number of "1"s to its right in the bitmask.

Consider the example of FIG. 20. The control bit in stage 3 in the $L_L$ subnetwork is initially a "0" when we assumed explicit rotations. We first rotated and complemented this bit by 3, the number of "1"s in R of the bitmask: $0\to1\to0\to1$ (FIG. 23). We then rotated and complemented this bit by another 1 position, the number of "1"s in $L_R$ of the bitmask: $1\to0$. This yielded the final control bit in FIG. 21. Overall we rotated this bit by 4, the total number of "1"s to the right of $L_L$ or to the right of bit position 6. This is a Parallel Prefix Population Count (PP_PP_POPCNT) of the bitstring from the rightmost bit to bit position 6.

Figure 47:
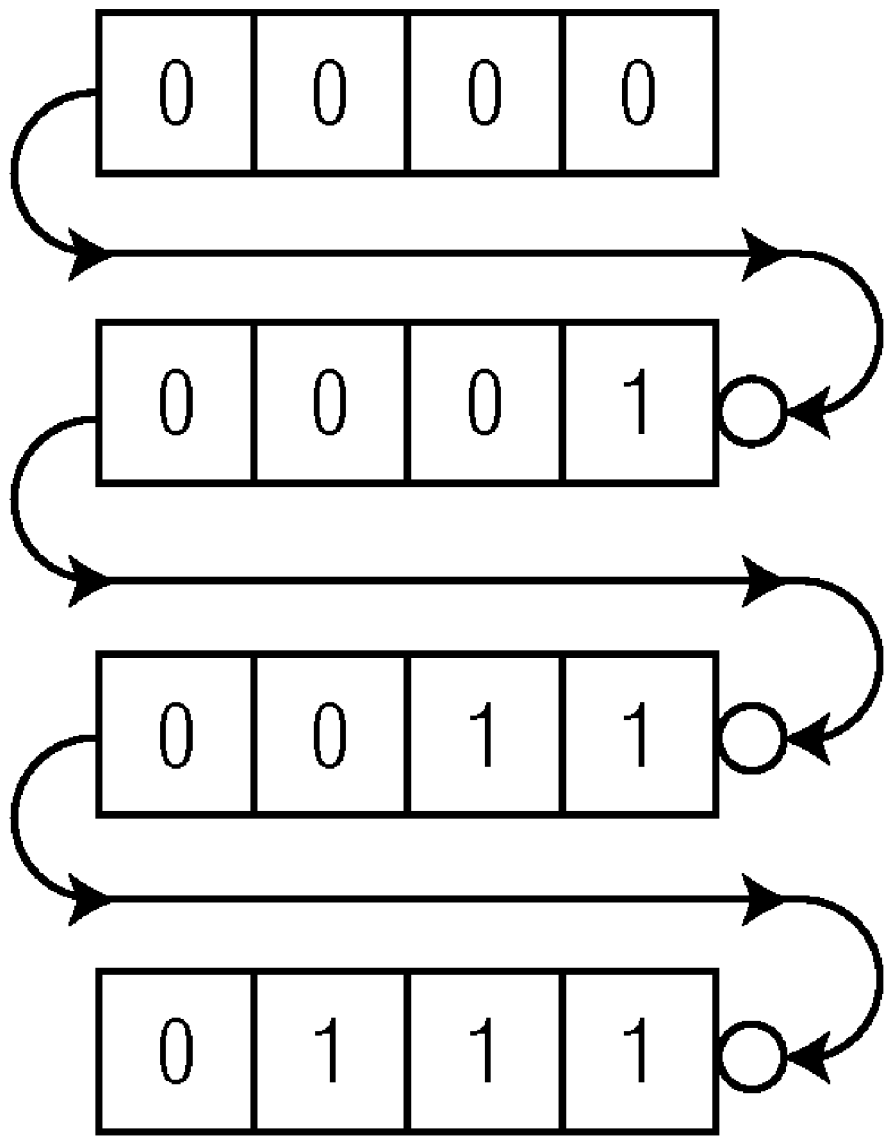
FIG. 47 illustrates a process according to the present invention for generating rotation control bits.

Second, it is necessary to produce a string of k "1"s from a count (in binary) of k, to derive the initial control bits assuming explicit rotations. This can also be done with a LROTC operation, as illustrated in FIG. 47. We start with a zero string of the correct length and then for every position in the rotation, and we wrap around a "0" from the left and complement it to get a "1" on the right. The end result, after a LROTC by k bits, is a string of the correct length with k rightmost bits set to "1" and the rest set to "0".

It is possible to combine these two facts: the initial control bits are obtained by a LROTC of a zero string the length of the local R by the PP_POPCNT of the bits in the bitmask in the local R and all bits to the right of it. We denote a string of k "0"s as $0^k$. We specify a bitfield from bit h to bit v as {h:v}, where v is to the right of h. So, for stage 1, we calculate the control bits as LROTC($0^{n/2}$, PP_POPCNT(mask{n/2-1:0})), for stage 2, we calculate the control bits as LROTC($0^{n/4}$, PP_POPCNT(mask{3n/4-1:0})) for L and LROTC($0^{n/4}$, PP_POPCNT(mask{n/4-1:0})) for R, for stage 3, we calculate the control bits as LROTC($0^{n/8}$, PP_POPCNT(mask{7n/8-1:0})) for $L_L$, LROTC($0^{n/8}$, PP_POPCNT(mask{5n/8-1:0})) for $L_R$, LROTC($0^{n/8}$, PP_POPCNT(mask{3n/8-1:0})) for $R_L$ and LROTC($0^{n/8}$, PP_POPCNT(mask{n/8-1:0})) for $R_R$, and so on for the later stages.

Verification of the correctness of this approach is provided with reference to FIG. 21 as follows:

for stage 1, the control bits are LROTC($0^4$, PP_POPCNT("1101"))=LROTC($0^4$, 3)=0111, for stage 2, the control bits of L are LROTC($0^2$, PP_POPCNT("101101"))=LROTC($0^2$, 4)=00 and the control bits of R are LROTC($0^2$, PP_POPCNT("01")) LROTC($0^2$, 1)=01, for stage 3, the control bit of $L_L$ are LROTC($0^1$, PP_POPCNT("0101101"))=LROTC($0^1$, 4)=0, the control bit of $L_R$ is LROTC($0^1$, PP_POPCNT("01101"))=LROTC($0^1$, 3)=1, the control bit of $R_L$ is LROTC($0^1$, PP_POPCNT("10"))= LROTC($0^1$, 2) 0 and the control bit of $R_R$ is LROTC($0^1$, PP_POPCNT("1"))= LROTC($0^1$, 1)=1.

This agrees with the result shown in FIG. 21.

One interesting point is that, for stage 1, the population count of the odd multiples of $n/2^1$ bits is needed, for stage 2 the population counts of the odd multiples of $n/2^2$ bits is needed, for stage 3 the population counts of the odd multiples of $n/2^3$ bits is needed, and so on. Overall, the counts are needed of the k rightmost bits, for k=0 to n−2. Such counts can be provided using the prefix population counter of the present invention, discussed above.

The control bits for the inverse butterfly for a pdep or a pex operation can be obtained using Algorithm 1, with the one caveat that the controls for stage i of the butterfly datapath are routed to stage lg(n)−i+1 in the inverse butterfly datapath. This can be shown using an approach similar to that shown earlier, except for working backwards from the final stage. Algorithm 1 decites the n mask bits into the nlg(n)/2 control bits for pdep and pex.

The execution time of Algorithm 1 in software is approximately 1200 cycles on an Intel Pentium-D processor. This software routine is useful for static pex or pdep operations and perhaps for loop invariant pex or pdep if the amount of processing in the loop dwarfs the 1200 cycle execution time. However, for dynamic pex.v and pdep.v a hardware decoder is required which implements Algorithm 1 in order to achieve a high performance. Fortunately, Algorithm 1 just contains two basic operations, population_count and LROTC, both of which have straightforward hardware implementations.

Figure 48:
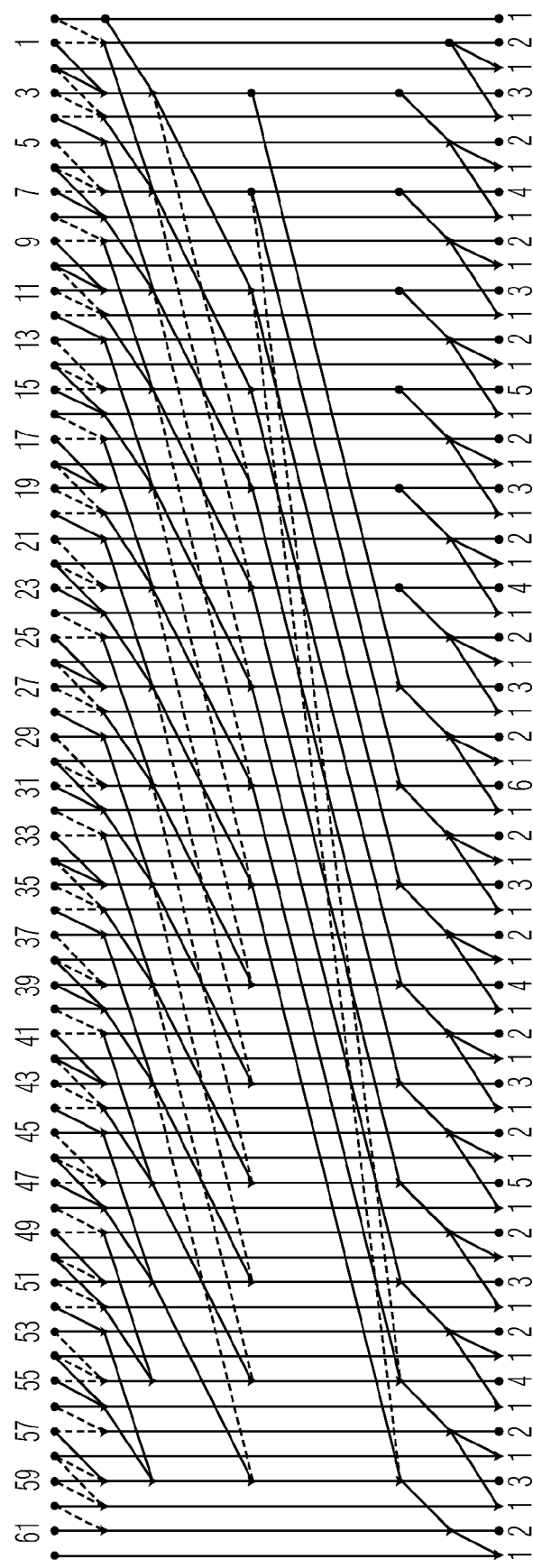
FIG. 48 depicts a dot diagram of the parallel prefix network.

The first stage of the decoder is the parallel prefix population counter, discussed above. This is a circuit that computes in parallel all the population counts of step 1 of Algorithm 1. The circuit is a parallel prefix network with each node performing carry-save addition (i.e. a set of full adders). The counters resemble carry shower counters in which the inputs are grouped into sets of three lines which are input into full adders. The sum and carry outputs of the full adders are each grouped into sets of three lines which are input to another stage of full adders and so on. The parallel prefix architecture resembles radix-3 Han-Carlson, a parallel prefix look-ahead carry adder that has lg(n)+1 stages with carries propagated to the odd positions in the extra final stage. The radix-3 nature stems from the carry shower counter design, as we group 3 lines to input to a full adder at each level. The similarity to Han-Carlson is due to the 1- and 2-bit counts being deferred to the end, similar to odd carries being deferred in the Han-Carlson adder. Thus, the counter has $\log_3(n)+2$ stages. FIG. 48 depicts a dot diagram of the parallel prefix network.

One simplification of the counter is based on the properties of rotations—that they are invariant when the rotation amount differs by the period of rotation. Thus, for the ith stage of the butterfly network, the PP_POPCNTs are only computed mod $n/2^{i-1}$. For example, for the 64-bit hardware decoder, for the 32 butterfly stage 6 PP_POPCNTs corresponding to the odd multiples of n/64, it is necessary only compute the PP_POPCNTs mod 2—only the least significant bit; for the 16 butterfly stage 5 PP_POPCNTs, we need only compute the PP_POPCNTs mod 4—the two least significant bits; and so on. Only the PP_POPCNT of 32 bits for stage 1 requires the full lg(n)-bit PP_POPCNT.

Figure 49:
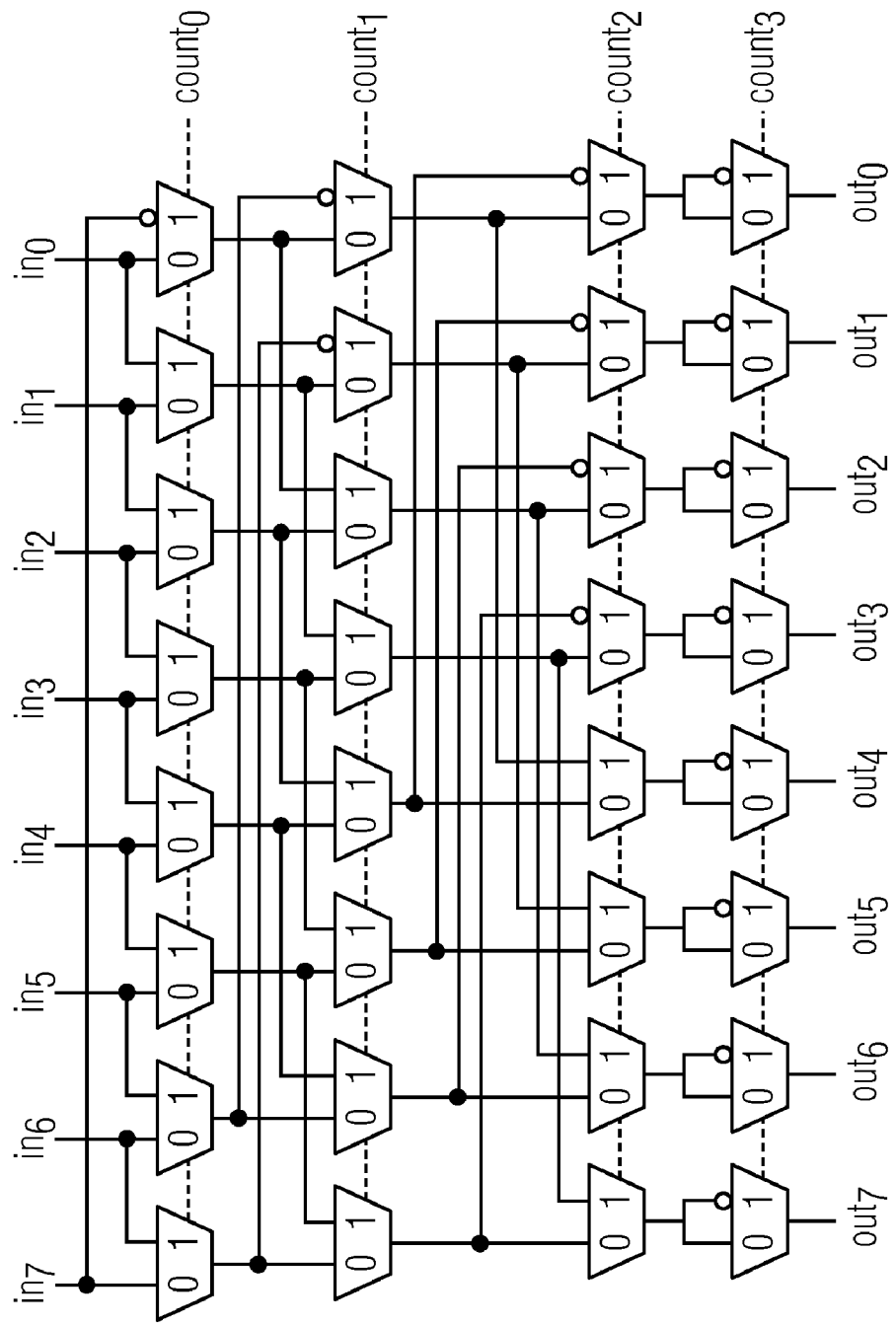
FIGS. 49-50 are circuit diagrams showing Left Rotate and Complement circuits according to the present invention.
Figure 50:
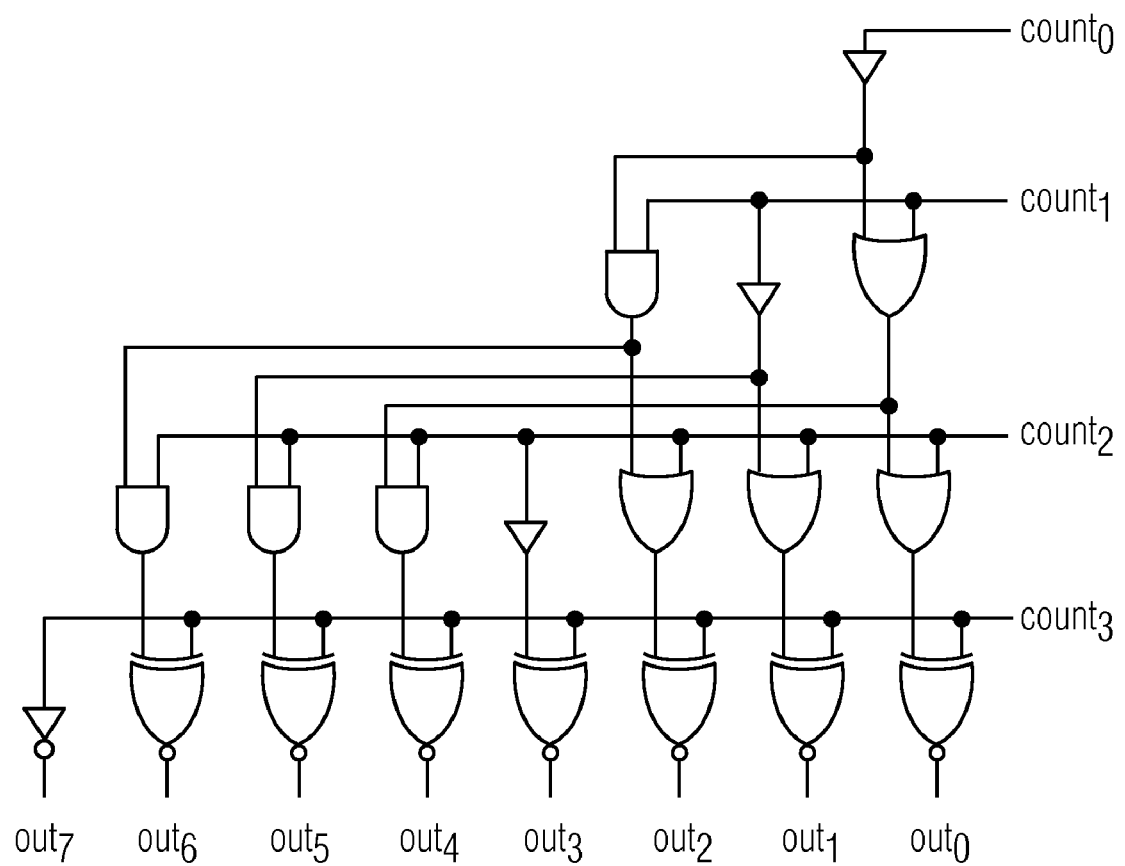

FIGS. 49-50 are circuit diagrams showing Left Rotate and Complement (LROTC) circuits according to the present invention. The outputs from the population counter control the LROTC circuits, one for each local R of each stage. Each LROTC circuit is realized as a barrel rotator modified to complement the bits that wrap around (see FIG. 49). However, while a standard $2^m$-bit rotator has m stages and control bits, this rotator has m+1 stages and control bits. As shown in FIG. 49, the final stage selects between its input and the complement, as the bits wrap $2^m$ positions. Propagating the constants at the input greatly simplifies the circuit as shown in FIG. 50 (see Algorithm 1—it is possible to calculate LROTC ($1^k$, count)).

The outputs from the decoders shown in FIGS. 49-50 can be routed to the butterfly circuit and its application registers, and can be used for controls for butterfly circuit to perform the pdep instruction. Additionally, the outputs are routed to the inverse butterfly circuit and its application registers, reversing the order of the stages, to be used for the pex instruction.

The functional units shown in FIGS. 34, 36, and 37 were tested for timing and circuit area. These functional units support static pex and pdep only (FIG. 34), loop invariant and dynamic pex.v and pdep.v as well (FIG. 36), and grp as well (FIG. 37). All three also support bfly and ibfly permutation instructions. The circuits in FIGS. 36-37 are implemented with a 3-stage pipeline. The hardware decoder occupies the first 2 pipeline stages due to its slow parallel prefix population counter. The butterfly (or inverse butterfly) circuit is in the third stage.

The various functional units were coded in Verilog and synthesized using Synopsys Design Compiler mapping to a TSMC 90 nm standard cell library. The designs were compiled to optimize timing. The decoder circuit was initially compiled as one stage and then Design Compiler automatically pipelined the subcircuit. Timing and area figures are as reported by Design Compiler. We also synthesized a reference ALU using the same technology library as a reference for latency and area comparisons.

Table 9 below summarizes the timing and area for the circuits. This shows that the 64-bit functional unit in FIG. 16 supporting static pex and pdep has a shorter latency than that of a 64-bit ALU and about 90% of its area (in NAND-gate equivalents). However, to support variable and loop-invariant pex and pdep (as in FIG. 36), which requires a hardware decoder (as described in detail above), the advanced bit manipulation functional unit will be 16% slower than an ALU and 2.25× larger. To also support a fast implementation of the grp instruction, the proposed new unit will be 23% slower than an ALU and about 3.2× larger in area.

TABLE 9

| Unit | Cycle time | Relative cycle time | Area (NAND gate equiv.) | Relative Area |
|---|---|---|---|---|
| ALU | 0.50 ns | 1 | 7.5K | 1 |
| FIG. 34: pex, pdep | 0.48 ns | 0.95 | 6.8K | 0.90 |
| FIG. 36: pex.v, pdep.v | 0.58 ns | 1.16 | 16.9K | 2.25 |
| FIG. 37: grp | 0.62 ns | 1.23 | 24.2K | 3.22 |

Table 10 shows the number of different circuit types, to give a sense for why the functional units supporting variable pex.v, pdep.v and grp are so much larger. It shows that supporting variable operations comes at a high price. The added complexity is due to the complex decoder combinational logic and to the additional pipeline registers and multiplexer logic. This explains why in Table 10, the variable circuits (FIGS. 36-37) have approximately 22-29% longer cycle time latencies compared to the static case (FIG. 34), due to the decoder complexity and pipeline overhead. They are also 2.5 to 3.6 times larger than the static case.

TABLE 10

| Unit | Pipeline Registers | Butterfly and Inverse Butterfly Circuits | Decoders | MUXes |
|---|---|---|---|---|
| FIG. 34 | 0 | 2 | 0 | 1 |
| FIG. 36 | ~9.25 | 2 | 1 | 13 |
| FIG. 37 | ~14.5 | 3 | 2 | 14 |

Figure 51:
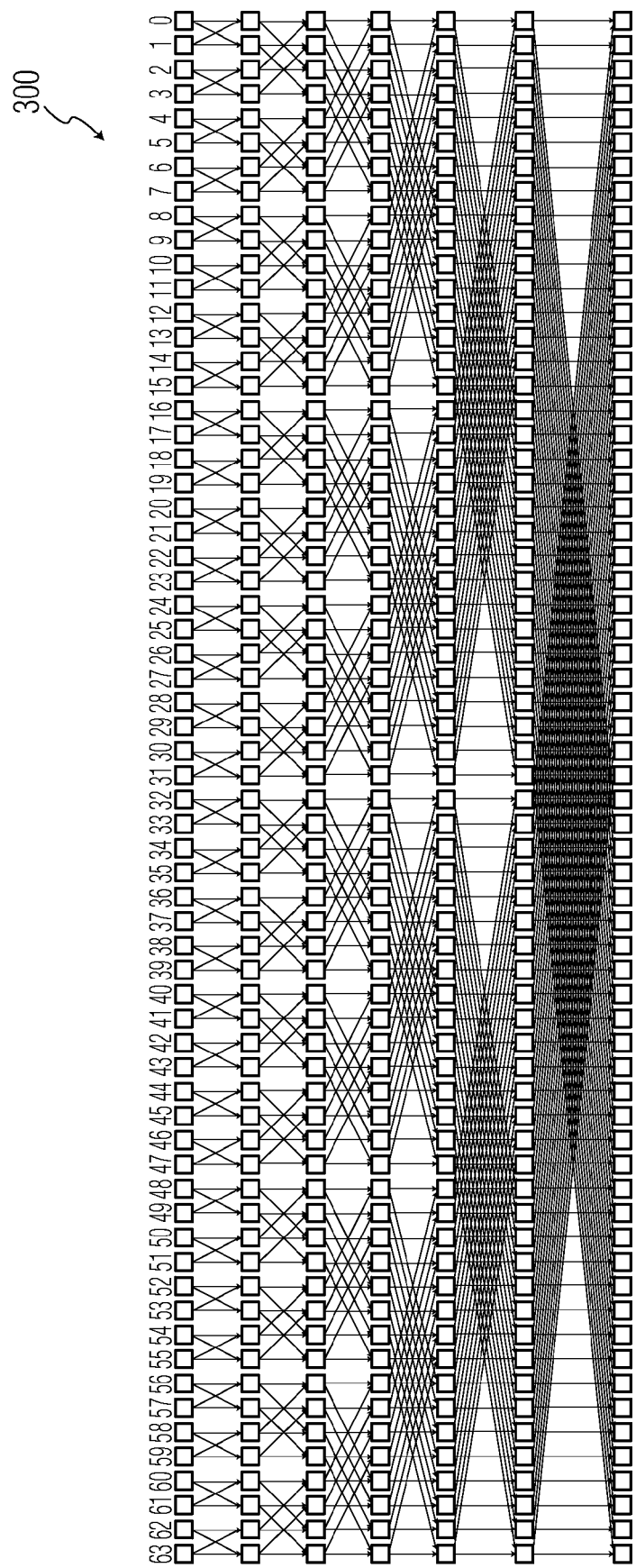
FIG. 51 is a circuit diagram showing 64-bit-wide inverse butterfly circuit implemented in accordance with the present invention.

FIG. 51 is a circuit diagram showing a 64-bit-wide inverse butterfly circuit implemented in accordance with the present invention, indicated generally at 300. The circuit 300 can be implemented in a shifter circuit of a processor to perform the complex bit manipulation procedures discussed herein.

Figure 52:
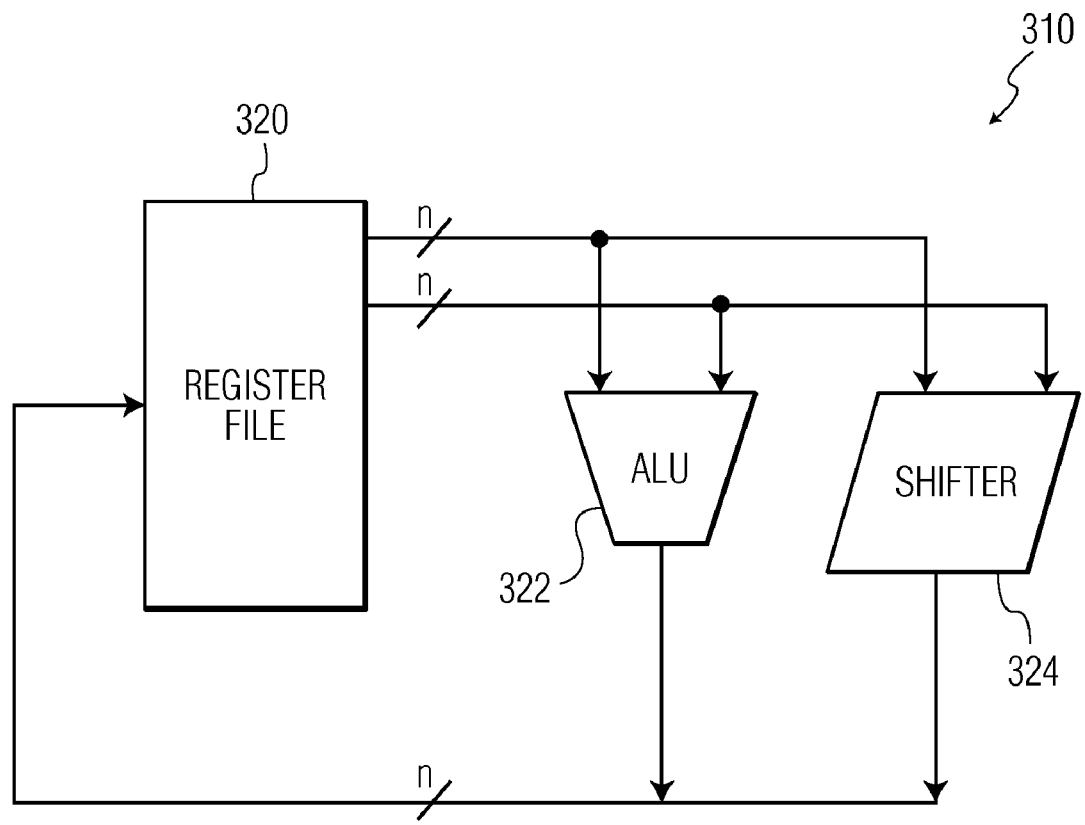
FIG. 52 is a block diagram showing a sample microprocessor architecture in which the present invention could be implemented.

FIG. 52 is a block diagram showing a sample microprocessor architecture, indicated generally at 310, in which the present invention could be implemented. The microprocessor 310 includes a register file 320, an arithmetic-logic unit (ALU) 322, and a shifter unit 324. The shifter unit 324 corresponds to one or more of the shifter circuits of the present invention.

Having thus described the invention in detail, it is to be understood that the foregoing description is not intended to limit the spirit or scope thereof. What is desired to be protected is set forth in the following claims.

What is claimed is:

1. A shifter circuit for a processor, comprising:
   means for obtaining a word in a processor;
   an inverse butterfly circuit connected to said means for obtaining the word, the inverse butterfly circuit including a plurality of circuit stages, each of the circuit stages including a plurality of multiplexers;
   a control circuit in communication with the inverse butterfly circuit for selectively controlling the plurality of multiplexers of the inverse butterfly circuit to perform a bit manipulation operation on the word so as to produce a processed word, the control circuit configured to cause the plurality of multiplexers of the inverse butterfly circuit to perform a parallel extract operation on bits of the word; and
   means for supplying the processed word to the processor.

2. The shifter circuit of claim 1, wherein the control circuit causes the inverse butterfly circuit to perform a logical shift right, a signed shift right, a shift left, a rotate left, or a rotate right instruction.

3. The shifter circuit of claim 2, wherein the control circuit causes the inverse butterfly circuit to perform an extract or a deposit operation.

4. The shifter circuit of claim 2, wherein the control circuit causes the inverse butterfly circuit to perform a multimedia mix operation.

5. The shifter circuit of claim 1, wherein the control circuit causes the inverse butterfly circuit to perform a multimedia mix operation.

6. The shifter circuit of claim 1, wherein the control circuit causes the inverse butterfly circuit to perform a group operation on bits of the word.

7. The shifter circuit of claim 1, wherein the control circuit causes the inverse butterfly circuit to perform a permutation operation on bits of the word.

8. The shifter circuit of claim 1, wherein the control circuit further comprises a decoder.

9. The shifter circuit of claim 8, wherein the decoder further comprises a parallel prefix counter and a plurality of left rotate and complement modules.

10. The shifter circuit of claim 1, wherein the plurality of stages of the inverse butterfly circuit comprises a first stage having first pairs of bits which are spaced 1 bit apart from each other, each of the first pairs being provided as inputs to a switch.

11. The shifter circuit of claim 10, wherein the plurality of stages of the inverse butterfly circuit comprises a second stage having second pairs of bits which are spaced 2 bits apart from each other, each of which second pairs being provided as inputs to a switch.

12. The shifter circuit of claim 10, wherein the plurality of stages of the inverse butterfly circuit comprises a log(n) stage having third pairs of bits which are spaced n/2 bits apart from each other.

13. The shifter circuit of claim 1, wherein the control circuit generates control bits for the inverse butterfly circuit using a recursive algorithm.

14. A shifter circuit for a processor, comprising:
   means for obtaining a word in a processor;
   a butterfly circuit connected to said means for obtaining the word, the butterfly circuit including a plurality of circuit stages, each of the circuit stages including a plurality of multiplexers;
   a control circuit in communication with the butterfly circuit for selectively controlling the plurality of multiplexers of the butterfly circuit to perform a bit manipulation operation on the word so as to produce a processed word, the control circuit configured to cause the plurality of multiplexers of the butterfly circuit to perform a parallel deposit operation on bits of the word; and
   means for supplying the processed word to the processor.

15. The shifter circuit of claim 14, wherein the control circuit causes the butterfly circuit to perform a logical shift right, a signed shift right, a shift left, or a rotate instruction.

16. The shifter circuit of claim 15, wherein the control circuit causes the butterfly circuit to perform an extract or a deposit operation.

17. The shifter circuit of claim 15, wherein the control circuit causes the butterfly circuit to perform a multimedia mix operation.

18. The shifter circuit of claim 14, wherein the control circuit causes the butterfly circuit to perform a multimedia mix operation.

19. The shifter circuit of claim 14, wherein the control circuit causes the butterfly circuit to perform a permutation operation on bits of the word.

20. The shifter circuit of claim 14, wherein the control circuit further comprises a decoder.

21. The shifter circuit of claim 20, wherein the decoder further comprises a parallel prefix counter and a plurality of left rotate and complement modules.

22. The shifter circuit of claim 14, wherein the plurality of stages of the butterfly circuit comprises a first stage having first pairs of bits which are spaced n/2 bits apart from each other, each of the first pairs being provided as inputs to a switch.

23. The shifter circuit of claim 22, wherein the plurality of stages of the butterfly circuit comprises a second stage having second pairs of bits which are spaced n/4 bits apart from each other, each of which second pairs being provided as inputs to a switch.

24. The shifter circuit of claim 23, wherein the plurality of stages of the butterfly circuit comprises a log(n) stage having third pairs of bits which are spaced 1 bit apart from each other.

25. The shifter circuit of claim 14, wherein the control circuit generates control bits for the butterfly circuit using a recursive algorithm.

26. A shifter functional unit for a processor, comprising:
   an inverse butterfly circuit in communication with a plurality of registers of the processor, the inverse butterfly circuit receiving at least one word from the plurality of registers; and
   a control circuit in communication with the inverse butterfly circuit, the control circuit generating and transmitting control bits to the inverse butterfly circuit causing the inverse butterfly circuit to perform a bit manipulation operation on the at least one word to produce a processed word, the control circuit configured to cause the inverse butterfly circuit to perform at least one of a parallel extract or a parallel deposit operation on bits of the word, wherein the inverse butterfly circuit stores the processed word in a location in the plurality of registers for use by the processor.

27. The functional unit of claim 26, wherein the control circuit comprises a control bit generator.

28. The functional unit of claim 27, wherein the control bit generator comprises a rotation control bit generator.

29. The functional unit of claim 26, further comprising a masked merge unit in communication with the control circuit for generating mask bits.

30. The functional unit of claim 29, further comprising a multiplexer for multiplexing outputs of the masked merge unit with outputs of the inverse butterfly circuit.

31. The functional unit of claim 26, further comprising a butterfly circuit in communication with the plurality of registers.

32. The functional unit of claim 31, further comprising a masked merge unit in communication with the control circuit for generating mask bits.

33. The functional unit of claim 32, further comprising first and second multiplexers for multiplexing outputs of the masked merge unit with outputs of the butterfly circuit and the inverse butterfly circuit, respectively.

34. The functional unit of claim 32, wherein the control circuit further comprises a decoder for instructing the functional unit to perform a parallel extract or a parallel deposit operation on the word.

35. The functional unit of claim 34, wherein the decoder instructs the functional unit to perform a static parallel deposit or a static parallel extract operation on the word.

36. The functional unit of claim 34, wherein the decoder instructs the functional unit to perform a variable parallel deposit or a variable parallel extract operation on the word.

37. The functional unit of claim 34, further comprising first and second multiplexers connected between the plurality of registers and the decoder for instructing the functional unit to process loop invariant conditions.

38. The functional unit of claim 37, further comprising a second decoder and a second inverse butterfly circuit for instructing the functional unit to perform a group operation on the word.

39. A method for performing a bit manipulation operation in a processor, comprising the steps of:
  providing a processor having a shifter circuit with an inverse butterfly circuit;
  receiving a word from at least one of a plurality of registers in the processor using the shifter circuit, the word having a first configuration of bits;
  processing the word using a parallel extract or a parallel deposit operation executed by the inverse butterfly circuit of the shifter circuit to create a processed word having a second configuration of bits different than the first configuration of bits; and
  transmitting the processed word to the plurality of registers for storage at a location in the plurality of registers and subsequent use by the processor.

40. The method of claim 39, wherein the step of processing the word comprises the step of performing a shift right, a shift left, a rotate, an extract, a deposit, or a mix operation on bits of the word.

41. The method of claim 39, wherein the step of processing the word comprises the step of performing a group operation on bits of the word.

42. The method of claim 39, wherein the step of processing the word comprises the step of performing a permutation operation on bits of the word.

43. The method of claim 39, wherein the step of processing the word comprises the step of performing a butterfly permutation operation on bits of the word.

44. The method of claim 39, wherein the step of processing the word comprises performing a bit compression procedure on the word using the shifter circuit.

45. The method of claim 39, wherein the step of processing the word comprises performing a steganography procedure on the word using the shifter circuit.

46. The method of claim 39, wherein the step of processing the word comprises performing a binary image morphology procedure on the word using the shifter circuit.

47. The method of claim 39, wherein the step of processing the word comprises performing a transfer coding procedure on the word using the shifter circuit.

48. The method of claim 39, wherein the step of processing the word comprises performing a bioinformatic matching procedure on the word using the shifter circuit.

49. The method of claim 39, wherein the step of processing the word comprises performing an integer compression procedure on the word using the shifter circuit.

50. The method of claim 39, wherein the step of processing the word comprises applying a parallel extract procedure to the word.

51. The method of claim 50, further comprising the step of performing a fast table lookup procedure on the processed word.

52. The method of claim 39, wherein the step of processing the word comprises applying a parallel deposit procedure to the word.

53. The method of claim 52, further comprising the step of performing a fast table lookup procedure on the processed word.

* * * * *

UNITED STATES PATENT AND TRADEMARK OFFICE
CERTIFICATE OF CORRECTION

PATENT NO.       : 8,285,766 B2
APPLICATION NO.  : 12/126616
DATED            : October 9, 2012
INVENTOR(S)      : Ruby B. Lee Page 1 of 1

It is certified that error appears in the above-identified patent and that said Letters Patent is hereby corrected as shown below:

In the Specifications:

In Table 1-continued (Columns 7 and 8), insert the missing dotted line from the table between mix {r,l} {0,1,2,3,4,5} $r_1 = r_2, r_3$     Select right or let subword from a pair of subwords, alternating between source registers $r_2$ and $r_3$. Subword sizes are $2^i$ bits, for i=0, 1, 2, . . . , 5, for a 64-bit processor."

-- --------------------------------------------------------------------------------------------------------------------------------- btfly $r_1 = r_2$, ar.b1, ar.b$_2$, ar.b$_3$     Perform Butterfly permutation of data bits in $r_2$     --;

Column 9, line 2, after the words "in the" delete "F";

Column 9, line 25, "Cb" should be -- cb --;

Column 9, line 34, "≧" should be -- $\geq$ --;

Column 9, line 57, "≧" should be -- $\geq$ --;

Column 10, line 1, "≦" should be -- $\leq$ --;

Column 10, line 2, "≧" should be -- $\geq$ --;

Column 10, line 13, "≧" should be -- $\geq$ --;

Column 11, line 39, "$^\theta$" should be -- $f$ --.

Signed and Sealed this
Twenty-first Day of May, 2013

Teresa Stanek Rea
*Acting Director of the United States Patent and Trademark Office*